(12) United States Patent
Simpson et al.

(10) Patent No.: US 12,179,415 B2
(45) Date of Patent: Dec. 31, 2024

(54) ADDITIVE MANUFACTURING COMPOSITES WITH FLOW INDUCED FIBER ALIGNMENT

(71) Applicant: NDSU RESEARCH FOUNDATION, Fargo, ND (US)

(72) Inventors: Patrick Simpson, Fargo, ND (US); Michael Holthaus, Fargo, ND (US); Chad Ulven, Fargo, ND (US)

(73) Assignee: NDSU RESEARCH FOUNDATION, Fargo, ND (US)

( * ) Notice: Subject to any disclaimer, the term of this patent is extended or adjusted under 35 U.S.C. 154(b) by 0 days.

(21) Appl. No.: 17/305,224

(22) Filed: Jul. 1, 2021

(65) Prior Publication Data
US 2022/0063183 A1  Mar. 3, 2022

Related U.S. Application Data

(60) Provisional application No. 63/073,260, filed on Sep. 1, 2020.

(51) Int. Cl.
| | | |
|---|---|---|
| B29C 64/118 | (2017.01) | |
| B29C 64/321 | (2017.01) | |
| B33Y 10/00 | (2015.01) | |
| B33Y 30/00 | (2015.01) | |
| B33Y 70/00 | (2020.01) | |

(52) U.S. Cl.
CPC .......... B29C 64/118 (2017.08); B29C 64/321 (2017.08); B33Y 10/00 (2014.12); B33Y 30/00 (2014.12); B33Y 70/00 (2014.12)

(58) Field of Classification Search
CPC ................ B29C 64/135; B29C 64/129; B29C 64/264; B29C 64/40; B29C 64/118; B29C 64/321; B29C 64/124
See application file for complete search history.

(56) References Cited

U.S. PATENT DOCUMENTS

| | | |
|---|---|---|
| 4,575,330 A | 3/1986 | Hull |
| 7,291,002 B2 | 11/2007 | Russell et al. |
| 9,956,727 B2 | 5/2018 | Steele |
| 10,308,007 B2 | 6/2019 | Chen et al. |
| 2013/0056672 A1* | 3/2013 | Johnston ............... C22C 47/025 252/62.51 R |

(Continued)

OTHER PUBLICATIONS

Agarwal et al., "Analysis and Performance of Fiber Composites," 3rd Edition, Wiley, 2006, 576 pages.

(Continued)

*Primary Examiner* — Nahida Sultana
*Assistant Examiner* — Mohamed K Ahmed Ali
(74) *Attorney, Agent, or Firm* — McKee, Voorhees & Sease, PLC

(57) ABSTRACT

Suspending fibers within a substantially similar direction within flow field allows for an even dispersion of fibers in a manufactured composite. The flow field can be established within a resin tank so as to control orientation of the fibers. An advantage of this approach is that fiber orientation can be changed layer by layer during printing. No matter where the reinforcements need to be, the fibers can be aligned on the fly to accommodate. 3D prints can made stronger for a very wide range of objects and opportunities.

13 Claims, 29 Drawing Sheets
(3 of 29 Drawing Sheet(s) Filed in Color)

(56) References Cited

U.S. PATENT DOCUMENTS

| | | | |
|---|---|---|---|
| 2017/0015059 A1 | 1/2017 | Lewicki | |
| 2018/0141267 A1* | 5/2018 | Dudley | B29C 64/307 |
| 2018/0179671 A1* | 6/2018 | Graley | D01F 1/10 |
| 2019/0001656 A1* | 1/2019 | Susnjara | B33Y 40/00 |
| 2019/0217530 A1* | 7/2019 | Alvarado | B29C 31/048 |
| 2019/0330484 A1* | 10/2019 | Kojima | C09D 11/14 |

OTHER PUBLICATIONS

Akil et al., "Kenaf fiber reinforced composites: A review," Materials and Design, 2011, vol. 32, pp. 4107-4121.

"Army Research Laboratory S&T Campaign Plans 2015-2035," U.S. Army Research Laboratory, Sep. 2014, pp. 1-145.

Arnaut et al., "Reinforcement elements aligned with the direction of forces for load transfer areas of long-fiber-reinforced thermoplastic components," Materials Science Forum, Jul. 2015, vol. 825-826, pp. 779-786.

Audoly et al., "Fragmentation of Rods by Cascading Cracks: Why Spaghetti Does Not Break in Half," Physical Review Letters, 2005, vol. 95, No. 095505, pp. 1-4.

Blok et al., "An investigation into 3D printing of fibre reinforced thermoplastic composites," Additive Manufacturing, 2018, vol. 22, pp. 176-186.

"Boosting Performance without Breaking the Bank," Assembly, Jul. 2015, pp. 1-5.

"Design Considerations for Successfully Using Long Fiber Thermoplastic Composites as Substitutes for Metals," PlastiComp, Inc., 2015, pp. 1-8.

"Digital Light Synthesis," Carbon Inc, 2021, Retrieved from the Internet: <URL: https://www.carbon3d.com/our-technology/>, pp. 1-12.

Goertzen et al., "Creep behavior of carbon fiber/epoxy matrix composites," Materials Science and Engineering A, 2006, vol. 421, pp. 217-225.

Jacobs, P., "Fundamentals of Stereolithography," 3D Systems, Inc., Jul. 1992, pp. 196-211.

Jacobs, P., "Rapid Prototyping & Manufacturing—Fundamentals of StereoLithography," Journal of Manufacturing Systems, 1992, vol. 12, No. 5, pp. 430-433.

Kahl et al., "Advanced short fiber composites with hybrid reinforcement and selective fiber-matrix-adhesion based on polypropylene—Characterization of mechanical properties and fiber orientation using high-resolution X-ray tomography," Composites Part A, 2018, vol. 111, pp. 54-61.

Kalpakjian et al., "Manufacturing Engineering and Technology," Eighth Edition, Pearson, 2019, 26 pages.

Karalekas et al., "Composite rapid prototyping: overcoming the drawback of poor mechanical properties," Journal of Materials Processing Technology, 2004, vol. 153-154, pp. 526-530.

Masere et al., "Gas-Free Initiators for High-Temperature Free-Radical Polymerization," Polymer Chemistry, 2000, vol. 38, No. 21, pp. 3984-3990.

Mendes-Felipe et al., "State-of-the-Art and Future Challenges of UV Curable Polymer-Based Smart Materials for Printing Technologies," Advanced Material Technologies, 2019, No. 1800618, pp. 1-16.

Rajak et al., "Fiber-Reinforced Polymer Composites: Manufacturing, Properties, and Applications," Polymers, 2019, vol. 11, No. 1667, pp. 1-37.

Sackey et al., "Spectroscopic Study of UV Transparency of Some Materials," Environment and Pollution, 2015, vol. 4, No. 4, pp. 1-17.

Sano et al., "3D printing of discontinuous and continuous fibre composites using stereolithography," Additive Manufacturing, 2018, vol. 24, pp. 521-527.

Simpson, P., "Additive Manufacturing of Short-Fiber Composites Via Streolithography," Thesis, North Dakota State University, Dec. 2018, pp. 1-180.

"Solution for Carbon fiber Wet-Out Issue for Low Cost Sheet Molding Carbon Fiber Composite Production," Oak Ridge National Laboratory, Aug. 2014, pp. 1-7.

"Standard Test Method for Tensile Properties of Plastics," ASTM International, Mar. 2015, pp. 1-17.

"Standard Test Methods for Plane-Strain Fracture Toughness and Strain Energy Release Rate of Plastic Materials," ASTM International, Dec. 2014, pp. 1-10.

"The Ultimate Guide to Stereolithography (SLA) 3D Printing," Formlabs, Mar. 2017, pp. 1-23.

Thomason, J., "Glass fibre sizing: A review," Composites Part A, 2019, vol. 127, No. 105619, pp. 1-24.

Tumbleston et al., "Continuous liquid interface production of 3D objects," Science, Mar. 2015, vol. 347, No. 6228, pp. 1349-1352.

"UV-Curable Resins," Polymer Properties Database, 2015-2021, Retrieved from the Internet: <URL: https://polymerdatabase.com/polymer%20classes/UV%20Curing%20Resins.html>, 2 pages.

Wang et al., "Static and fatigue behavior of basalt fiber-reinforced thermoplastic epoxy composites," Journal of Composite Materials, 2019, pp. 1-10.

\* cited by examiner

ADDITIVE MANUFACTURING COMPOSITES WITH FLOW INDUCED FIBER ALIGNMENT

CROSS REFERENCE TO RELATED APPLICATIONS

This application claims priority under 35 U.S.C. § 119 to provisional patent application U.S. Ser. No. 63/073,260, filed Sep. 1, 2020. The provisional patent application is herein incorporated by reference in its entirety, including without limitation, the specification, claims, and abstract, as well as any figures, tables, appendices, or drawings thereof.

GRANT REFERENCE

This invention was made with government support under Army Research Laboratory Award #W911NF-16-0242 awarded by the Army Research Laboratory. The government has certain rights in the invention.

FIELD OF THE INVENTION

The present invention relates generally to an apparatus and corresponding method of use in at least the 3D printing and manufacturing industries. More particularly, but not exclusively, the present invention relates to additive manufacturing composites with flow induced fiber alignment.

BACKGROUND OF THE INVENTION

The background description provided herein gives context for the present disclosure. Work of the presently named inventors, as well as aspects of the description that may not otherwise qualify as prior art at the time of filing, are neither expressly nor impliedly admitted as prior art.

Through additive manufacturing (AM), a faster production of prototypes and other small objects can be achieved. The ability to customize any object quickly provides a new advantage to companies, designers, and hobbyists to optimize manufacturing needs. With AM, objects are created layer by layer. These techniques are controlled by computer software that allows the user to manipulate the different printer settings.

AM begins by making a three dimensional (3D) model of the object to be printed, which can be done using a number of different 3D modelling software. To allow for the part to be manufactured successfully, the part file must be changed from a native file to neutral file to be recognized by other software. In these formats, the object is broken down into a 3D mesh. Depending on which AM type machine is being used, another software can be used to create a tool path called a G-code. The G-code can control all aspects of the printer, including the X and Y direction of the laser, the Z direction of the print bed, layer height, the speed of the laser, and if needed sweep step or peel step.

AM offered a more complete customization of part design. The limitations of small corners or difficult geometries were greatly reduced and the need for tooling to produce the object was eliminated. This was because the objects being manufactured are created from a single layer from the base of the object to the last layer at the top. It was now possible to make hidden shapes inside larger shapes eliminating space for tool heads. Objects are printed in one solid piece and do not require joining concepts like adhesive, bolts, or nails. Joints can be a sources of stress concentration and ultimately lead to part failure, increase cost and, increase the total weight of the part being manufactured. Eliminating joints also can reduce the time needed for an employee to assemble the object, thereby lowering the total cost of each object. The only overhead cost of the piece being manufactured is the printer and the resin/filament. Before AM, prototyping could be a costly and time-consuming endeavor. With the advancements in AM technology, new ideas for a product can be made in a matter of hours instead of days or weeks.

One of the disadvantages of AM is the lower mechanical performance of printed parts as compared to the same materials manufactured in a subtractive manner. There are a few reasons for these performance shortcomings. First, there can be poor layer-to-layer adhesion in the printed parts when each layer is independently placed on top of the next. This means the interface between the layers can break away from each other at a lower stress than that required to fracture the bulk material. Another reason is that compared to subtractive manufacturing, AM is more limited in the number of materials that can be used. Another disadvantage is that AM can require high capital costs. The printers typically required are expensive and the materials used to print can also have a high cost due the material they need.

A term commonly used for polymer AM approaches is called 3D printing. Different forms of polymer 3D printing have been available for over three decades. Examples of such include fused deposition modeling (FDM), stereolithography (SLA), and digital light synthesis (DLS). These printing processes use polymers. For example, FDM uses thermoplastic such as acrylonitrile butadiene styrene (ABS) and poly(lactic acid) (PLA). On the other hand, SLA and DLS use a liquid thermoset. The most popular resins used in SLA printer are acrylate based and take advantage of monomers and photo polymerization initiators to cure.

One of the most prevalent problems with stereolithography (SLA) resin is that it has poor mechanical properties. This type of 3D printing uses an ultraviolet (UV) laser to cure the resin to make multi-axial objects. The kind of printer being used in this experiment is known as an inverted SLA printer. This means that the UV laser is located at the bottom of the printer and points up into a tank of resin. A plate that sits in the resin tank will slowly rise as the 3D object is made. Another type of 3D printing is called fused deposition modeling (FDM). This is accomplished by melting a thermoplastic filament to make the object. The biggest problem is that this way of printing has low layer to layer adhesion. SLA printers have very high layer to layer adhesion but still have some problems. To make SLA objects, multiple factors come into play such as: material deformation, orientation problems, etc.

Carbon fiber is one of the strongest fibers that can be used for reinforcement of polymers. For SLA printing to work properly the laser must be able to penetrate both the matrix and the fiber. This is a problem with carbon because it is opaque and the laser cannot penetrate fully.

Others have tried adding a thermal initiator to the resin in order to produce a final cure. While adding the thermal initiator solved the problem of optimally curing the part, the addition of the thermal indicator also created voids in the printed samples. The voids occurred because the thermal initiator gives off small amounts of nitrogen gas as it heats. The gas then gets trapped creating the small voids. The small voids reduce the potential high strength of the parts being manufactured as each of these voids acted as a stress concentration point.

Another drawback of additive manufacturing (AM) parts is that the material properties of the parts produced are much lower than that of parts manufactured using traditional manufacturing such as milling, injection molding, and traditional composite manufacturing methods. If the material properties of the parts produced using AM could be increased to be on par with that of traditional manufacturing methods a new era of design could be opened up. This would be accomplished by the ability to use AM to make parts that could not be produced using any other methods due to their complex geometry. With the advent of computer aided design (CAD) software the design process was changed, but we are still limited by what can be made in the virtual world and what can be manufactured in the real world. With the incorporation of AM into the final production processes the complexity of the geometries that could be manufactured increases. This increase in complexity of part geometry can allow for a decrease in the over complexity of the part, sub-assembly, or whole assembly, along with helping to relieve supply chain issues. For instance, by combing multiple parts into one you can remove the need for several fasteners. This will decrease the number of parts needed, number of components to analyze, and possible points of failure.

An appealing advantage of vat photopolymerization over material extrusion processes, such as fusion deposition modeling (FDM), is the ability to manufacture parts that have isotropic material properties. For parts produced using FDM, the part has the properties of the material in the plane of printing, but perpendicular to that it becomes dependent on the mechanical adhesion of the polymer layers to each other for the part's mechanical properties. For parts manufactured using vat photopolymerization it is possible to produce parts that have near isotropic mechanical properties. Although the part is produced in a layer-by-layer process, as like in FDM, the thermoset polymer is not completely cured with in the layer before the part is raised and the next layer is printed. This allows for unreacted polymer functional groups in a previous layer to react with the polymer curing in the current layer being printed. Because of the ability of vat photopolymerization to produced parts with isotropic properties, the orientation of the part while printing does not depend on what direction force will be applied to the finished part, but what orientation of the part will optimize the printing process.

One of the limiting factors of vat photopolymerization is the material properties of the resins used to create parts. The parts produced using these resins are weak and brittle, limiting their use for many end use structural applications. One method of improving the properties of a material is the incorporation of a reinforcement material in the creation of a composite. Short-fiber composites have traditional been produced via injection and compression molding, and by using short-fibers as a reinforcement the same manufacturing methods used for polymers can be used to form the composites, but with increased material properties.

Short-fiber composites usually find their applications in situations where isotropic material properties are desired, typically manufactured via injection or compression molding, but the manufacturing processes can influence the fiber orientation due to the flow of the material during manufacturing final material properties. While the flow induced alignment can be taken advantage of to some extent, it can be limited due to the requirements of the mold design, and can be an undesired effect when isotropic properties are desired.

With short fibers already in wide spread use as a reinforcement material for traditional manufacturing methods, such as injection and compression molding, they have found their way into use for additive manufacturing methods as well. For FDM there are numerous types of reinforcements ranging from nanoparticle to continuous fiber, of both natural and synthetic materials, that are currently being researched and available for sell on a commercial level. Whereas FDM based methods have a number of publications in the area of short fiber composite characterization, the area of vat photopolymerization manufactured composites is lacking in published studies and available data using carbon fiber as a reinforcement.

There have been various nanosized reinforcements studied as a method of increasing the material properties of vat photopolymerization manufactured parts such as: cellulose nanocrystals (CNC), multi-wall carbon nanotubes (MWCNTs), and silver nanoparticles (AgNPs). Lignin-coated cellulose nanocrystals (L-CNC) have been used at 0, 0.1, 0.5, and 1 weight percent with an acrylic matrix. Research related to the same has carried out using Form+1 (Formlabs, Somerville, Mass.) which is a bottom-up desktop vat photopolymerization printer. At a loading of 0.5 wt. % L-CNC it was found there was an increase in the tensile strength and Young's modulus by 3% and 5% respectively. This was achieved only after a thermal post-cure being carried out on the specimens with the non-post cured specimens showing unimproved or reduced properties depending on the loading of L-CNC. The decrease in material properties that was seen at higher weight percent was attributed to poor dispersion of the L-CNC and poor adhesion between the L-CNC and matrix.

Another composite was made from MWCNTs at 0.025 and 0.1 weight percent with an epoxy-based matrix using the commercial resin, DSM Somos® WaterShed™ 11120. A top-down printer the 3D Systems SLA-250/50 machine (3D Systems, Rock Hill, SC) was modified from a 47 liter vat to a 500 ml vat with the sweeping mechanism removed, and a peristaltic pump was used to recirculate the resin mixture. The research looked at the increasing the tensile strength and fracture strength of the resin. For 0.025 wt. % of MWCNTs, an increase in tensile strength of 5.7% with an increase in fracture strength of 26% was reported. While at 0.10 wt. % an increase of 7.5% and 33% in tensile and fracture strength, respectively was reported, but it was pointed out that at the higher loading of 0.1% MWCNTs there were issues with agglomeration of the MWCNTs. The elongation at break decreased 28% for the MWCNTs reinforced resin, and the fracture mode was reported as a brittle type verse as more of a ductile failure mode that was seen in the pure resin.

Short glass fibers have been studied more as reinforcement materials for vat photopolymerization in part due to the decrease in opacity when compared to that of carbon fiber. One study looked at using short glass fibers 1.6 mm in length at various fiber volume fractions of 0, 5, 10, 15, and 20 percent, and a urethane acrylic matrix, DeSolite SCR310. The experiment was carried out for comparing molded and 3D printed samples. Although the paper does not state what machine was used to print the samples it can be inferred that a top-down style was used. This study saw improvements for all fiber volumes, with increased mechanical properties achieved by increasing fiber amount and part shrinkage can be reduced. For a fiber volume of 20% they were able to achieve an increase in tensile strength of 24%, and an 80% increase in the Young's modulus. The top-down vat photopolymerization machine that was employed resulted in the manufacture of composites that were close to unidirectional in fiber orientation due to the scraping step in between layers. While the creation of unidirectional composites is desirable in some applications, the leveling step would prevent the printing of an isotropic part, and therefore could limit potential applications and restrict the printing process based on how the part must be printed.

Along with short glass fibers, there have also be studies that have looked into the use of continuous glass fiber as a reinforcement in vat photopolymerization. One study in particular placed a single layer of nonwoven glass fiber mats, of various thickness, within specimens produced using vat photopolymerization. This was done by pausing the printer at a predetermined build height placing the mat of the specimen and resuming the print. Karalekas D. et al. were able to show an increase in the Young's modulus, but a decrease in tensile strength for thinner mats. For the thicker mats the Young's modulus was shown to decrease, this was contributed to the inability for the photopolymer to fully cure with in the thicker mats. While this study was able to show that continuous glass fibers could be placed into the part for reinforcement, the fact that it was added by hand during the build process is inefficient, especially if multiple layers of fiber are to be used in the manufacturing of a part, and would be difficult for the manufacturing of complex parts.

Thus, there exists a need in the art for an apparatus and/or techniques which solve and/or mitigate the aforementioned problems.

SUMMARY OF THE INVENTION

The following objects, features, advantages, aspects, and/or embodiments, are not exhaustive and do not limit the overall disclosure. No single embodiment need provide each and every object, feature, or advantage. Any of the objects, features, advantages, aspects, and/or embodiments disclosed herein can be integrated with one another, either in full or in part.

It is a primary object, feature, and/or advantage of the present invention to investigate the manufacture of short fiber composites using stereolithography (SLA). The tests described herein can measure fiber dispersion within composites and whether the addition of glass fiber would increase the mechanical properties of the composites. Such investigation(s) and test(s) have revealed that while printing, the surface finish of the specimens are coarse from the glass fibers. Computational fluid dynamics simulations can then be performed to observe flow around the printed parts. The results of these tests show the introduction of glass fibers beneficially increase some properties of the resulting composites. Further investigation involving various fibers and different sizing of the fibers have the potential to increase the mechanical properties found using the methods and apparatuses described herein.

It is a further object, feature, and/or advantage of the present invention to add a reinforcing fiber to the resin matrix. By combining the two materials there is an improvement in the load bearing properties as both the matrix and the fiber support the force exerted on the object. For example, where a standard SLA printer is modified so as to induce a flow field through the resin tank, a 1/32 inch glass fiber content of 15% by volume can be printed in combination with a commercial SLA UV curable resin to increase said load bearing properties.

It is still yet a further object, feature, and/or advantage of the present invention to develop methods of using both UV initiators and thermal initiators so that an object can be initially gelled during SLA printing and then fully cured during a post-cure of the object in an oven following printing.

It is still yet a further object, feature, and/or advantage of the present invention to suspend the fibers thereby allowing for an even dispersion of fibers along the entire part, even in instances where there exists a greater density of fibers in the material (e.g. glass) than those associated with UV resins.

It is still yet a further object, feature, and/or advantage of the present invention to modify the SLA printing process in order to allow a fiber content of 15% by volume to be added to a commercial SLA UV resin.

It is still yet a further object, feature, and/or advantage of the present invention to apply surface finish(es) which positively impact the mechanical properties of each specimen.

It is still yet a further object, feature, and/or advantage of the present invention to evaluate fiber gradient. For example, a scanning electron microscope (SEM) can be employed to determine if there exists fiber gradient in the transverse direction.

It is still yet a further object, feature, and/or advantage of the present invention to enhance tensile strength such that a glass fiber reinforced SLA printed specimen is created which possesses similar or better mechanical properties to that of an injection molded or VAR™ produced specimen.

The techniques disclosed herein can be used in a wide variety of applications, so as to enhance the strength of virtually any object.

It is preferred the apparatus be safe, cost effective, and durable.

At least one embodiment disclosed herein comprises a distinct aesthetic appearance. Ornamental aspects included in such an embodiment can help capture a consumer's attention and/or identify a source of origin of a product being sold. Said ornamental aspects will not impede functionality of the present invention.

The techniques disclosed herein and even further methods can be practiced which facilitate use, manufacture, assembly, maintenance, and repair of 3D printers that accomplish some or all of the previously stated objectives.

Components which facilitate carrying out the aforementioned techniques and methods can be incorporated into systems or kits which similarly accomplish some or all of the previously stated objectives.

According to some aspects of the present disclosure, a method for manufacturing composites comprises suspending fibers within a resin tank holding UV resin; creating a substantially constant flow field of a mixture comprising the suspended fibers and the UV resin from an inlet of the resin tank to an outlet of the resin tank; aligning the suspended fibers in a direction substantially parallel to a direction of flow within the substantially constant flow field; and striking the mixture with a computer-controlled UV laser so as to 3D print a composite.

According to some other aspects of the present disclosure, an apparatus for aligning fibers within a continuous flow field comprises a resin tank holding UV resin and suspended fibers, said resin tank having at least one inlet and at least one outlet; and a pump fluidly connected the resin tank so as to circulate a mixture of the UV resin and the fibers through the resin tank such that the fibers are substantially aligned in a similar direction.

According to some additional aspects of the present disclosure, there are circumstances where mixing fumed silica with the resin can be used to help suspend and align fibers.

These and/or other objects, features, advantages, aspects, and/or embodiments will become apparent to those skilled in the art after reviewing the following brief and detailed descriptions of the drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Several embodiments in which the present invention can be practiced are illustrated and described in detail, wherein like reference characters represent like components throughout the several views. The drawings are presented for exemplary purposes and may not be to scale unless otherwise indicated.

An artisan of ordinary skill need not view, within isolated figure(s), the near infinite number of distinct permutations of features described in the following detailed description to facilitate an understanding of the present invention.

DETAILED DESCRIPTION OF THE INVENTION

The present disclosure is not to be limited to that described herein. Mechanical, electrical, chemical, procedural, and/or other changes can be made without departing from the spirit and scope of the present invention. No features shown or described are essential to permit basic operation of the present invention unless otherwise indicated.

3D printers typically employ a roller to spread out a razor-thin layer of liquid polymer. Since this layer is liquid, it will spread out over the entire platform ensuring that each layer has a consistent thickness. The liquid polymer used is UV sensitive. When struck by a computer-controlled UV laser, the resin will change from a liquid to solid state. The laser draws the outlines of the print onto the resin layer and hardens the parts that it touches. The parts that are not touched by the laser will remain liquid These two steps are repeated over and over and over again. The model is lowered by a fraction, and the roller spreads out a new layer. The laser then solidifies specific areas of that layer, which will become parts of your 3D print. This is repeated until the model is finished.

Once the printing process is completed and the entire object has been printed, the print is raised out of the resin tank. The excess liquid will simply flow away and can be reused for other prints. The prints then need to be removed and finished manually (i.e. remove support structure, smoothen surfaces, spray-paint surfaces, etc.).

Figure 1:
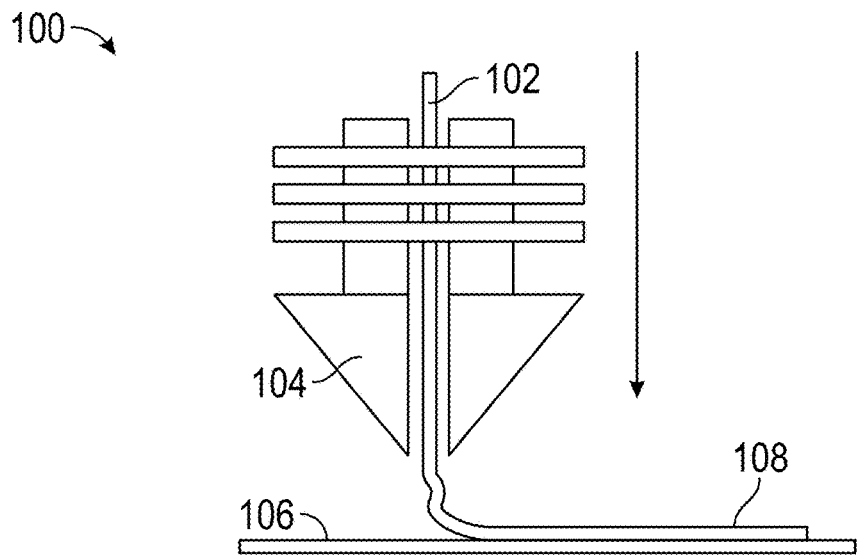
FIG. 1 shows an illustrative view of an FDM printer nozzle.

FDM printing 100 uses a long filament 102 of thermoplastic pushed through a heated nozzle 104 and melts. The melted filament is then laid onto a heated bed 106. The thermoplastic filament then cools and solidifies. As this happens, the thermoplastic polymer begins to shrink. The size of each layer is dependent on the user and how the print is to be made, as shown in FIG. 1.

Stereolithography printers manufacture objects by curing a photopolymer liquid resin into a solid object. During the SLA process a laser path is accomplished by using a computer guided light source, the light source used in these experiments is an UV laser, the resin used is an acrylate functionalized monomer that is polymerized by free radical polymerization. This is similar to DLS but, instead of a laser path it is a projected image on the build plate. The free radicals in the resin are photoinitiated by the UV laser or UV projected image. The laser used must be in the wavelength range of the free radicals or, the resin will not cure properly also, the diameter of the laser must be in the range of the free radicals along with the wavelength.

Figure 2:
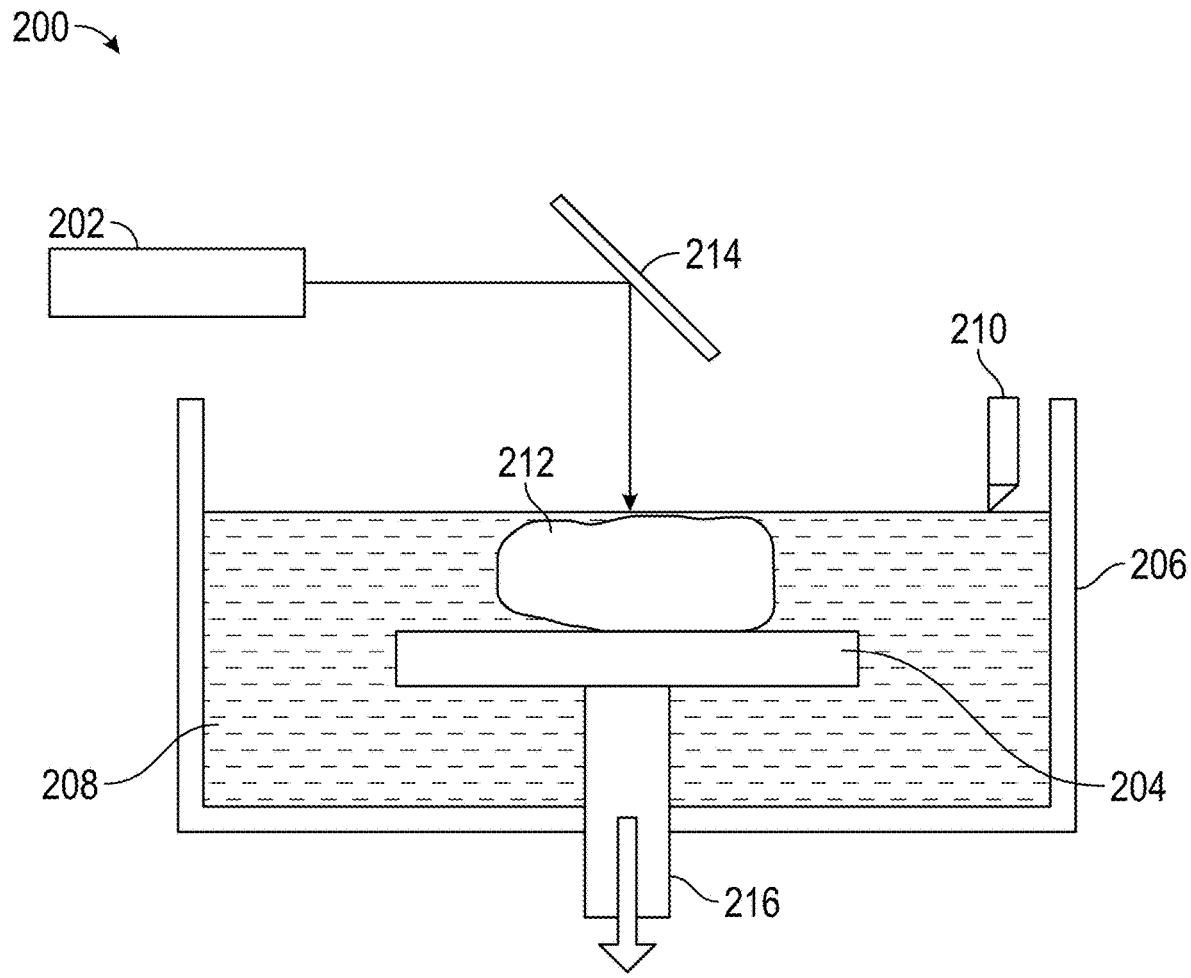
FIG. 2 shows an illustrative view of the components making up a traditional SLA printer.

There are four types of SLA printers that use liquid resin. The first is a traditional top down approach 200, the second is an inverted SLA, as shown in FIG. 2, and the third is a combination of the first and second. The fourth is DLS and has a similar setup as inverted but has a projector instead of a laser.

The traditional SLA printer 200 operates by using the laser 202 on top of the print bed 204. The laser 202 will print layer by layer in a tank 206 of liquid resin 208. After each pass of the laser 202, a recoating blade 210 will cross over the printed object to ensure that a new coating of resin is placed on top of the printed part 212. The print bed 204 lowers after each pass to create the object from the bottom up. An advantage of this type of printer is there is no peel step. One drawback of the traditional SLA printer 200 is the large amount of resin needed to fill the tank. A solution to this problem was to make printers with smaller tanks, but this limits the size of the parts. Another drawback of the traditional SLA printer 200 is that it is more expensive than an inverted SLA printer 300.

Figure 3:
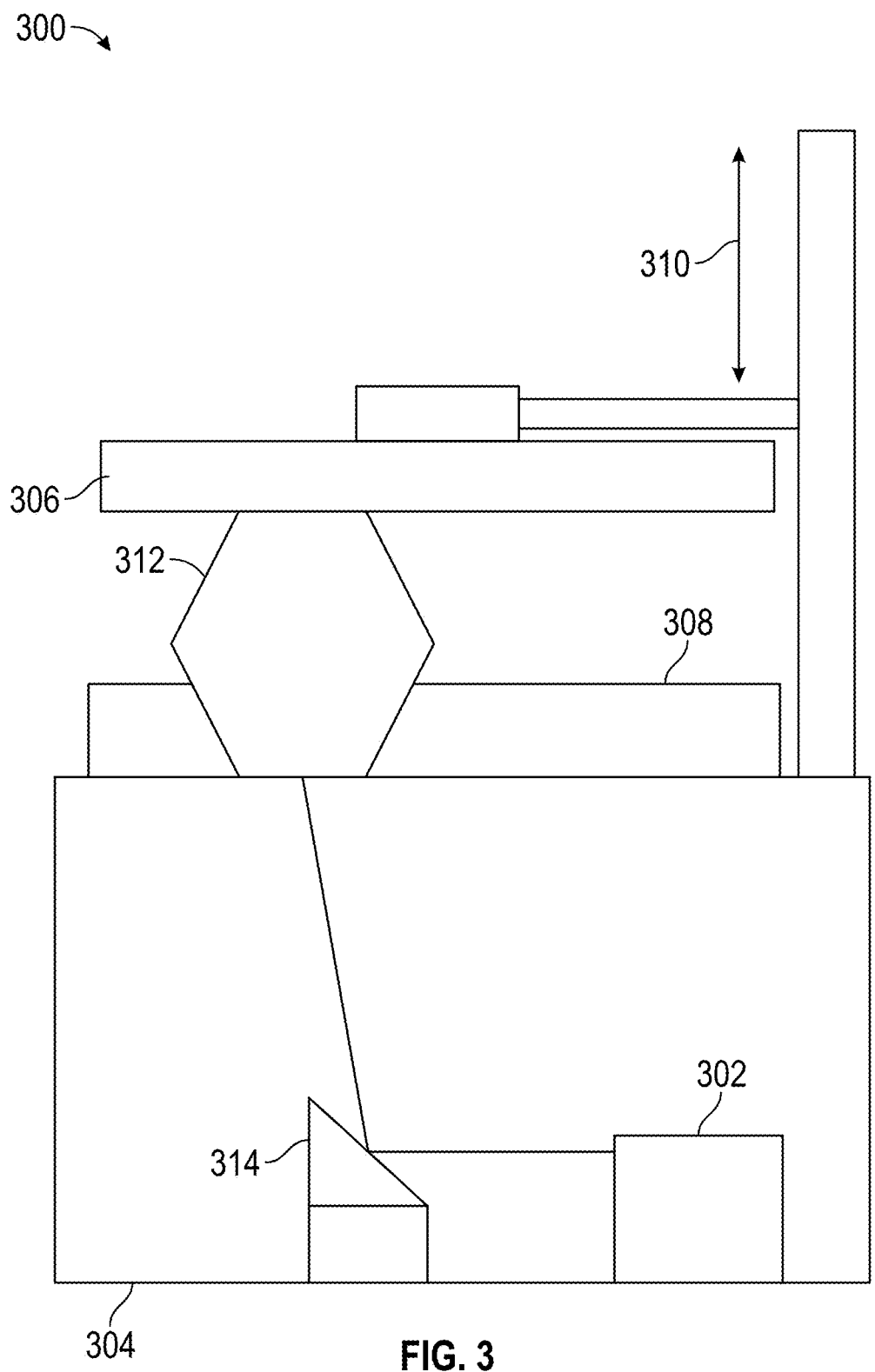
FIG. 3 shows an illustrative view of the components making up an inverted SLA printer.

The second style of SLA UV resin printer is the inverted type 300 as shown in FIG. 3. The main difference between an inverted SLA 300 and a traditional SLA 200 is that in the inverted printer 300, the laser 302 comes up from the bottom.

The inverted approach has different steps that are needed to ensure a successful print. Opposite of the traditional approach, a laser 302 points up from the bottom of the printer bed 304 and the build plate 306 moves up in the Z axis instead of down. The resin tank 308 is much smaller than the traditional approach. Additionally, instead of a wipe step there is a peel step. This peel step is used after every layer is printed. During the peel step of the inverted process, the resin tank 308 will pivot on the X axis to allow for resin to flow underneath the recently printed layer. As this happens problems can occur, if the object being printed is not properly attached to the build plate it will cause stresses on the object being printed. If this happens, there is a potential for the printed object to break free from the build plate. There are settings in some printers such as the one used in this research that allow for this peel step to be manipulated to be either faster or slower depending on what shape of object is being manufactured.

The third type of regularly used printing types is a combination of traditional and inverted. This printing type resembles an inverted printer but does not have the peel step to move the resin. Instead, there is blade that will sweep back and forth in similar fashion to that of a traditional printer. The advantages of not having a peel step is there will be no unneeded stress put on the printed part. The bed of the tank is also made from a different kind of silicone base layer in order to reduce sticking to the tank bed.

The fourth type uses a projector in a process called digital light synthesis (DLS). The DLS process and setup is identical to that of the inverted SLA process. The only change is where the laser would be for SLA a light projector is place. The advantage of this process is the speed at which parts can be manufactured. DLS uses an oxygen permeable window that allows for a unique area called the dead zone. In this area a small amount of liquid resin is in between the solid part and the window. As the light hits the resin it cures to the solid part, but not in the area near the oxygen permeable window eliminating a need of a peel step like inverted SLA. After the part is printed, the part is then placed in an oven producing a final cure. Once fully cured, the final part exhibit a Young's modulus as high as 4000 MPa. This new form of 3D printing also allows for a more predictable and consistent mechanical properties.

Manufacturing with a 3D printer has many advantages, such as speed and total customization. Both these factors have made 3D printing successful. The largest drawback comes with the overall strength of the finished part, increased mechanical properties will allow for a larger range application for 3D printing. The purpose of this research is to find a new way to improve the mechanical properties of these parts. By introducing the fibers to the matrix, it will allow the fibers to take the majority of the force, instead of the low strength/low modulus characteristics of UV resin. Improving the mechanical properties of the finished part will not only help 3D printer hobbyist but could be used for military or medical research and manufacturing.

Beginning the process of combining fiber reinforcement and UV resin matrix, first a proper mixture must be achieved. For example, a 15% volume of fiber to 85% UV resin can be achieved by way, at least in part, of a MATLAB program created to convert the percent volume to a percent weight. The aforementioned two components are placed in a mixer for 15 minutes to ensure that there is a complete mixing of both the fibers and the resin. To increase the complete mixing of the solution a program was made to sonicate the mix. A special apparatus was then constructed and added to the SLA printer in order to maintain a uniform dispersion of fiber among each printed part and to align the fibers in the direction that was preferred.

Any suitable concentration and/or additives can be employed for the mixture. For example, the amount of fiber in the mixture is between about 0.1 wt. % and about 30 wt. %, more preferably between about 0.5 wt. % and about 25 wt. %, most preferably between about 1 wt. % and about 20 wt. % of fiber. Similarly, in a preferred embodiment the amount of fiber in the mixture is between about 1 vol. % and about 40 vol. %, more preferably between about 5 vol. % and about 30 vol. %, most preferably between about 10 vol. % and about 20 vol. %. In a preferred embodiment, the amount of UV resin in the mixture is between about 70 wt. % and about 99.9 wt. %, more preferably between about 75 wt. % and about 99.5 wt. %, and most preferably between about 80 wt. % and about 99 wt. %. In a preferred embodiment the amount of UV resin in the mixture is between about 60 vol. % and about 99 vol. %, more preferably between about 70 vol. % and about 95 vol. %, most preferably between about 80 vol. % and about 90 vol. %.

Glass fibers can also be used. Glass is transparent to UV light and allows the resin matrix to be fully cured. However, because UV resins have a density of 1.19 g/cm^3 and the density of glass fibers are 2.67 g/cm^3, this creates a problem. Because the density of the fibers are so much greater than of the resin, the fibers sink as soon as the tank is stationary. If a print is started there will be an undesirable gradient of fibers throughout the part.

Figure 4:
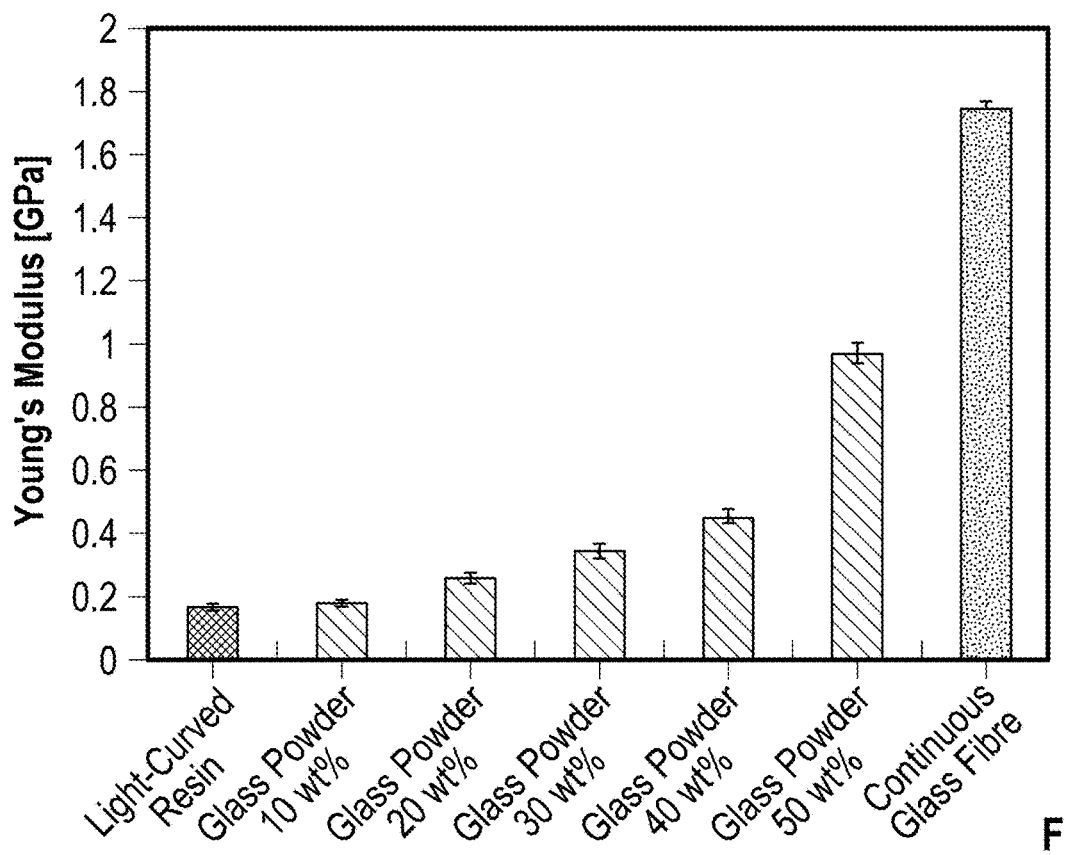
FIG. 4 charts Young's modulus of different fiber volume fractions.
Figure 5:
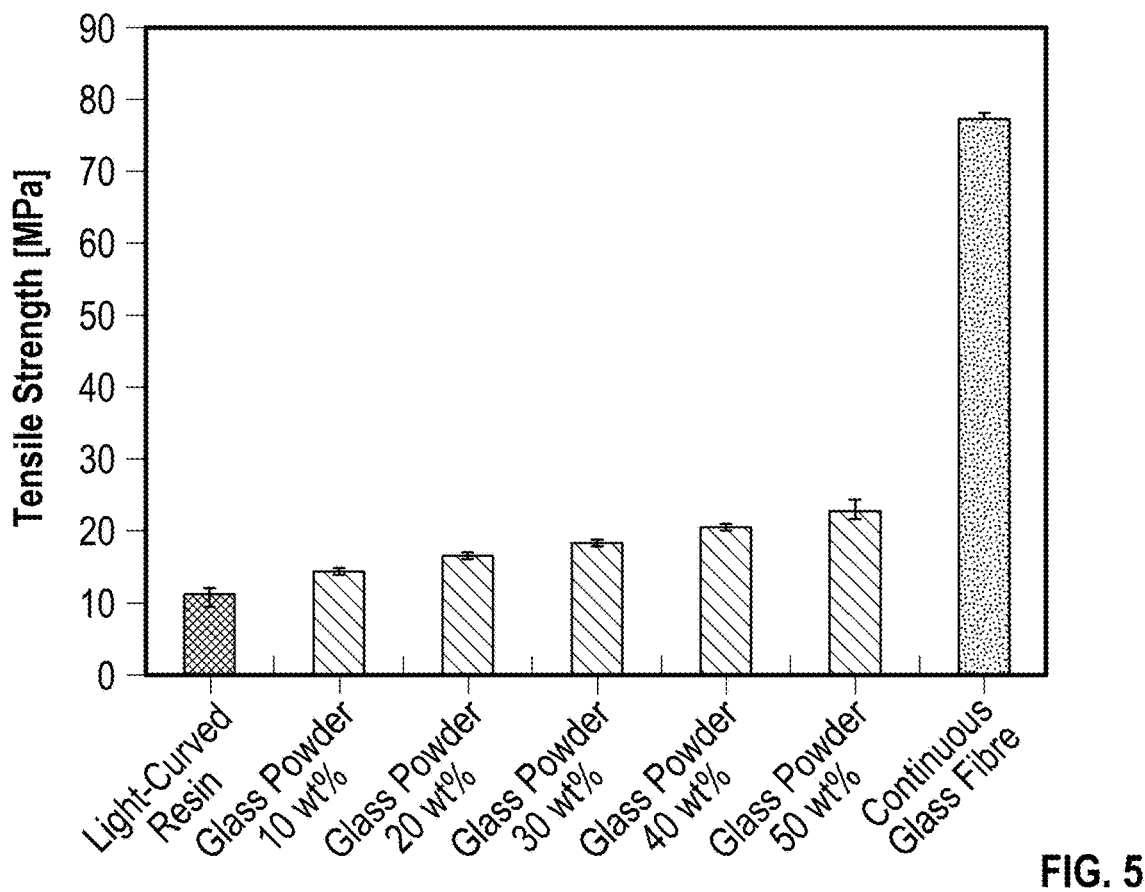
FIG. 5 charts tensile strength at different fiber volumes.

For example, where a fiber volume of 50% by weight of powdered glass was used to print a short glass fiber at a length of 15 mm mixed with a UV curable resin, and the fibers and resin were mixed in a planetary mixer for 10 min at 80 rpm, rest results showed that adding the glass fiber increased the overall mechanical properties of the UV curable resin. Non-limiting test results showing the increase in Young's modulus as a function of glass powder wt. % can be seen in FIG. 4. Non-limiting test results showing the increase in tensile strength, measured in megapascals (MPa), as a function of glass powder wt. % can be seen in FIG. 5. More particularly, the results show the presence of glass fiber increases the Young's modulus of the composite as well as increase the tensile strength.

Further testing revealed the overall quality of the print diminished as percent volume of fibers increased. For example, the dispersion of fiber among the prints can be of concern if the beginning section of the print has a darker color, as this indicates a larger fiber fraction than that of remaining section of the print.

Similar to the SLA process, thermoplastics used in FDM exhibit low mechanical properties without reinforcement. An FDM printer filament can thus also incorporate continuous carbon fiber in a thermoplastic. As a result, the mechanical properties of tensile strength, Young's modulus, and fracture toughness can also be improved. However, when the force is applied in the transverse direction of the fiber, no gain in properties were found. Instead, a small decrease in the properties was observed. Poor layer to layer adhesion also contributed to the decrease in properties with a transverse force.

It is thus important to distinguish between the following fiber types: long 700 and short 600. The difference between the fiber types is the aspect ratio. The aspect ratio is the difference between the diameter to overall length of the fiber. Typical aspect ratios for short fibers 600 are between 20 and 50 and to be considered a long fiber 700 the aspect ratio is between 200 and 500. Although long fibers 700 in composites have higher mechanical properties, short fibers 600 have a wide range of applications in engineering and are easier to process.

Figure 6:
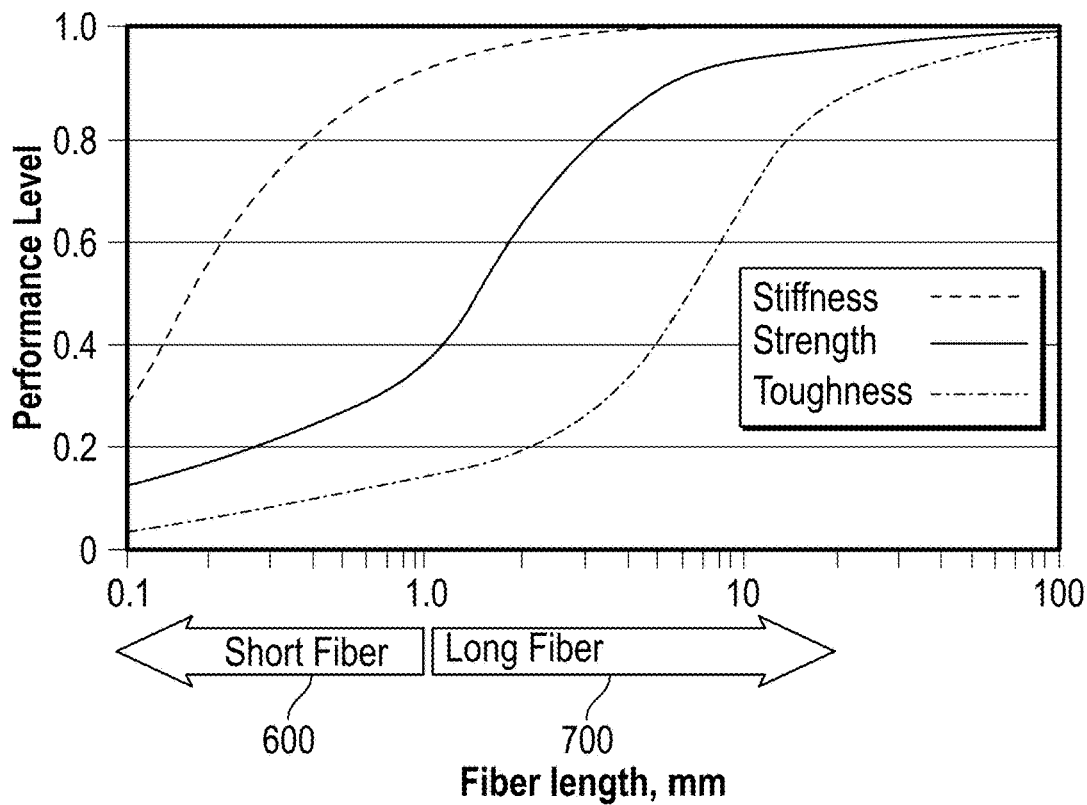
FIG. 6 graphs a qualitative view of fiber length and performance.

Long fibers 700 offer higher mechanical properties (e.g., tensile strength and Young's modulus) when combined into a composite. Long fibers 700 can be found in a wide range of applications, from airplanes to ocean ships. Long fibers 700 add strength to composites. Because the long fibers 700 have a high aspect ratio, they give the matrix more area to attach onto, and this allows for the transfer of force from the matrix to the long fiber 700. If the long fibers 700 are aligned in the direction of the applied load, the long fibers 700 will absorb more of the force. Therefore, less force will be felt by the matrix material. Compared to metals, long fiber composites will be lighter, but still be able to perform the same objective. If a composite is made of long fibers 700 instead of short fibers 600, the effect of creep can also be lowered. Long fibers 700 help eliminate creep by stopping the propagation of cracks inside the composite. When long fibers 700 are added to a polymer matrix higher mechanical properties such as Young's modulus and tensile strength will increase. FIG. 6 below shows a qualitative description of how stiffness, strength, and toughness all increase with the length of the fiber 600, 700.

Working with long fibers 700 can be difficult if the long fibers 700 do not align in the direction that is desired. Long fibers 700 also can entangle with each other, which will make them extremely hard to pull apart or use in any real application. Fiber wet-out can also become a concern when using long fibers in a resin manufacturing process. When the long fibers 700 are not fully wetted out, the expected mechanical properties will not be optimal.

Figure 7:
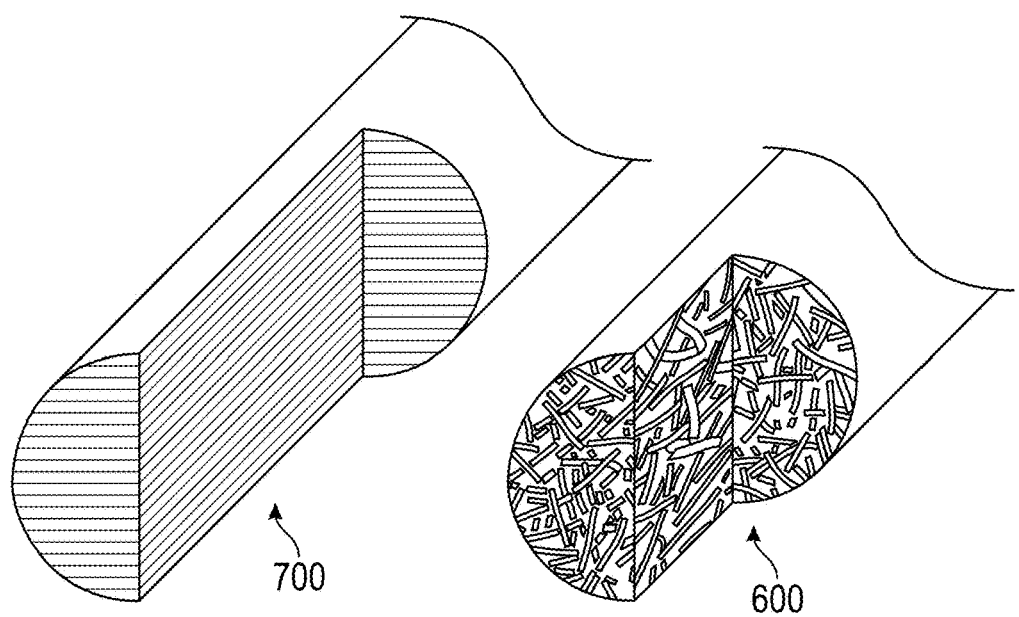
FIG. 7 shows a comparative view of fiber direction of long and short fibers.

Short fibers 600 can be added to most applications that involve thermosets resins. Unlike in long fiber composites, it is difficult to get the short fibers 600 to align in a uniform direction. In the FDM printing type, the short fibers 600 will align in random directions with no apparent order but will be distributed evenly through the composite, as shown in FIG. 7.

The versatility of short fibers 600 is what makes short fibers 600 a great reinforcement to any matrix. It is easy to add them to most plastics, adding only 5% by weight can increase the mechanical properties of the original matrix by up to 25%. There is a large range of different short fibers 600 that can be used. The fibers with the highest tensile strength and Young's modulus are synthetic fibers, but natural fibers can be an inexpensive and effective alternative way to cut cost down and still improve the overall composite mechanical properties.

While adding short fibers 600 to a matrix does improve the mechanical properties, the improvement can sometimes fall short in contrast to what long fibers 700 can achieve. As the fiber length approaches the nano scale, the fibers can agglomerate and act as a particle and not as a fiber. It is possible to keep these fibers apart, but a special manufacturing process must be followed such as sonication. Not all properties are improved when using short fibers 600. If a large percent of the fibers are aligned in the transverse direction of the applied force the overall tensile strength can be decreased. The reason for this decrease in tensile strength is due to the force being applied in the transverse direction, the effective cross-section area of the matrix is reduced from fiber voids. The matrix material has a lower tensile strength than the fibers and will now absorb the majority of the force.

Short fibers 600 are a great reinforcement that can help improve the overall strength of a composite. Different fibers come with different properties. Understanding what fiber should be used will make the composite more efficient. When adding these fibers, it is important to know what mechanical properties the user is trying to improve such as: strength, stiffness, conductivity, etc. Combining two different fibers in a matrix can also make for unique properties that might not be achieved with a single fiber choice.

The disadvantages carbon fiber imposes for many applications can be too large to overcome. The opaque characteristic of carbon fiber cannot be changed. With the elimination of carbon fiber, a new reinforcement was needed to be selected, and glass fiber can be the next best choice. Glass fiber is more than 75% transparent to UV light. This characteristic can eliminate post curing with a thermal initiator. Without a post cure process the presents of voids would be eliminated.

A short glass fiber 600 is able to flow through a 6.4 mm diameter tubing and not hinder the flow or cause blockage. These short glass fibers can come in a range of sizes (e.g., a maximum length of 0.8 mm and a minimum length of being considered a particle, with the average length being two hundred thirty micrometer (230 µm) and the average aspect ratio being one fifth (1:5)). As the fiber flows through the hosing, there is no settling of the fibers and does not hinder the flow. The increase in viscosity of the mixed resin also did not hinder the pump and could continuously pump for over 4 hours without difficulties.

Glass fiber has been used in varying engineering applications. Its mechanical properties are lower than carbon fiber, but still produce high mechanical strengths. Glass fibers are commonly manufactured in three different types: A glass, S glass, and E glass. A glass is short for alkali glass and is commonly used to make jars, containers, and bottles for liquid beverages. A glass is not commonly used in fiber reinforcement. S glass, or structural glass, has the highest mechanical properties among the different types of glass fibers. Being the strongest, it can be hard to come by because it is used in such a large variety of applications. E glass, or electrical glass, is a unique balance between cost and performance. This type of glass is commonly used in aerospace composites and marine applications. It is very easy to buy E glass in most lengths and in large qualities. E glass' moderate to high mechanical properties and availability made can often make E glass the most practical choice.

Figure 8:
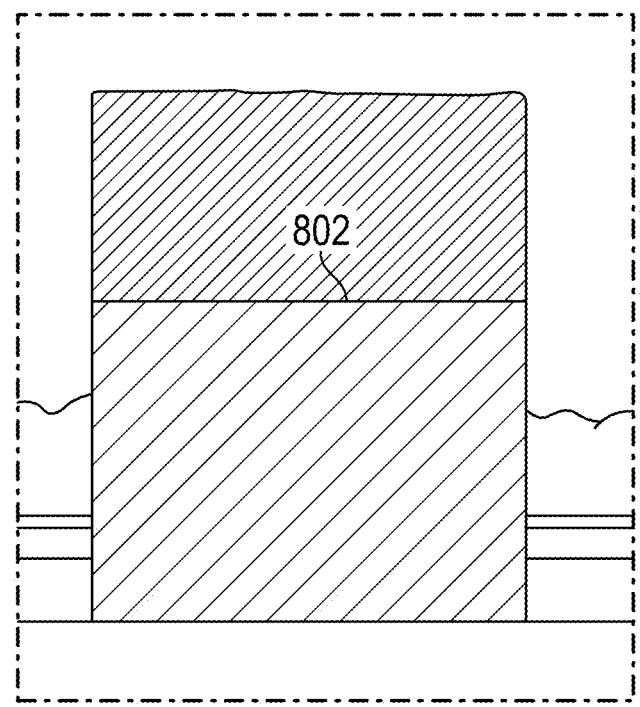
FIG. 8 shows an illustrative view of a fiber dispersion gradient of a non-pumped sample.
Figure 9:
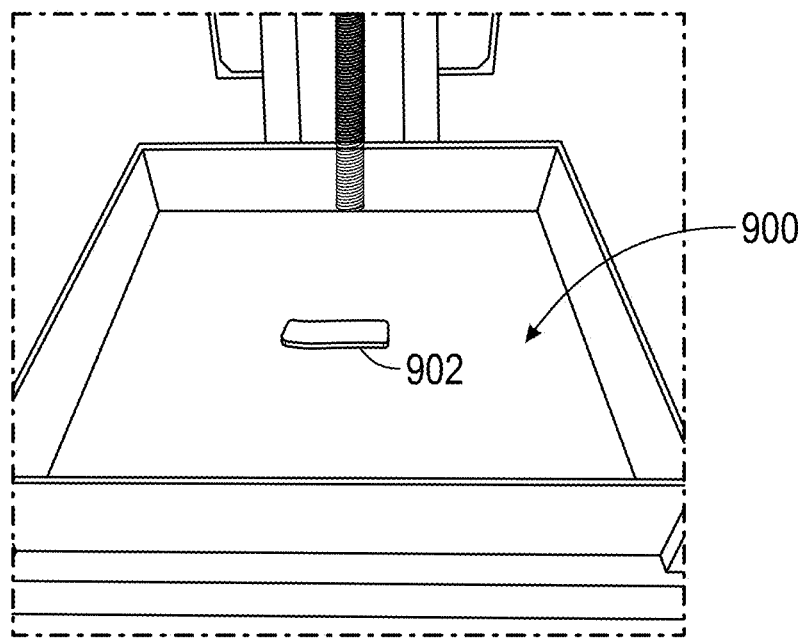
FIG. 9 shows an illustrative view pooling of resin where sample was printed showing no fiber being present.

There is an extreme density different between the resin and the glass fibers (e.g., 1.2 $g/cm^3$ vs. 2.6 $g/cm^3$), causing the glass fiber begin to sink almost immediately after being placed in the resin tank 900 for printing. FIG. 8 shows a gradient of fibers over the specimen 800. The section above the gradient line 800 in FIG. 8 shows, as an example, what gets printed first. Above the gradient line 802 the specimen is darker in color indicating that more glass fiber is present. As the print continues, the fibers begin to sink, and a gradient can be seen. As the fibers begin to sink a gradient could be seen. The results and conclusions regarding the rate of fiber sinking are discussed infra. A small pool of only resin forms as printing continues. Once the fibers have completely sunk to the bottom of resin tank 900 the remaining section 902 can be considered neat, as shown in FIG. 9.

Figure 10:
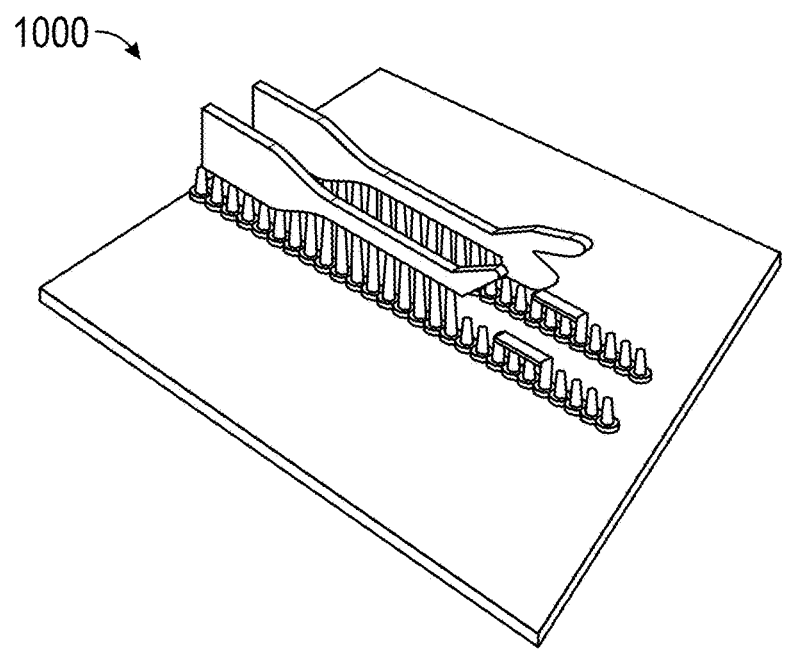
FIG. 10 captures a perspective view of an unsuccessful fumed silica print.

According to one embodiment of the present disclosure, glass fibers can be suspended by adding fumed silica to the glass fibers. It is to be appreciated however that fumed silica can often be too opaque for a UV laser, causing incomplete samples 1000 that are never fully printed, as shown in FIG. 10. It is thus advantageous to keep the glass fibers suspended while also not inhibiting the UV laser. Suspending the fibers allows for an even dispersion of fibers along the entire part.

Figure 11:
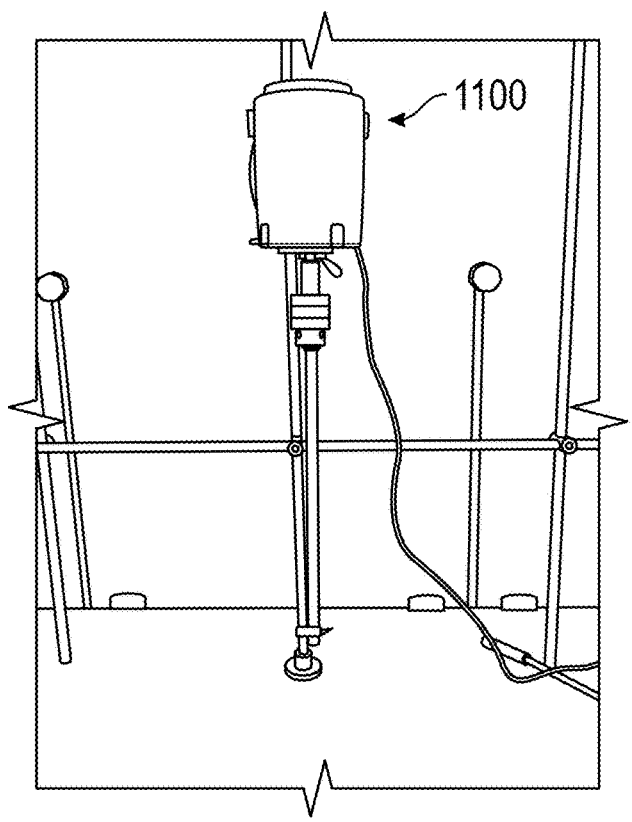
FIG. 11 captures a perspective view of a stirrer in a laboratory.

The glass fibers are difficult to evenly spread into the resin medium. As the fibers are poured into a beaker they agglomerate and become difficult to break apart. These agglomerations will then float near the top of the resin surface. To fix this problem, a twostep process was developed to ensure an even spread of glass fibers. First, the large agglomerations of glass fiber had to be diminished. Second, the large agglomerations had to be broken apart with a plastic stirring rod for approximately two minutes. Once all the large particles were broken up, the beaker would be place under a stirrer with a three blade spinning head. The stirrer 1100 can be seen in FIG. 11.

The combination of the UV resin and glass fibers increased viscosity and the beaker had to be secured to the table. The combination of UV resin and glass fibers would then be placed in the stirrer for 15 minutes at 2000 rpm. As the agglomerations of glass fibers dissipated, the color of the liquid would change from a clear resin with white dots to a consistent light gray color.

The UV resin and glass fiber were mixed so aggressively that air bubbles would get entrapped in the mixture. If the bubbles were not removed, either the samples would be unsuccessful and fail to print, or samples would under preform during testing. Previous research concluded that these small voids would hinder the overall mechanical properties of the prints.

Figure 12:
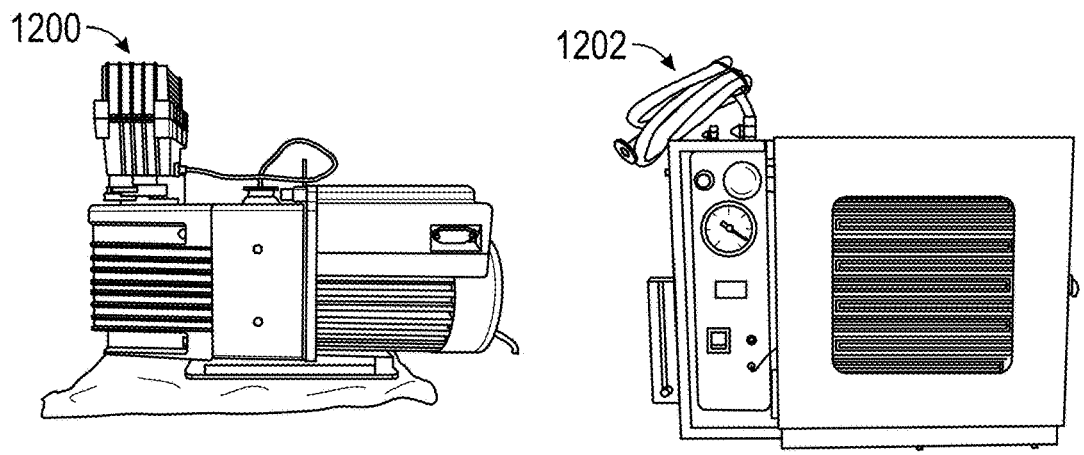
FIG. 12 shows a pump and vacuum oven chamber.

The vacuum chamber 1200, 1202 used in this process was a two-part system that had an external pump housing 1200 operably attached to a vacuum oven chamber 1202, as shown in FIG. 12. The glass fiber resin mixture was prone to foaming at high vacuum pressure. If the vacuum pressure was too low the majority of the bubbles would not retreat from the mixture. To make sure all the air bubbles left the mixture, a vacuum pressure of 15 mmHg was kept for 20 min. At this pressure and time interval, it was clear to see the bubbles evaporated from the mixture. Once all the air was out of the mixture the UV resin and glass fiber mixture would change colors again from a light gray to a darker gray. It is important to note that the mixture would change this color 15 min in the vacuum cycle but to ensure the elimination of all air the mixture was kept in the vacuum chamber 1200, 1202 for an additional 5 min.

Figure 13:
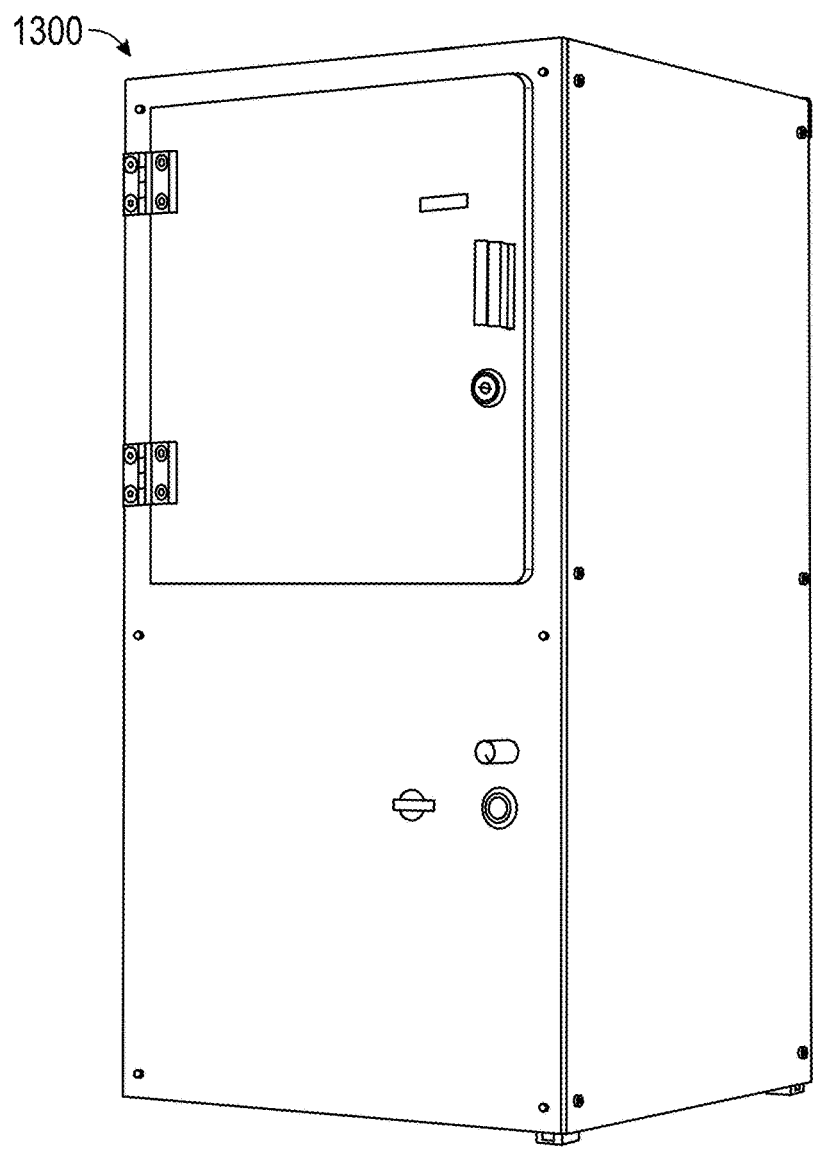
FIG. 13 shows a front perspective view of an exemplary inverted SLA printer.

According to one example, an inverted SLA printer 1300 can be a Moai 130 inverted SLA printer, as shown in FIG. 13. The inverted SLA printer 1300 is preferable because the brand is open source and allows for the ability to customize the printer settings. A particularly beneficial setting to change is the speed of permanent magnet (PM) motor which controlled the speed at which the resin tank 1300 would tilt during the peel step on the x-axis. The PM motor speed was slowed to ensure that the maximum amount of UV resin and glass fiber mixture could travel under the build plate.

Figure 14:
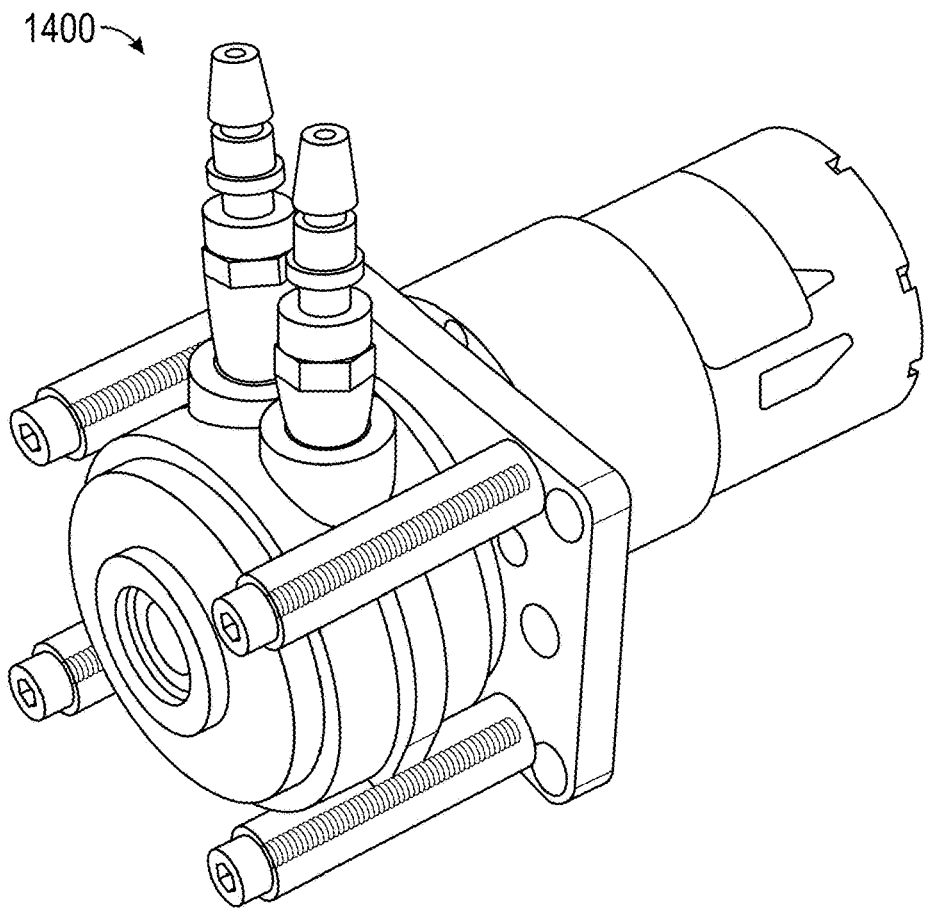
FIG. 14 shows a peristaltic pump used to create flow.

The mixture of UV resin and glass fiber had to be continually flowing. If not, the glass fiber will sink to the bottom of the resin tank. A vacuum pump, such as a self-priming peristaltic pump 1400, can be used to achieve the flow needed, as shown in FIG. 14.

Using a peristaltic pump 1400 has many advantages. First, the peristaltic pump 1400 is very simple and allows for the pumping system to be cleaned easily. After each print, the head of the pump can be detached and the hosing 1200 cleaned or thrown away. The pump 1400 can, as a non-limiting example, be connected to a 12 V 55 A hr. battery. At max output, a suitable motor can achieve pumping 400 ml/min with a hose inner diameter (ID) of 6.4 mm.

Figure 15:
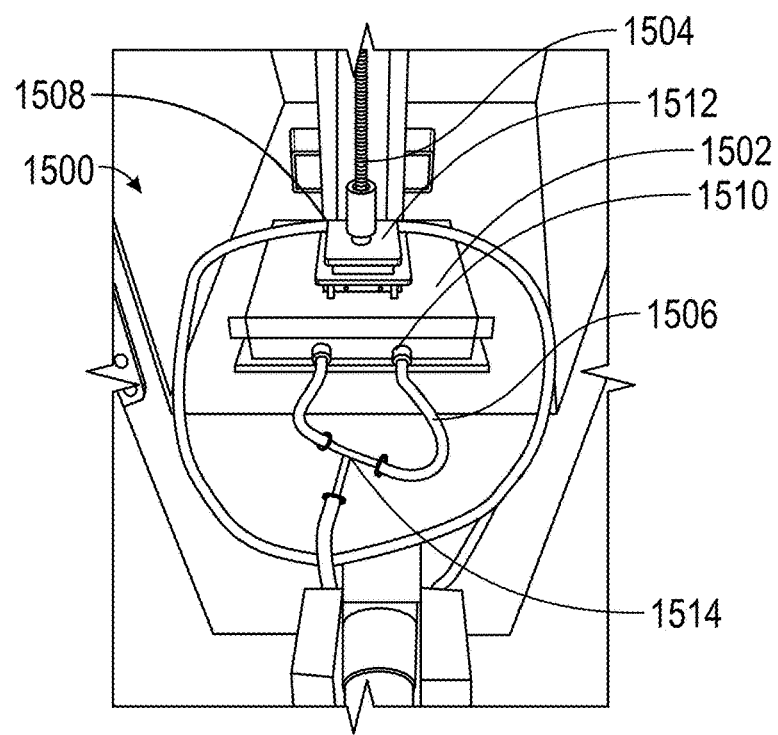
FIG. 15 captures a perspective view of a modified resin tank.
Figure 16:
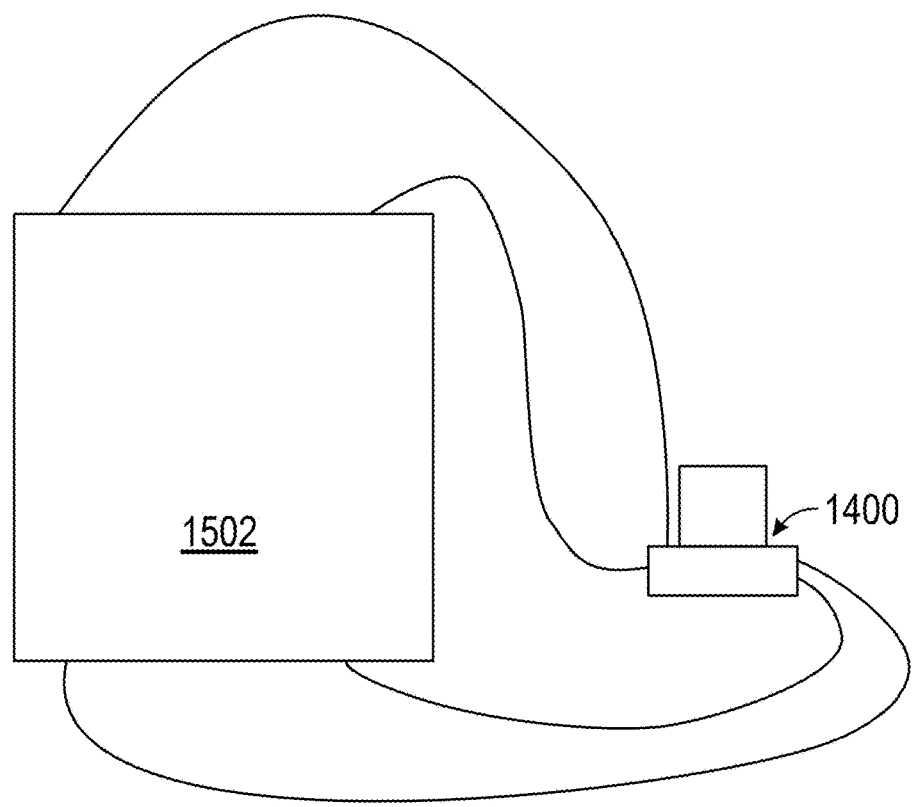
FIG. 16 shows a diagrammatic view of a modified resin tank.

A flow field 1500 was established in the resin tank 1502 of FIGS. 15-16. Particles within the flow field 1500, when the apparatus is turned on, never stop moving and are always suspended, similar to the near-constant flow field in a river.

The resin tank 1502 (e.g., in the printer 1300) had to be modified to allow an inlet 1508, 1510 (depending on flow direction) and outlet 1508, 1510 (depending on flow direction) for the flow. As shown, two holes two inches apart on both the front and the back of the tank were drilled. A ¼" internal diameter pipe fitting pointing outward can fluidly, or even directly, as shown, attach the resin tank to a fluid pump (preferably a peristaltic pump). Hoses 1506 and other suitable fluid carriers can be used in lieu of the pipe fittings. A housing can optionally house the resin tank 1502 so as to provide better stability for attachments.

It is preferable that the fluids in the flow field 1500 are all within the same horizontal plane, so as not to needlessly risk causing points where movement of the fluid substantially approaches zero as a result of having to overcome a gravitational force. Moreover, fluid within the flow field 1500 is preferably laminar where specific alignment of fibers are desired. If for whatever reason a random alignment of fibers is desired, the use of turbulent flow can help achieve the same, and the fluid sped up to a velocity where this is reasonably certain to happen.

It is to be appreciated than any number of inlets 1508, 1510 and outlets 1508, 1510 can be used and drilled in any suitable locations to better effect performance of the apparatus. It is generally preferred however that where there is an inlet 1508, 1510, there will be oppositely located across the resin tank a corresponding outlet 1508, 1510. Moreover, while the use of round inlets 1508, 1510 and outlets 1508, 1510 is shown in the figures, the use of other inlet and outlet geometries is contemplated by the present disclosure, including, without limitation, rectangular configurations and coat-hangar die configurations.

Gates, valves, stops, and the like can be employed so as to prevent flow through any one or more inlets/outlets 1508, 1510. Such gates, valves, stops, and the like can be provided the resin tank the ability to contain a wide variety of resins and fibers which may require different configurations of inlets and outlets for optimal operating conditions.

By using an apparatus according to any one or more of the aforementioned aspects, the orientation of fibers can be controlled. Instead of the fiber moving through the flow field 1500 end-over-end, they are controlled with the constant flow. The advantage of using a constant flow is that the fluid never comes in contact with the working parts of the pump 1400. The working motion of the pump 1400 is a motor that twist a mechanism 1504 that has roller bearings attached to it. As the motor turns the bearings it pushes the liquid through the compressible hosing 1512. The arrow in the diagram below represents the flow from the front "door" side to the back, as shown in FIGS. 15-16.

The UV resin and glass fiber mixture were pumped from the front of the resin tank to the back, all samples had the same flow direction. Green resin can be used to show the setup. All connections can be further secured with zip ties so there would be no leakage or disconnections. Fiber orientation can be changed layer by layer during printing. Specifically, no matter where the reinforcements need to be, the fibers can be aligned on the fly to accommodate. This helps eliminate gradient and help with both fiber dispersion and fiber alignment. Fibers are preferably aligned parallel to expected loads. In some embodiments where the fiber orientation is changed layer by layer, the direction of fiber or filler flow can be controlled so that the fibers or fillers of adjacent layers are perpendicular to one another (e.g., on one layer the fibers or fillers could be flowing east to west and then on the next layer the fibers or fillers flowing north to south, such that a short fiber laminate composite could be printed with this technology).

It is also to be appreciated the exact sizing agent could be used to determine if the mechanical properties observed could have been improved to an even greater degree.

Additionally, improving the interface between the glass fibers and the resin matrix would improve fiber pull out, and this would then allow for more of the force to be absorbed by the fibers and not the polymer matrix.

If new fibers are to be used, the Stoke equations should be considered when determining a new flow rate. The streamlines of the UV resin and glass fibers became more constant as the velocity of the fluid increased.

In at least one embodiment, it is envisioned a 3D printer can accompany a platoon of soldiers in the battlefield. The 3D printers could then be used to manufacture unmanned aerial intelligence surveillance reconnaissance (ISR) and/or robots could then be used to fix broken vehicles. This solution could thus further limit the number of soldiers in any battlefield and lower the chances of causalities.

Examples, Results of Experiments, and Associated Data

Figure 17:
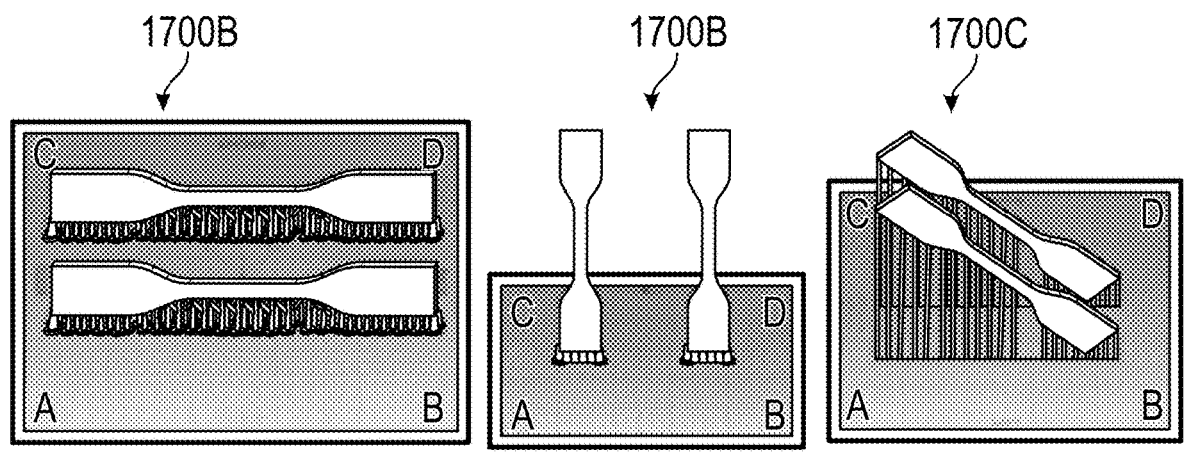
FIG. 17 shows three different print orientations, at angles 0°, 90°, and 45° respectively.

FIG. 17 shows three different print orientations 1700A, 1700B, 1700C, at angles 0°, 90° and 45° respectively. All three print orientations had similar Young's modulus and tensile strength. Printing at 45°, there had to be a large number of stilts printed with the tensile samples, this led to unneeded stress formed during the peel step. FIGS. 18-22 shows three different modifications 1800, 1900, 2200 to the print orientation, each differently effecting the overall strength of specimens produced. Depending on how the print was orientated different composite strengths where achieved. This is due partially because instead of the fibers being aligned, they had a more random pattern.

Figure 18:
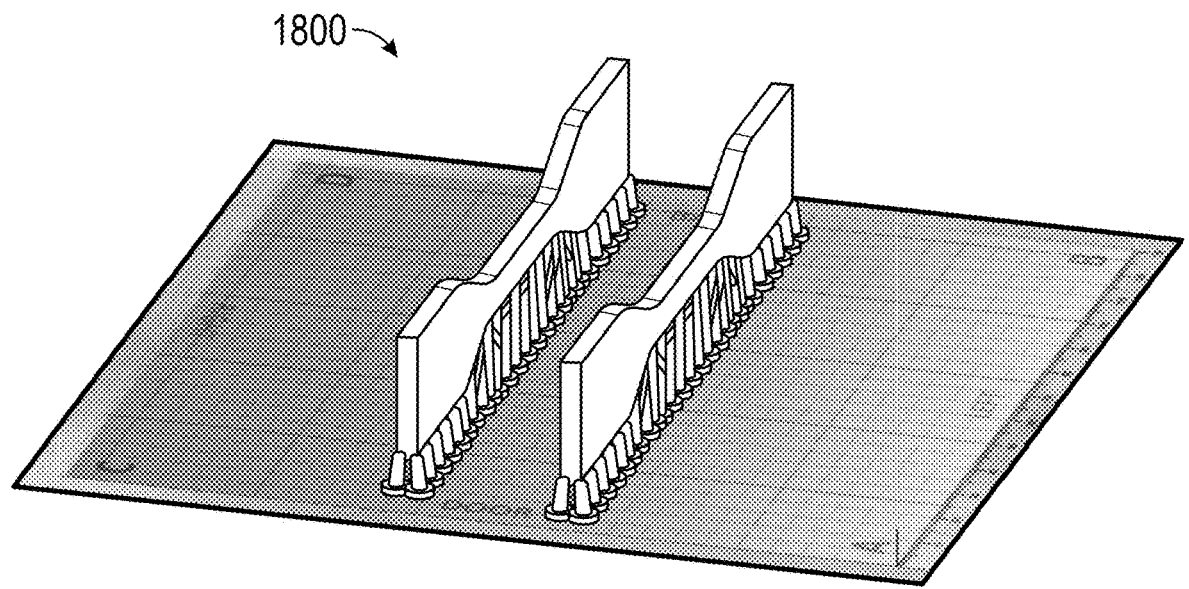
FIG. 18 renders a three-dimensional perspective view of a first, modified print orientation, according to some aspects of the present disclosure.

A first print orientation 1800 is shown in FIG. 18. The placement on the print bed provided the second best strength performance of the aforementioned three different modifications. Because the printer only cures one layer at a time there is never a place that is being blocked. This results in a significant amount of fiber alignment in specimens produced by such prints.

Figure 19:
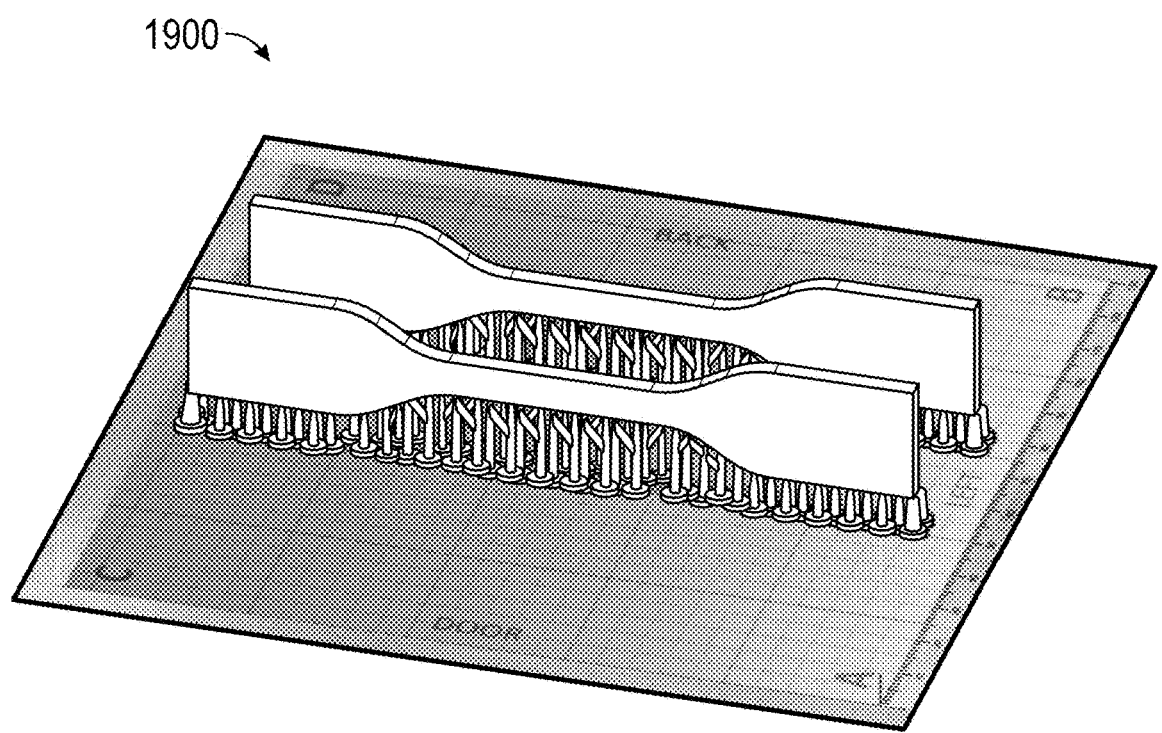
FIG. 19 renders a three-dimensional perspective view of a second, modified print orientation wherein the samples was rotated 90° to try and make the fibers aligned in the parallel direction of the flow field according to some other aspects of the present disclosure.

The fibers in the first modification were not aligning in the direction. Thus, samples were rotated 90° to try in a second modification 1900 and make the fibers aligned in the parallel direction of the flow field (e.g., flow field 1500), as shown in FIG. 19.

Figure 20:
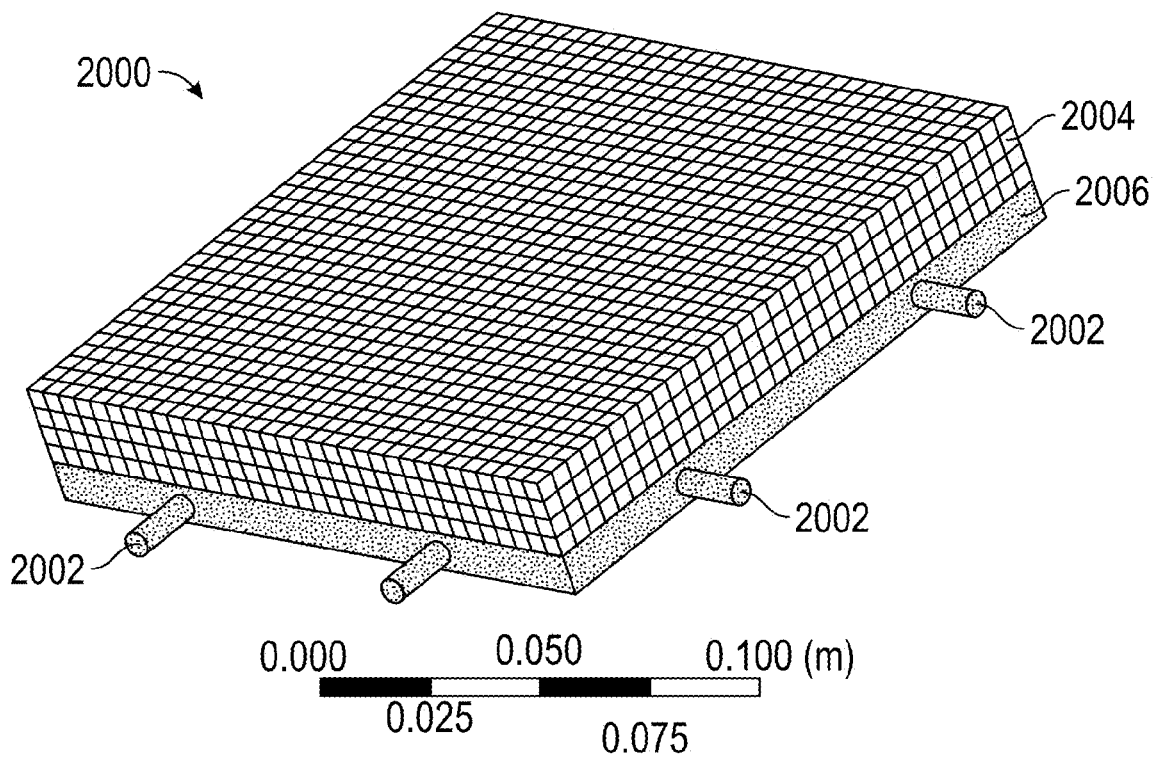
FIG. 20 renders a perspective view of an initial mesh setup.

It was discovered that the flow field is at its weakest in the middle of the print bed 2006. Also, the print of the sample in front has a potential to hinder the flow field to the second sample. First, the specific properties of the fluid had to be found to make better analysis and a top air layer 2004 was made in case of any interaction to the field, as shown in the initial mesh setup 2000 of FIG. 20. In FIG. 20, eight (8) different ports 2002 can be seen. Transverse and parallel prints to the flow were examined, to do this opposite inlets and outlets were turned on or off.

According to some other aspects of the present disclosure, computational fluid dynamics (CFD) simulations (e.g. simulation 2100 of FIG. 21) and a series of five different testing procedures were conducted on the printed samples. The five were: gradient and density testing, dynamic mechanical analysis (DMA), tensile testing, flexure testing and notched fracture testing. These tests were performed to find unity in printed parts and to determine which mechanical properties changed with the added glass fiber.

Figure 21:
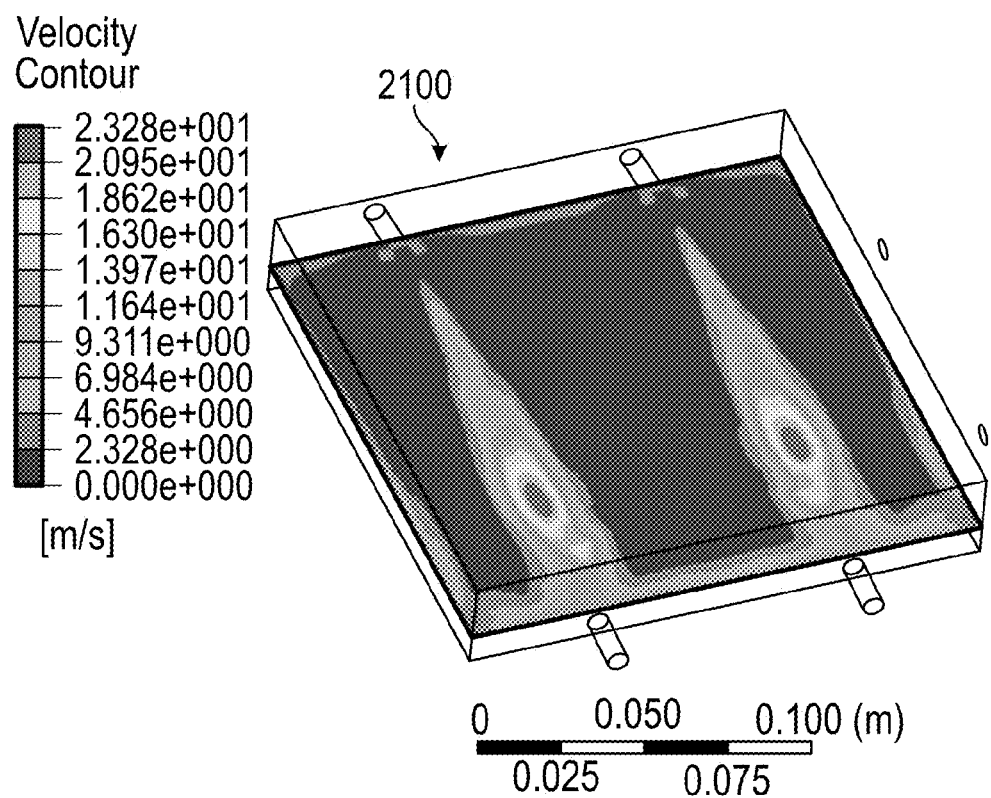
FIG. 21 shows computational fluid dynamics (CFD) analysis of the initial mesh setup of FIG. 20 wherein a top air layer was made in case of any interaction to the field.
Figure 22:
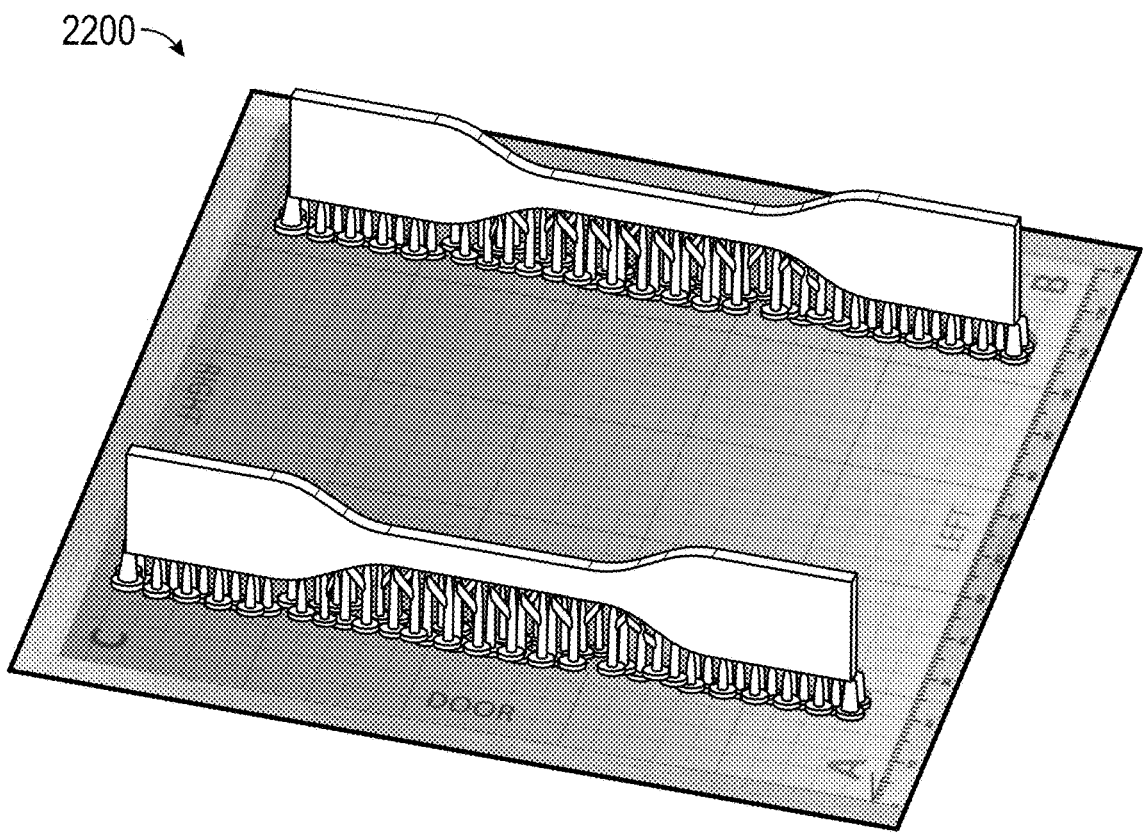
FIG. 22 renders a three-dimensional perspective view of a third, modified print orientation wherein the samples are separated a further distance than those appearing in FIG. 7, according to some further aspects of the present disclosure.

CFD is a powerful tool that allows the user to see different flow lines and the velocity in a working fluid. Using CFD, fourteen (14) different cases were examined to determine if flow acted in aligning the fiber. All simulations were conducted using a flow rate of 3.52 g/s, based off the flow rate of the pump and density of UV resin and glass fiber mixer, as shown in FIG. 21. All the simulations had the same boundaries conditions of a five-sided box with the top open. A tetrahedral element type was used to ensure a high-quality simulation. Each simulation varied on the total number of elements, the simulations that involved samples printing at zero micrometer (0 μm) and one hundred micrometer (100 μm) from the bottom of the resin tank had a total element count around 705,000. The simulations where the samples are angled had an element count around 2,330,000.

Furthermore, as shown in FIG. 21, CFD reveals the field is strong at the inlets but begins to slow down right around the middle of the vat. Thus, this is the cause of the lower strength in the test samples.

The third modification 2200 to the print orientation has the highest strength. In this iteration the samples were printed at the far back and close front as seen below in FIG. 22. It was concluded that this orientation had the highest strength because there were glass fibers aligned in the perpendicular direction of the flow. Thus, to provide more strength it becomes apparent the object is to align the fibers in the direction wanted to have the highest strength, such as in the direction of an expected load.

Glass fiber is not the only kind of fiber that can be used in this technique. Carbon, aramid (e.g., Kevlar®), basalt, copper, boron, aluminum, chromium, microspheres, platelets, bast, flax, hemp, other natural fibers, and/or other opaque fibers can be used. These fibers might not be able to have a weight percent that the glass fibers have but there is still a process in which they can be used. Since the UV light cannot pass though these other opaque fibers, a thermal initiator must be mixed in with the UV resin. After printing the composites must be placed in an oven at a temperature of 60° C. so that the thermal initiator can produce a final cure. As long as the fibers are small enough to not hinder the flow, any reinforcing fiber may be used in this technique.

Without a flow field present in the resin tank the glass fiber began to sink within minutes. Visual tests and density calculations were performed to ensure the fibers were an evenly spread. A scale was used to weigh four pieces from four different sample pieces. Using a density determination kit, the densities of all the samples were recorded.

According to another embodiment, two materials can be utilized in combination: the first was Peopoly® UV resin; and second was ⅟32 inch (0.8 mm) milled E glass fiber. The data sheet for the glass fiber indicated the fiber had a mean length on ⅟32 inch (0.8 mm), an aspect ratio of 1:16, and a cationic sizing agent. The exact sizing agent used on these glass fibers was determined using the sizing as cationic and designed from epoxy based resins. One of the most used sizing agents used on glass fiber is aminopropyl triethoxy silane, which can be easily turned cationic. This compound is also used regularly on E-glass fibers. After observing the glass fibers under a microscope, it was determined that the true mean length was closer to two hundred thirty micrometer (230 μm) and an aspect ratio of one fifth (1:5). Upon further investigation and communication with the manufacturer, the mean length and aspect ratio are different because the manufacture used a ⅟32 inch (0.8 mm sieve), meaning that all particles that size or smaller fall through the holes. The UV resin used was standard Peopoly® acrylic based UV SLA resin. The ⅟32 inch (0.8 mm) milled E glass was chosen for two reasons. The first, E glass is a strong milled glass, easiest to purchase, and retains high mechanical properties. Second, fiber longer than ⅟32 inch (0.8 mm) had the potential to build up and clog the 6.4 mm diameter hosing used.

The specific printer (e.g., printer 1300) used was the Moai 130 SLA printer manufactured by Peopoly (the company having registered the mark Peopoly®). The standard clear Peopoly® UV resin was used in these experiments and can be used in similar experiments.

Immediately after the printing process was complete, the prints where washed with 95% ethanol to remove and any UV resin build up. The supports of the prints were also kept in place until after being heated in the UV oven.

Figure 23:
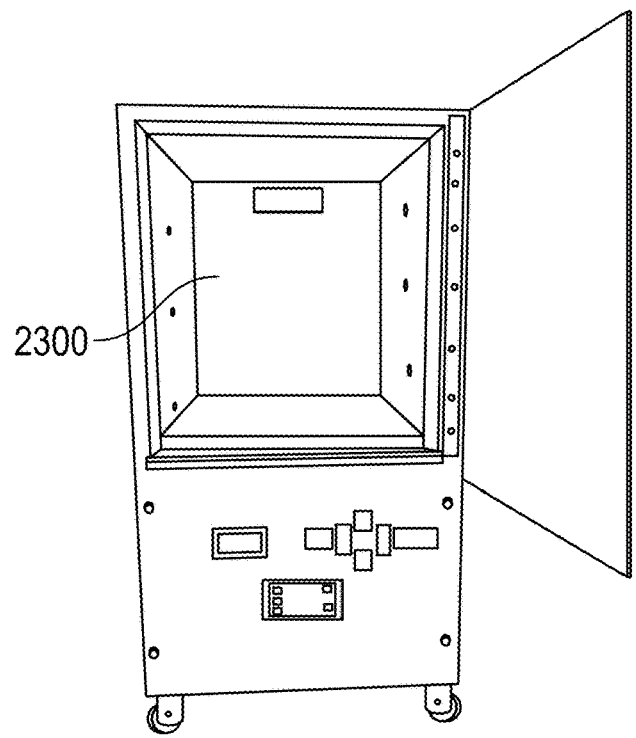
FIG. 23 shows a perspective view of a post curing UV oven.

To ensure a full cure, all prints were placed in a UV oven 2300 for sixty (60) minutes. The oven consisted of three twenty-five (25) W LED UV lights, a heating element, and a rotating base. The rotation of the bed allowed for all side of the prints to be illuminated by the UV Lights, as shown in FIG. 23.

Figure 24:
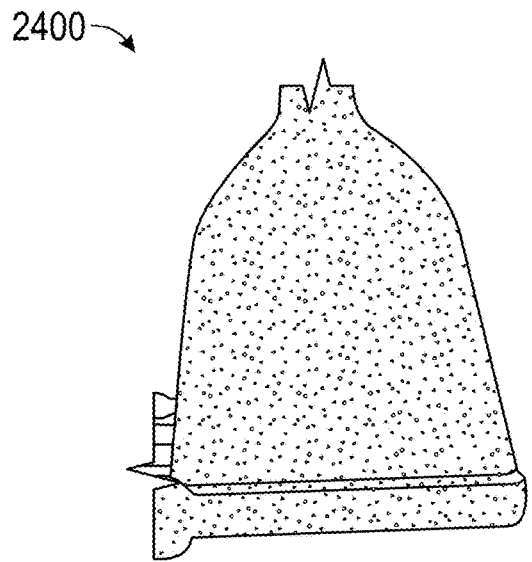
FIG. 24 captures an illustrative view exemplifying surface roughness.

The surface finish of the print will impact the mechanical properties of each specimen. For example, as shown in FIG. 24 the overall surface of the example specimen 2400 can have a very rough and sand paper like feeling. This occurs because the glass fiber that is used is sometimes not complete covered by the laser and therefore protrudes slightly out of the original shape of the print. The white parts that can be seen are the fibers sticking out from the original print.

Figure 25:
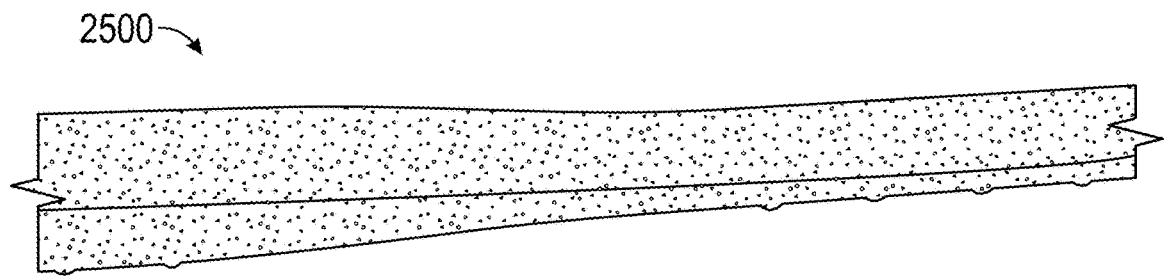
FIG. 25 captures an illustrative view exemplifying poor curve fitting.

Similarly, because SLA printers print layer by layer, there can also be a problem when looking at different curvature, as shown with the example specimen 2500 of FIG. 25. Unlike the surface finish, a poor curve printed can be a major problem. As shown in FIG. 25, the curved portion of a dog bone tensile sample includes small white lines are layers of the print. Each one of those lines can create a stress concentration point. Samples have also been observed breaking along the curved portion of the sample instead of flat gauge section.

Figure 26:
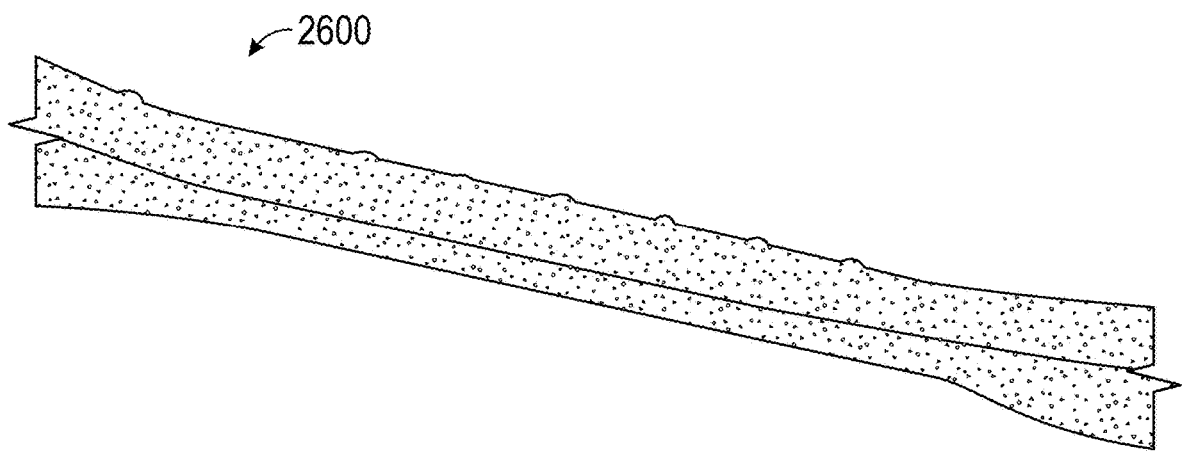
FIG. 26 shows an illustrative view exemplifying dimpling.

Support structures must be made in order to hold the specimen as it is being printed. Before testing can occur, these supports must be removed. The process of extracting the specimen from the supports can sometimes be harsh on the integrity of the specimen. The supports are cured onto the specimen just like any other layer. To remove the supports, first the supports must be carefully broken off and then sanded to make the supports flat. It can be very difficult to make the specimen completely flat resulting in dimpling, as shown with the example specimen 2600 of FIG. 26.

The dimples also create stress concentration points similar to the layer to layer curving seen above. Sanding can help to remove the dimple but only so much can be taken off before other problems arise such as curving the gauge section or putting too much stress on the gauge section while sanding. The prints were first sanded with a 60-grit piece of sandpaper to remove the larder dimples, followed by a 150-grit to smooth the surface.

Figure 27:
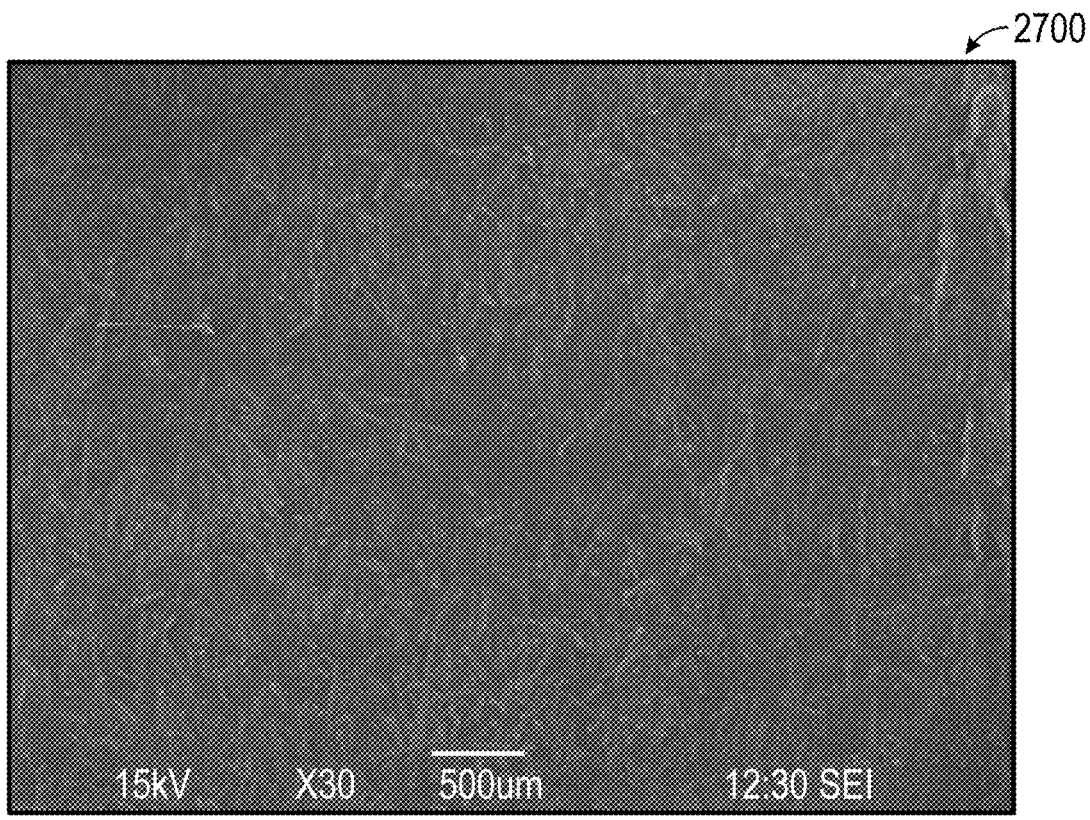
FIG. 27 shows a photographic view, produced with a scanning electron microscope, exemplifying gradient.
Figure 28:
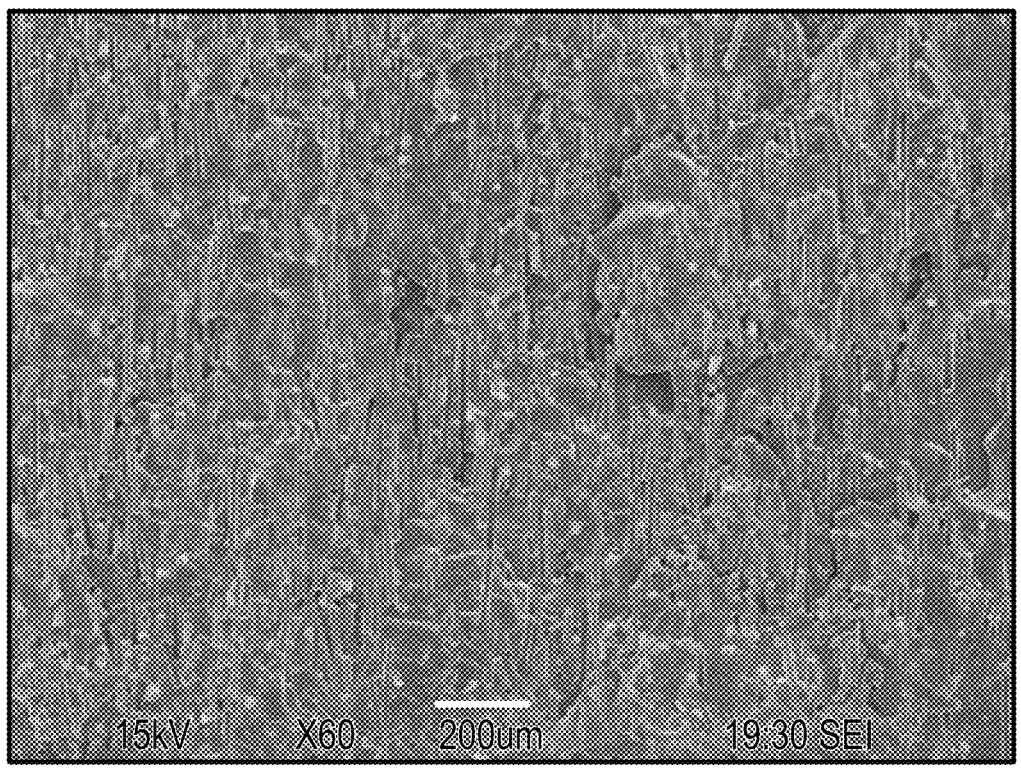
FIG. 28 shows a photographic view, produced with a scanning electron microscope, exemplifying substantially no gradient.

A SEM can be used to see the alignment of the fiber and to evaluate if there is a fiber gradient in the transverse direction, as shown in FIGS. 27-28. In FIG. 27 there is a larger density of fiber on the bottom of the picture indicating that there is a gradient and not a proper fiber dispersion along the entire sample. This creates problems when performing tensile testing because only part of the sample is supported by the fiber reinforcement. A more equivalent dispersion of fiber can be seen in FIG. 28 and the fibers are also aligned. This is what is desired from this newly modified process and is continually looked for in these specimens.

Figure 29:
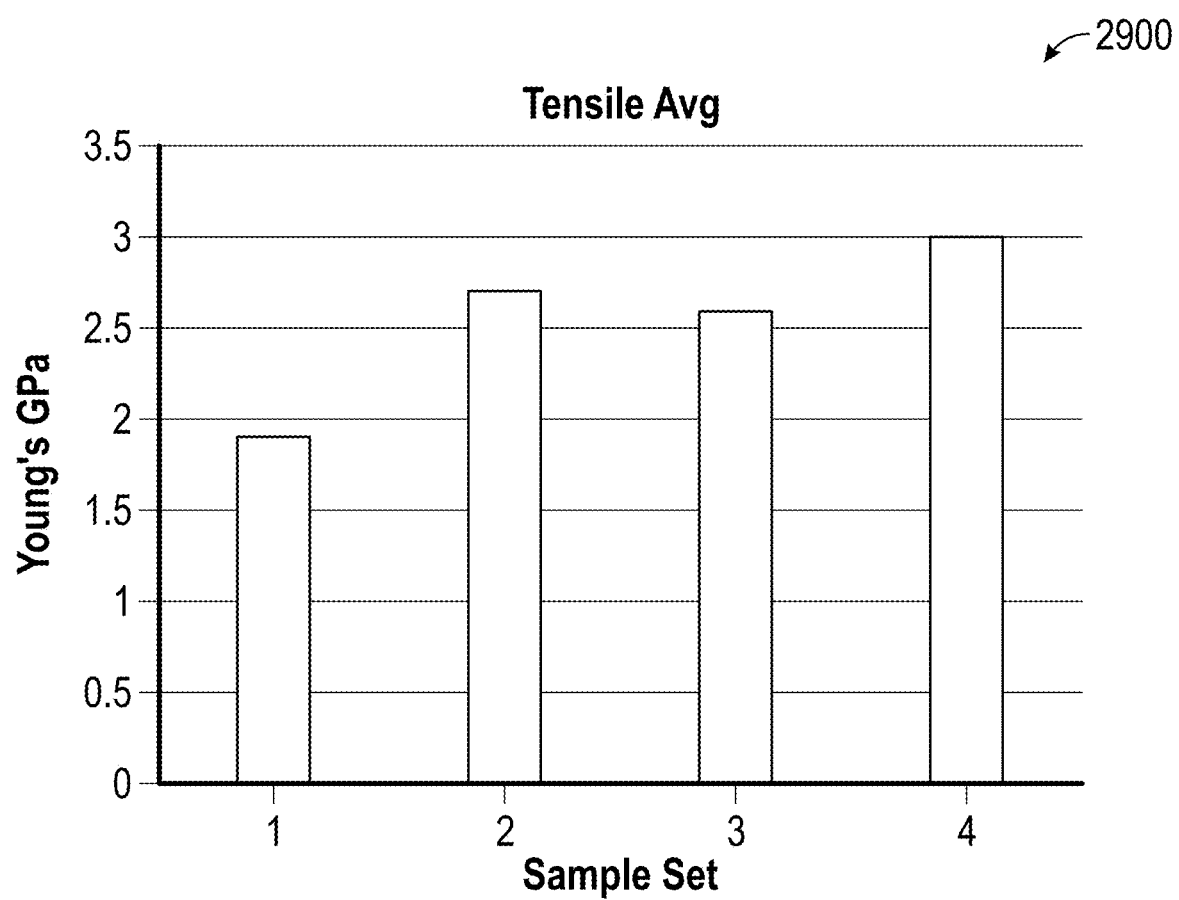
FIG. 29 graphs tensile strength associated with those specimens produced with no modification; the first, modified print orientation of FIG. 18; the second, modified print orientation of FIG. 19; and the third, modified print orientation of FIG. 22.

The density can be a good indicator of the fiber gradient in each specimen. The theoretical density is 1.412 g/cm$^3$. If the specimen being tested is below that number one can infer that there is a gradient of fiber and not an equal dispersion of fiber. There have been 4 different process modifications made so far, which have resulted in different density and measured Young's moduli indicated in the bar graph 2900 of FIG. 29 and Tables 1-2 below.

TABLE 1

Densities of Specimens

| Process | Density g/cm^3 | Gradient |
|---|---|---|
| No Modification | 1.26 | Yes |
| Modification 1 | 1.39 | No |
| Modification 2 | 1.40 | No |
| Modification 3 | 1.9 | No |

TABLE 2

Tensile Avg.

| Process | Young's Modulus |
|---|---|
| No Modification | 1.9035 GPa |
| Modification 1 | 2.704 GPa |
| Modification 2 | 2.59 GPa |
| Modification 3 | 3.01 GPa |

Taking the average of each specimen made in each process it can be observed that no modification produces a gradient. This correlates to the SEM pictures taken as well. From this data it can be seen that the first modification 1800 and the third modification 2200 are the best options to move forward with.

Working Examples

A viscosity test using a viscometer was performed to determine if the fluid would be too viscous for the pump to handle. DMA was performed to evaluate whether a similar degree of cure was achieved between the neat resin samples and the glass fiber reinforced composites. ASTM D5418-15 was followed. Three samples of both neat and glass fiber reinforced were needed for this test, using the dual cantilever mode DMA. Each sample was printed at 60×13×4 mm to fix in the dual cantilever grips. The test parameters went as follows: temperature range of 30° C. to 150° C., with a frequency of 1 Hz, amplitude of 15 μm, and a heating rate of 1° C./min.

The three print orientations were manufactured and tested. This was done to determine if different orientations could induce alignment of the glass fibers. There is no direct ASTM standard for tensile testing of 3D printed parts. A combination of both ASTM D638 and ASTM 3039 were used. Five samples in each orientation, five neat samples, and five samples without a pump system were tested. Similarly, there is no direct ASTM standard for 3D printed parts for flexure testing, therefore ASTM D790 were used.

The last mechanical testing conducted on the samples was a notch fracture test to find the fracture toughness. This test was carried out using the ASTM D5045 standard.

A scanning electron microscope (SEM) was used to find quality of the prints and fiber pull out. Multiple samples from print orientations PF, TF, and TFW were examined. The surfaces examine included, down the longitudinal edge of the glass fiber reinforced tensile samples, on the fracture surface of the glass fiber tensile samples of glass reinforced, and on the fracture surface of the neat flexure sample. To prepare for SEM images, first the samples where coated in a conductive layer of gold using a Cressington 108 auto sputter coater. From here, the coated samples where attached to a cylindrical aluminum mount with a colloidal-silver paste. To obtained images a JEOL JSM-6490LV scanning electron microscope operating at an accelerating voltage of 15 kV was used.

The results of the following simulations helped to show where the streamlines appeared. It was important show whether the streamlines travelled underneath the specimens being printed or whether the streamlines travelled around the specimens.

Figure 30:
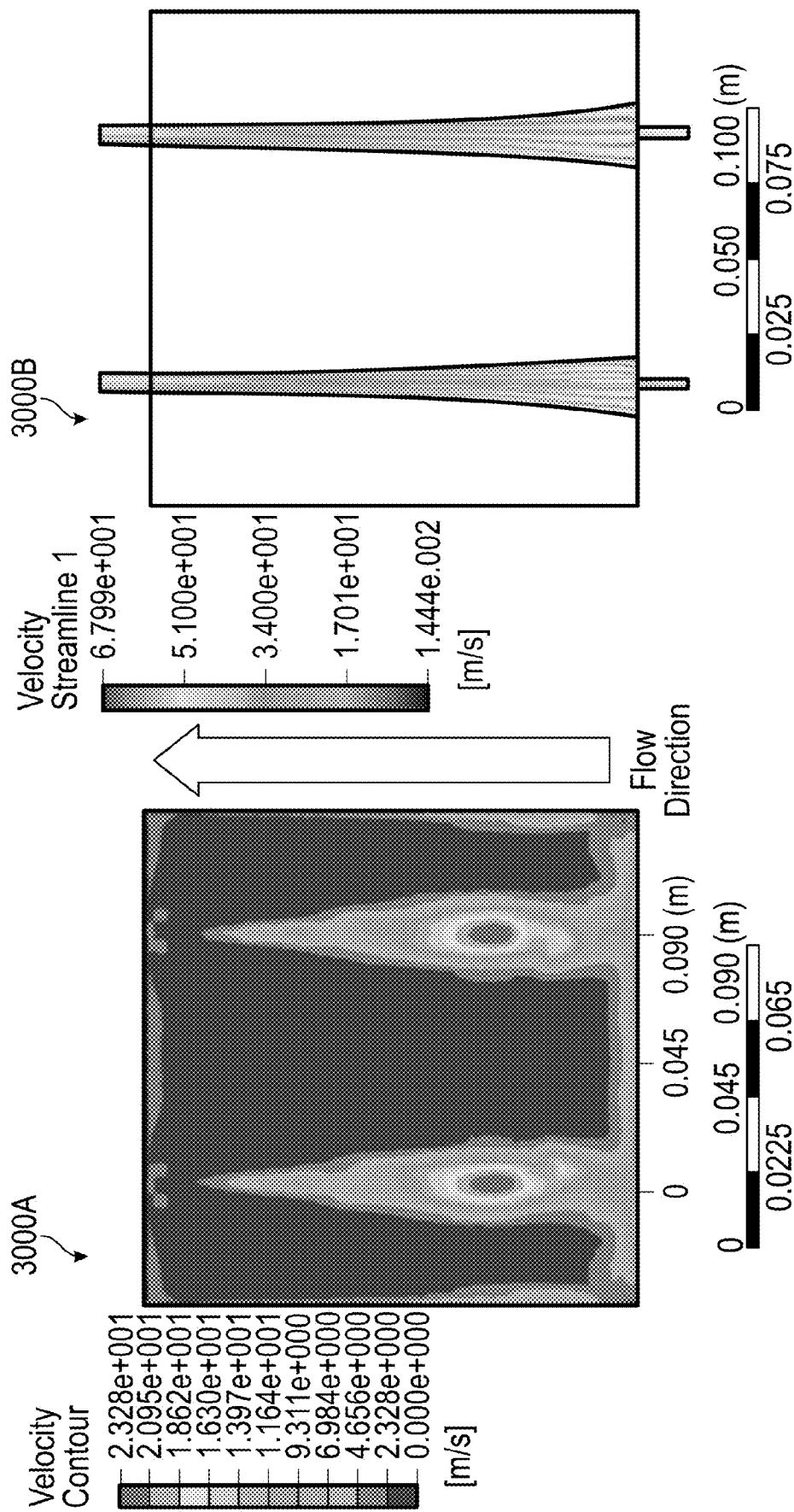
FIG. 30 shows an analytical view of a baseline of a resin tank filled only with UV resin and glass fibers.

A baseline (e.g. flow 3000A) was needed in order to show the flow field when only the UV resin was present in the resin tank. This was important because being able to see if there was a flow to begin with would determine if more simulations where needed. FIG. 30 also shows the flow when only the UV resin and glass fibers are present in the tank without an object being printed (e.g. flow 3000B).

Figure 31:
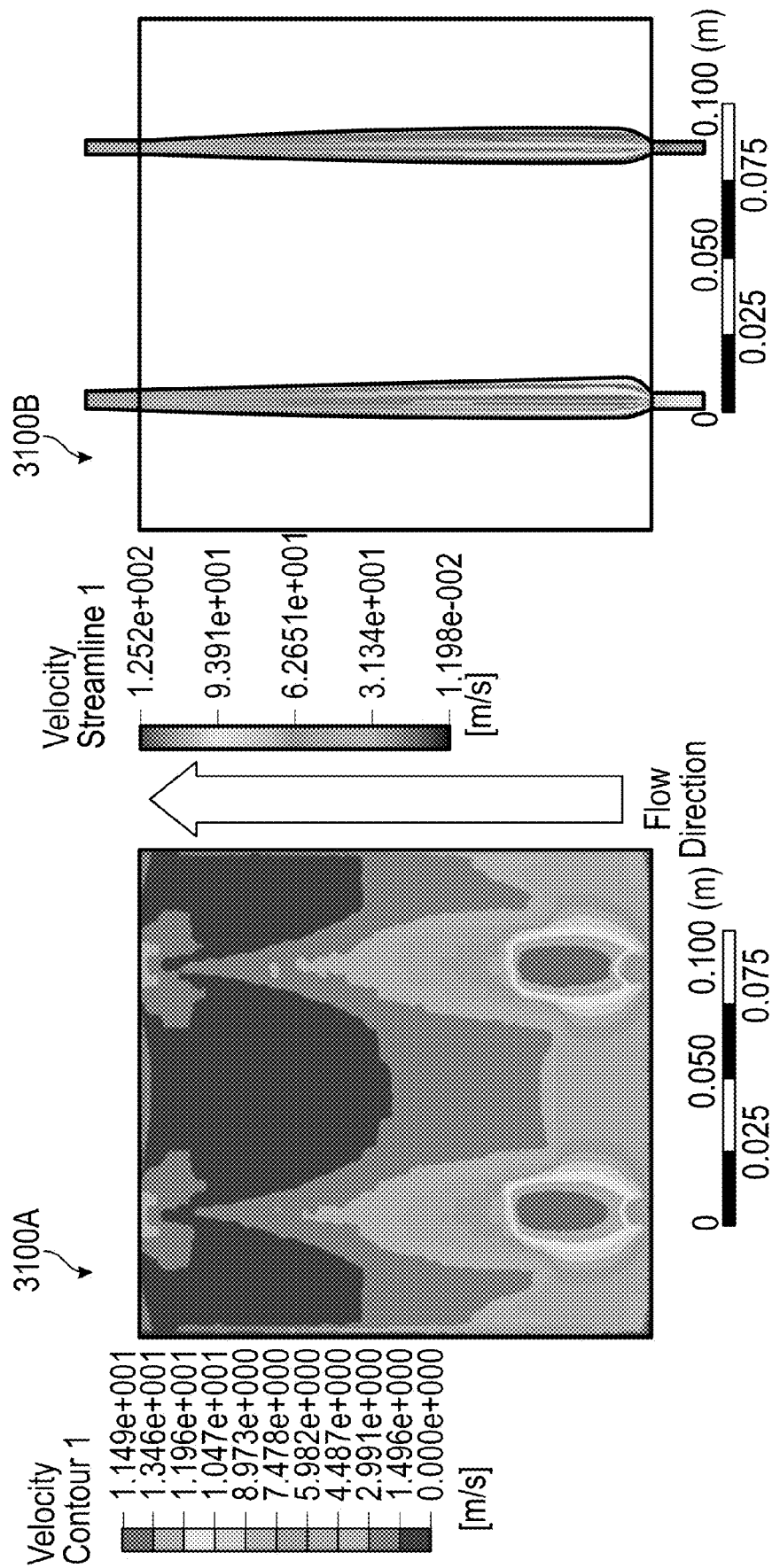
FIG. 31 shows an analytical view of a doubled outlet flow rate of baseline with only UV resin and glass fibers.

From this simulation, the highest flow velocity was observed in the front quarter of the resin tank. As the velocity decreased the streamlines stayed constant until the latter quarter of the resin tank. To try to improve the back quarter of the resin flow the simulation was changed to have the outlet double its flow rate to try and have a more constant streamline velocity. FIG. 31 shows this simulation by way of 3100A & 3100B.

The streamlines in this simulation have a constant velocity but achieving this would be difficult and ultimately not work as the inlet would not be able to keep the resin tank full. This idea was abandoned, and the original simulation was used.

Three different simulations were conducted for each print orientation. Tensile samples were printed in two different orientations with flexural in one thus producing another twelve (12) simulations. All simulations were designed so that the printed part is halfway through its printing process. The reason for three different simulations for each orientation was to show the flow field at the three most important positions of the print. The first position simulated had samples one hundred micrometer (100 μm) from the bottom of the resin tank, the second position had samples in contact with the resin tank bed simulating a complete layer and the last position is at the maximum angle during the peel step.

The results from the CFD testing showed that the flow went around the printed samples. There were a low number of streamlines that penetrated through the supports, but over-all the flow travelled around the samples. Even with the difference in length and size both the tensile and flexural samples' streamline showed the same trend. When the samples were at one hundred micrometer (100 μm) off the bottom of the bed, there was not enough room for the flow to travel underneath. This was also observed when the samples were in contact with the bottom of the resin tank, again the same streamlines were observed. At the largest angle of the peel step, the flow still travelled around the samples instead of under. These results are the same for parts printed both transverse to and parallel to the flow.

It was found that the viscosity of the neat resin was five hundred seventeen centipoise (517 cP) and, the combination of glass fiber and resin mixture had viscosity was nine hundred fifty centipoise (950 cP). When adding fifteen percent (15%) by volume of glass fiber, the viscosity of the mixture increased by forty five percent (45%). No other fiber amounts were tested because only fifteen percent (15%) by volume of glass fiber was used. The pump motor used was able to work without any problems if the total working time was less than four (4) hours. If the print time lasted long that four (4) hours the pump motor would begin to heat up. The print time for the longest print was only 2.5 hours. Therefore, the mixture having a viscosity of nine hundred fifty centipoise (950 cP) is not a problem.

Three different fiber by volume percentages were examined. Code was designed to be able to convert from fiber volume to fiber mass. The reason for this was to be able to weight the fibers and UV resin allowing for a more accurate measurement. The first fiber percent examined was 5%. The initial prints were successful but after tensile testing only a small increase in Young's modulus was observed. The variability in the neat samples made it difficult to find an exact percent increase because of the large standard deviation. The next fiber volume percent trialed was 15%. At this percent it was easier to find the trend of increase Young's modulus. The last percent by volume used was 25%. The prints were successful at this percent as well, but a large amount of glass fiber was needed for every print. Because of this, the percent used in this research ultimately was 15%.

The density of the composite changed from the top of the print to the bottom of the sample when no pump system was present. When examining the samples, a gradient of fibers/density could easily be seen without a microscope.

Figure 32:
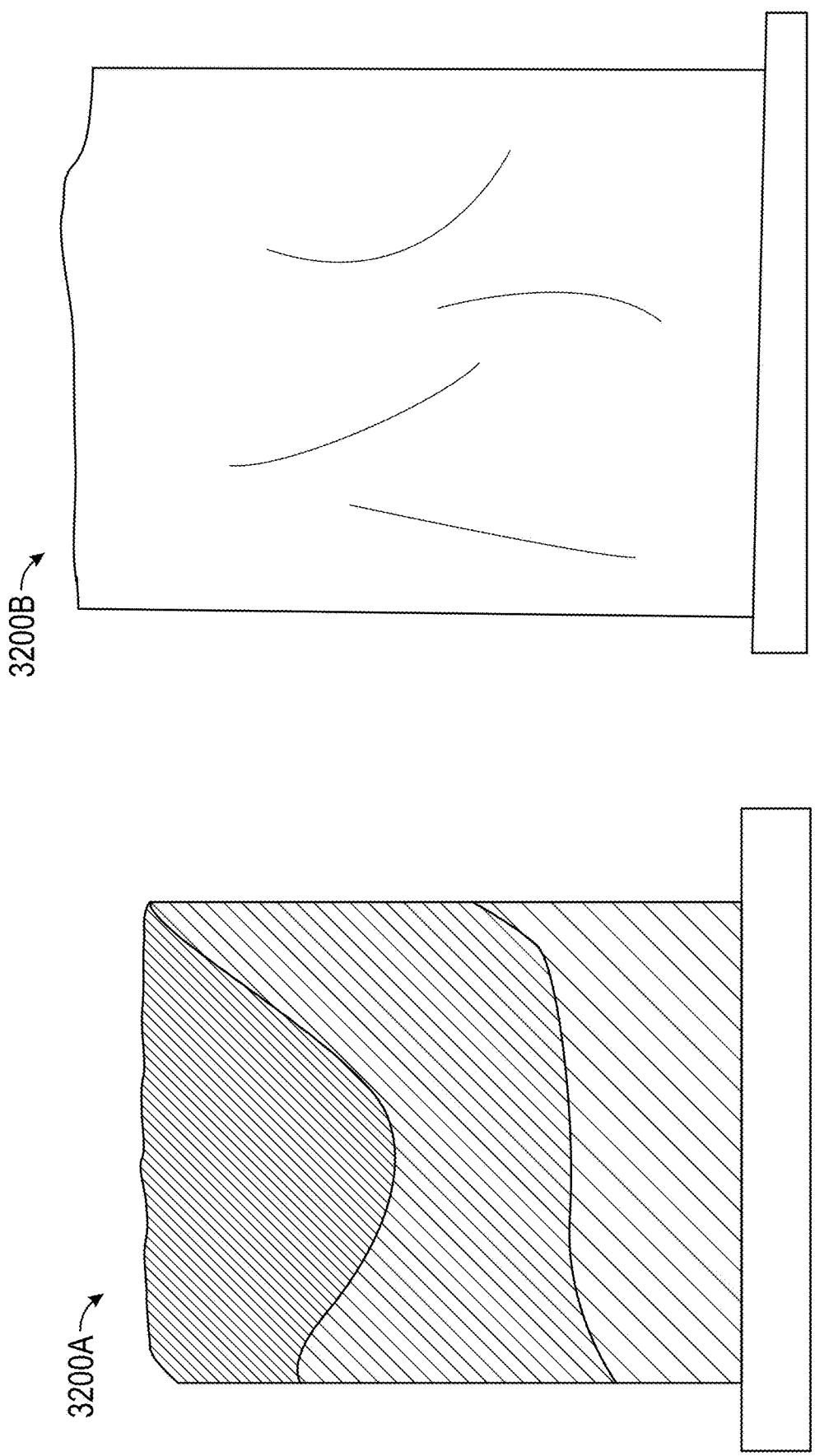
FIG. 32 shows photographic views of a sample printed without a flow field (A) and a sample printed with a flow field (B).

The theoretical density of the composite based on the rule-of-mixtures, assuming no voids, was 1.42 g/cm. The three samples that used the pumping system only had a 1.4% deviation. Since this deviation is so small, it can be assumed the samples that printed with the pumping system are evenly distributed, as shown in FIG. 32.

Illustration 3200A shows a rectangle sample that was printed without the pumping system. The section at the top of the rectangle was printed first and shows that there is glass fiber present, but around the middle of the print all the glass fibers have sunk to the bottom of the bath. Because of this, the glass fibers where no longer being incorporated into the print. Illustration 3200B was printed using the pumping system and shows no gradient of the print and has consistent fiber dispersion throughout.

Figure 33:
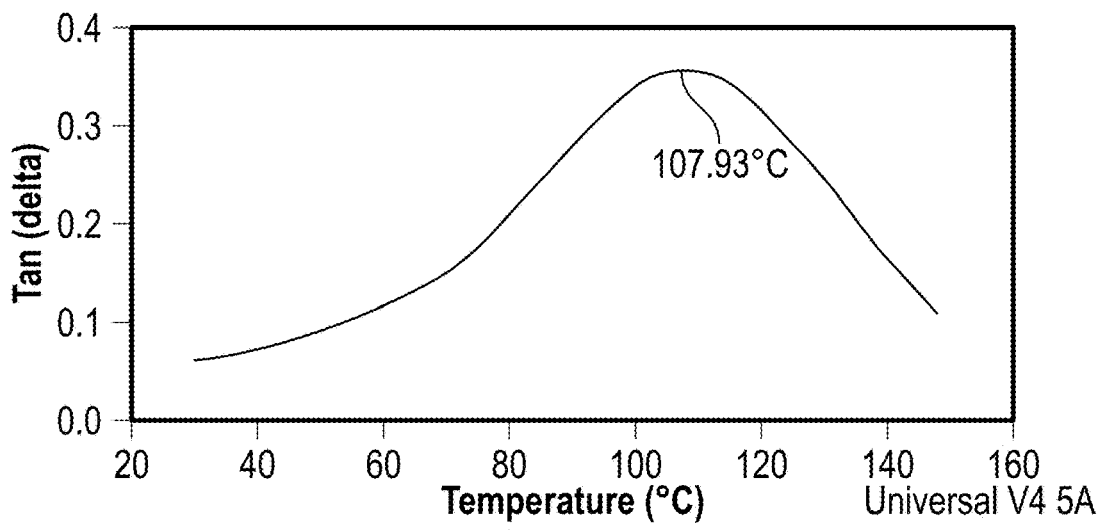
FIG. 33 graphs a neat sample 3 of DMA testing.

To assess potential differences in the amount of cure in the samples, DMA was performed. The glass transition temperature ($T_g$) was found using the tan δ curve. This was then used to determine if the glass reinforced samples had been optimally cured to the same degree as that of the neat sample. The neat resin was considered to be optimally cured to be compared to the reinforced resin glass fiber composite. When examining the curves of the neat samples the average $T_g$ was found to 107.59° C. Sample 3 had close to the actual $T_g$ and can be seen below in FIG. 33.

Figure 34:
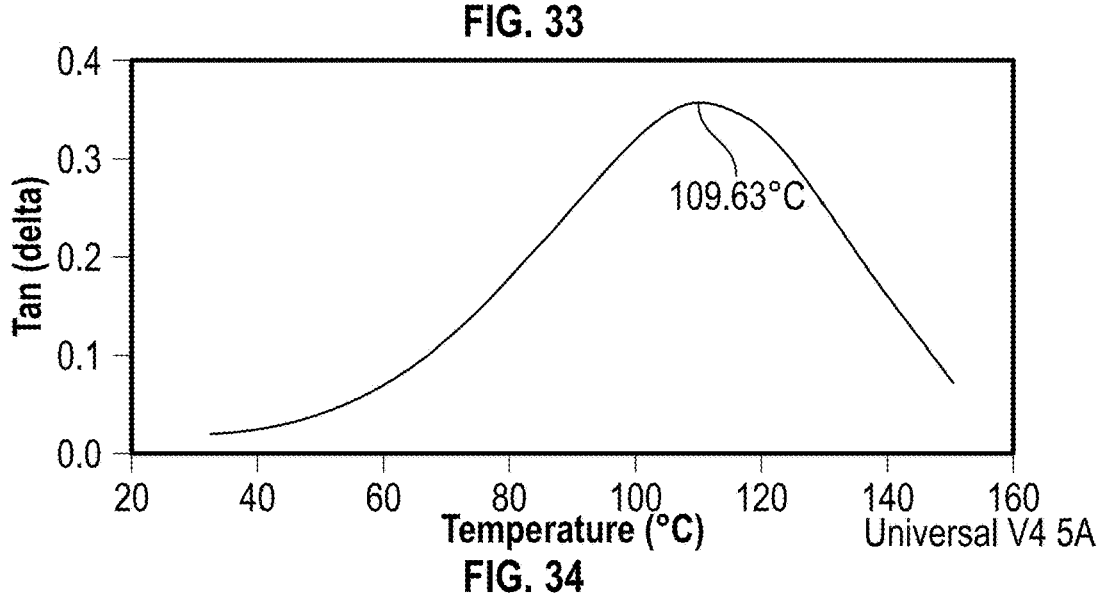
FIG. 34 graphs a glass sample 1 of DMA testing.

When the $T_g$ of the neat samples was found the next step was to print and find the $T_g$ of the glass reinforced samples. Three more samples where tested having an average $T_g$ of 109.19° C. Glass sample 1 had the closest $T_g$ to this value and the graph can be seen below in FIG. 34.

When adding a reinforcement such as glass to a polymer matrix it is expected to see an increase in the $T_g$. It was found that by adding the glass fiber to the resin matrix the $T_g$ increased by 1.6° C. This increase in $T_g$ illustrates that both the neat and glass reinforced samples have a similar cure.

Baselines had to be established in order to compare results of neat, glass fiber reinforced without a pumping system and glass fiber reinforced with a pumping system. The first was a baseline of the neat resin samples. The second baseline was to show results of the resin and glass fiber mixed but without a pumping system (NP). This was performed to determine if the addition of glass fibers increased or decreased tensile properties. Again, tensile strength, Young's modulus, and strain-to-failure were examined. The neat and no pump samples were printed in the PF orientation.

The first printed samples were also printed in the PF orientation. When doing this, 15% glass fiber by volume was added to the neat resin and resulted in a 20.9% decrease in tensile strength, a 57.3% increase in Young's modulus and a 23% decrease in strain-to-failure. The decrease in strain-to-failure was expected as the Young's modulus increased. The decrease in tensile strength can be explained by fibers aligning in the transverse direction of the force or a agglomeration of fibers in a small area. When this happens the fiber acts as a void and does not help distribute the force. The theoretical Young's modulus can be determined by the Halpin-Tsai micromechanical models. To determining longitudinal modulus equation 1.1 was used below, $$E_L = \left[ \frac{1 + \left(\frac{2l}{d}\right)\eta_L V_f}{1 - \eta_L V_f} \right] E_m \tag{1.1}$$

To determining the transverse modulus Equation 1.2 below was used, $$E_T = \left[ \frac{1 + 2\eta_T V_f}{1 - \eta_L V_f} \right] E_m \tag{1.2}$$

from here both equations 1.3 and 1.4 will be needed to find the theoretical Young's modulus.

$$\eta_L = \frac{\left(\frac{E_f}{E_m}\right) - 1}{\left(\frac{E_f}{E_m}\right) + 2\left(\frac{l}{d}\right)} \tag{1.3}$$

$$\eta_L = \frac{\left(\frac{E_f}{E_m}\right) - 1}{\left(\frac{E_f}{E_m}\right) + 2} \tag{1.4}$$

In the equations above. $E_m$ represents the Young's modulus of the matrix, $E_f$ represents the Young's modulus of the fiber, l is the fiber length, d is the diameter of the fiber, and $V_f$ is the fiber volume constant. When using the above equations, the Young's modulus $E_r$ of the composite can be determine using equation 1.5 below.

$$E_r = \frac{3}{8}E_L + \frac{5}{8}E_T \qquad (1.5)$$

Using this formula, the theoretical randomly oriented fiber reinforced composites should have a Young's modulus of 3.98 GPa. When looking at the CFD with no parts being printed, the flow was at its maximum closer to the middle of the print bed. From here, print orientation TF was developed in hopes to have more random fiber orientation.

Printing in TF orientation increased the Young's modulus but decreased the tensile strength. The Young's modulus was increased 77% on average from neat samples, the tensile strength decreased by 36%, and a decrease in strain-to-failure of 37%. Trying to print where flow is the maximum, print orientation TFW was developed and used.

In the TFW orientation, the Young's modulus was at its lowest with only a 44% increase, there was less of a decrease in tensile strength with only a decrease of 33%, a decrease of 30% was also observed for strain-to-failure.

Figure 35:
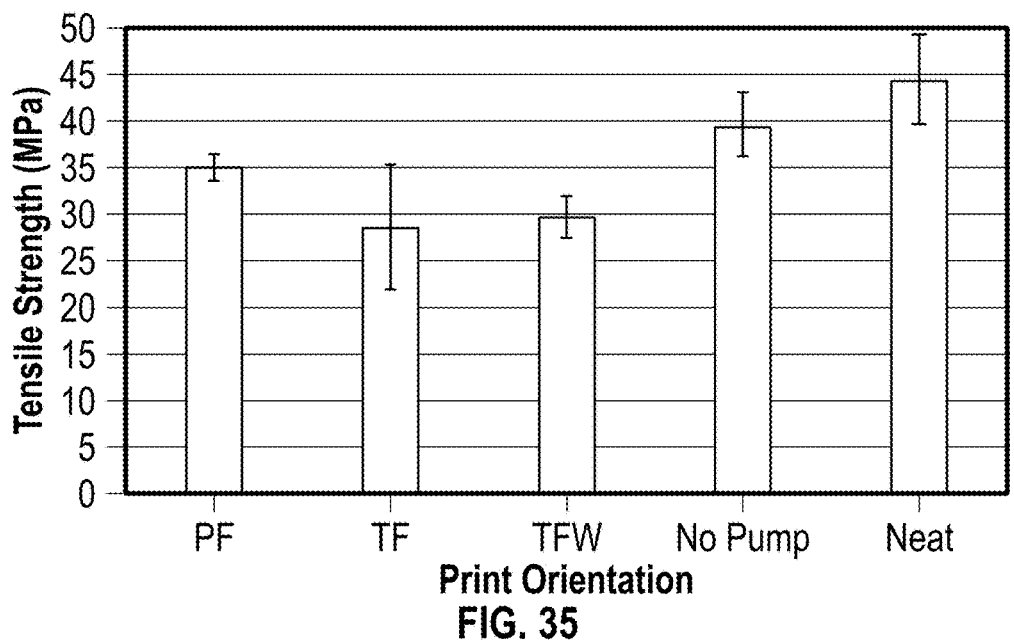
FIG. 35 charts average tensile strength of samples.
Figure 36:
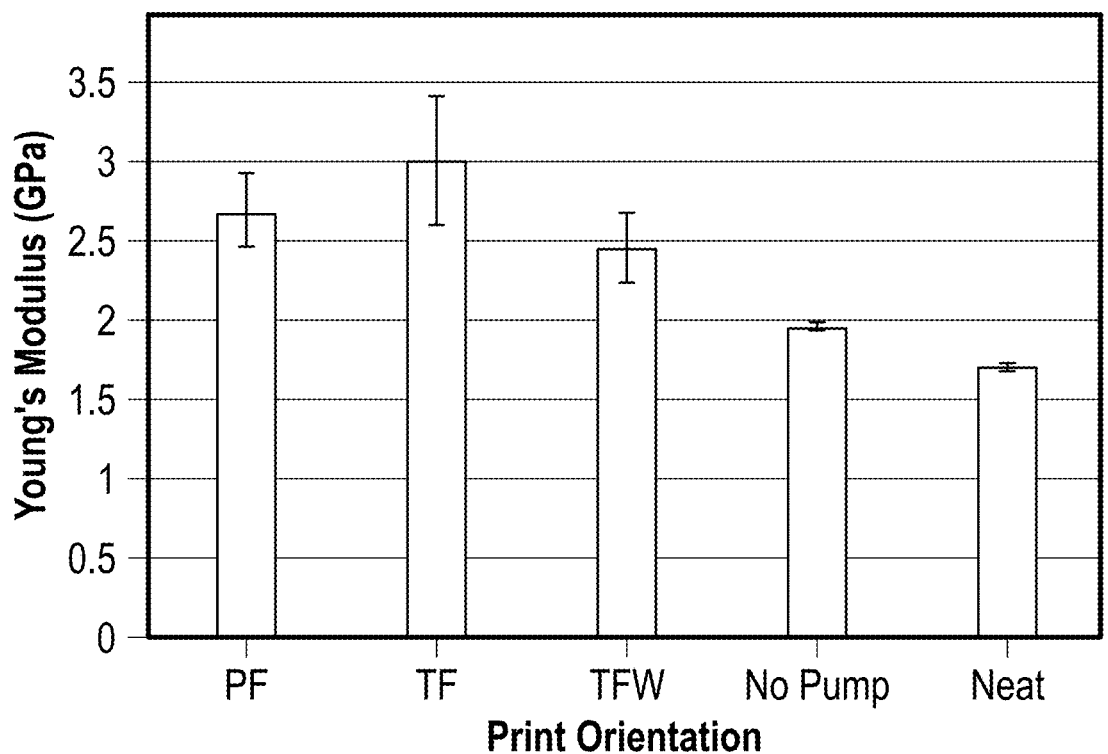
FIG. 36 charts average Young's modulus of samples.
Figure 37:
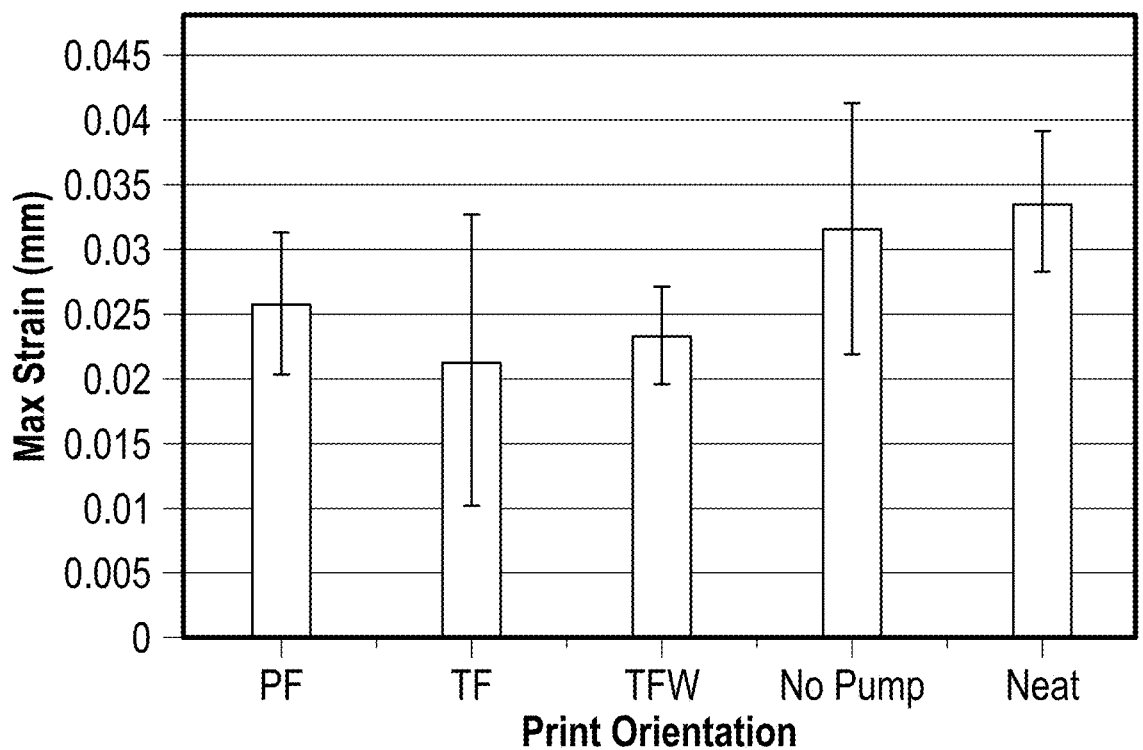
FIG. 37 charts average strain-to-failure samples.
Figure 38:
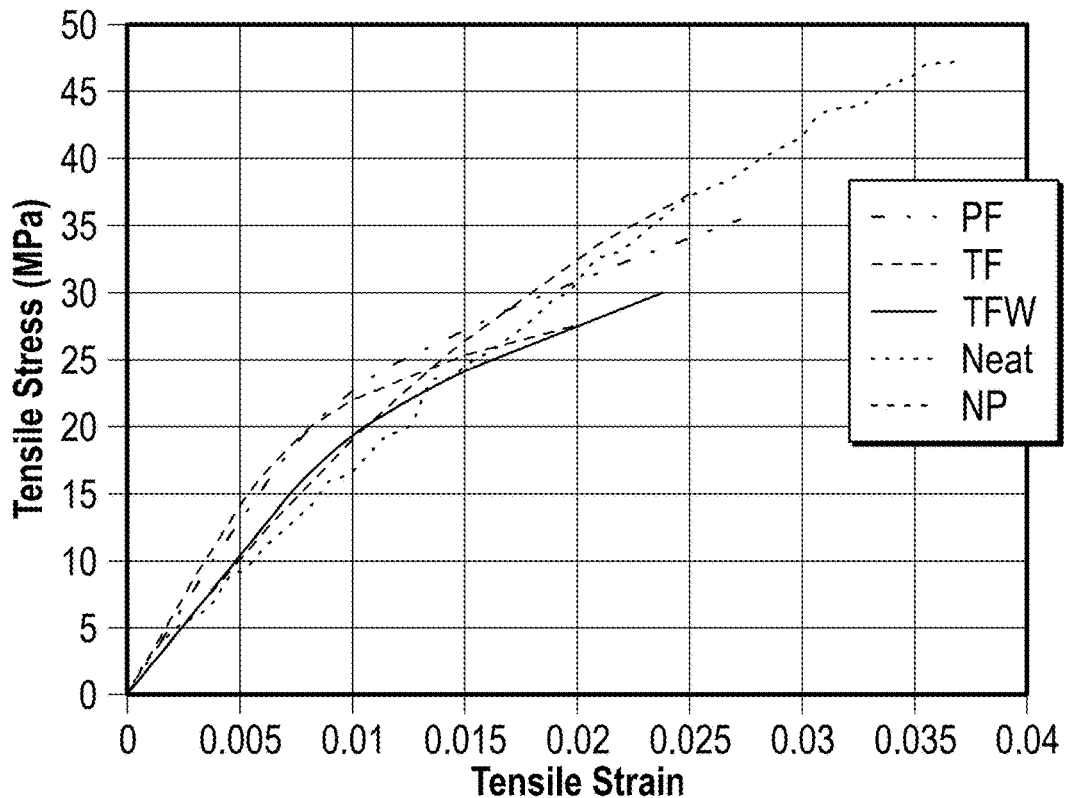
FIG. 38 graphs stress vs. strain curves for averages of printed samples.

Out of the three different print orientation, TF orientation had the highest Young's modulus, the lowest tensile strength, and lowest strain-to-failure. Where print orientation PF had the highest tensile strength. These results can be seen next to the neat samples and no pump samples in FIGS. 35-37. The average stress vs. strain curve of each print orientation as well as neat and no pumping system can be seen FIG. 38.

After the tensile testing was completed, adding the glass fiber was found to have a significant impact on Young's modulus increasing it on an average of 59.4%. The highest increase of the three print orientations was observed with the TF orientation with a 77% increase. During the elastic regime of the stress vs. strain curve, the glass fibers restricted the polymer chain motion, therefore increasing the Young's modulus. It was also observed that there was a poor interface between the fibers and resin matrix, this will be further explained later in the thesis. There is a clear elastic region and plastic region for all samples that had at least some glass present. The tensile strength decreased for all orientation on an average of 30% with the lowest being 20.9% in print orientation PF. Strain-to-failure in all print orientations decreased, on average the decrease was 30%, with a max decrease of 37%. These decrease will later be explained when evaluating the SEM images. As the Young's modulus increased it was expected the strain-to-failure would decrease. This is also caused by the limitation of polymer chain motion. These tests concluded that the pumping system helped to suspend the fibers in the UV resin and allowed for a more uniform distribution of the glass fibers in the composite. No further testing of the no pump resin was examined. The reasoning behind this decision was a clear increase in Young's modulus was observed and the results from the gradient and density testing.

Figure 39:
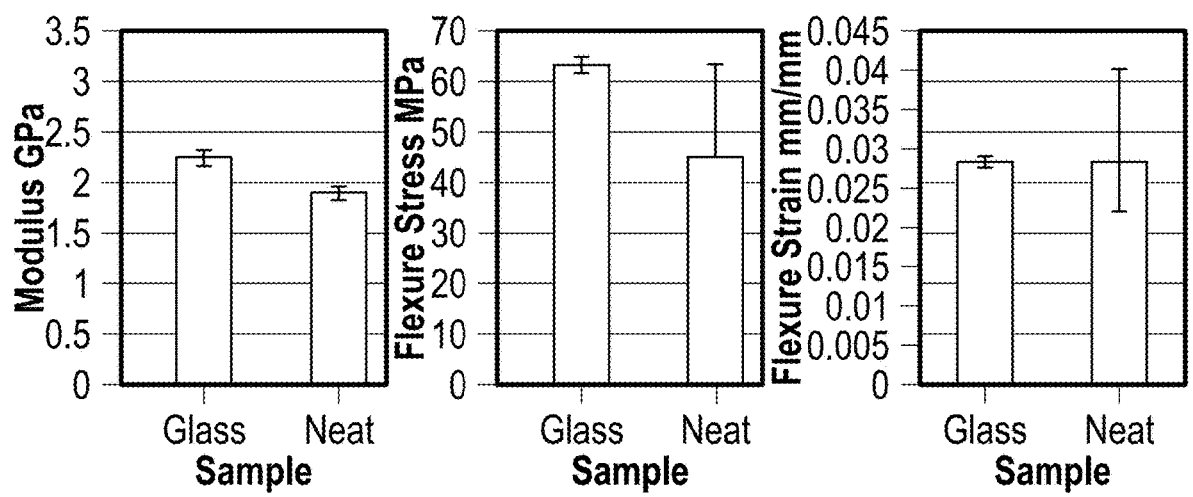
FIG. 39 compares neat and glass fiber reinforced samples of: modulus, flexure stress, and flexure strain.
Figure 40:
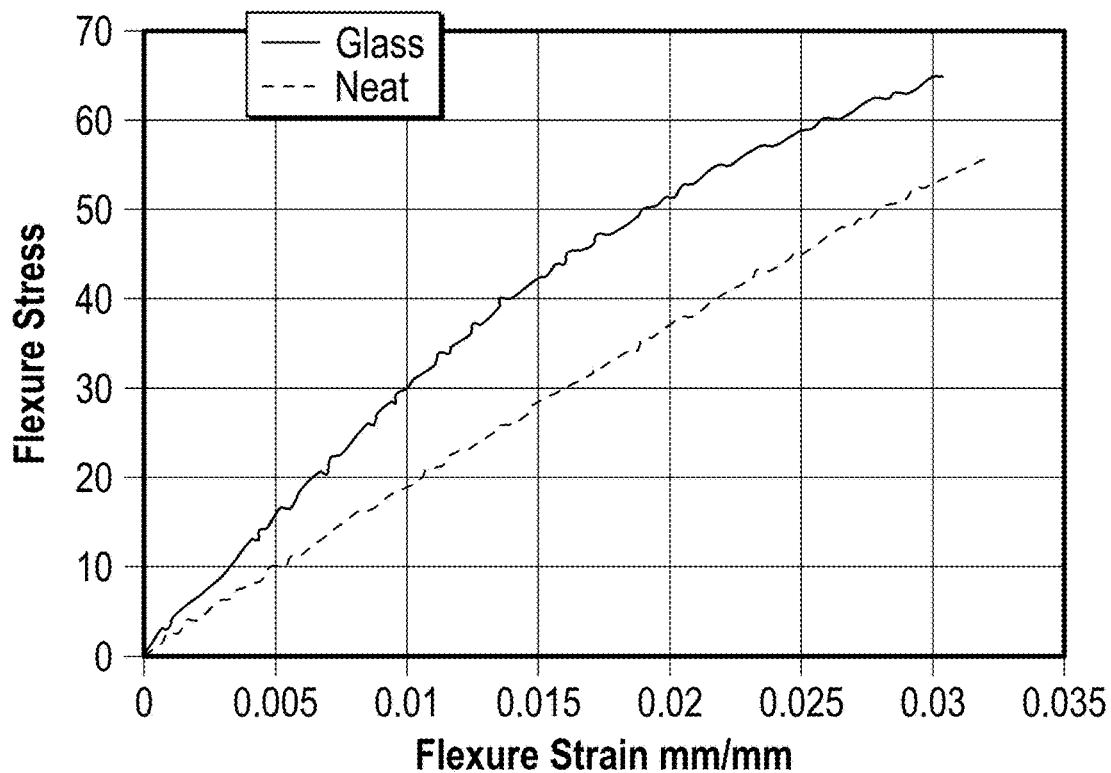
FIG. 40 charts stress vs. strain curve of neat and glass fiber reinforced samples.

Flexural testing was completed to observe how each specimen would fracture and to examine the different mechanical properties such as max flexure stress and modulus. The results of this test would also reveal tensile compression and shear properties. The samples were all printed in the PF orientation. This was done because properties found in the tensile testing had a lower standard deviation. Samples were printed to a 16:1 ratio. Glass fiber reinforced samples were then printed and tested to examine the change in the max flexure stress, modulus, and max strain. The samples were printed three at a time and sanded similar to that of tensile samples. The max flexure stress and modulus of both the neat and 15% by volume reinforced samples were then compared to each other. These graphs can be seen in FIG. 39. The average stress vs. strain curve can be seen in FIG. 40.

The addition of the glass fiber increased the flexure stress by 18%, increase the modulus of 38% and decrease the max strain by 0.002%. The flexure samples were printed with a 16:1 ratio of length to thickness but still had to be designed small enough to fit in the printing surface. Larger samples would be desired to find better max flexure stress and modulus, this is due to the increase in the bending moment. The fracture type was different between neat and glass fiber reinforced samples. The neat samples broke into multiple different pieces where the reinforced samples had a single fracture. The addition of the glass fibers helped to dampen the vibration of the free-falling piece therefore limiting to only one fracture and not multiple.

A microscope was used to measure the crack length in each sample for the calculation of fracture toughness from each test. A calibration factor was then calculated, this factor ensured that each specimen where comparable and is This donated as f(x). This factor takes in to account the geometry of each specimen. Starting this process began with finding the crack length. Using the microscope above the crack length a could be found and a ratio of crack length and width was calculated. This can be seen below in equation 1.6.

$$x = \frac{a}{w} \qquad (1.6)$$

The ratio shown has a "crack length" and w "width" of the sample. This ratio was then used to find f(x). This equation can be seen below.

$$f(x) = 6x^{1/2}\frac{[1.99 - x(1-x)(2.15 - 3.93x + 2.7x^2)]}{(1+2x)(1-x)^{3/2}} \qquad (1.7)$$

Once this f(x) was calculated the fracture toughness $K_{IC}$ could be found using the equation shown below.

$$K_{IC} = \left(\frac{P_Q}{BW^{\frac{1}{2}}}\right)f(x) \qquad (1.8)$$

Figure 41:
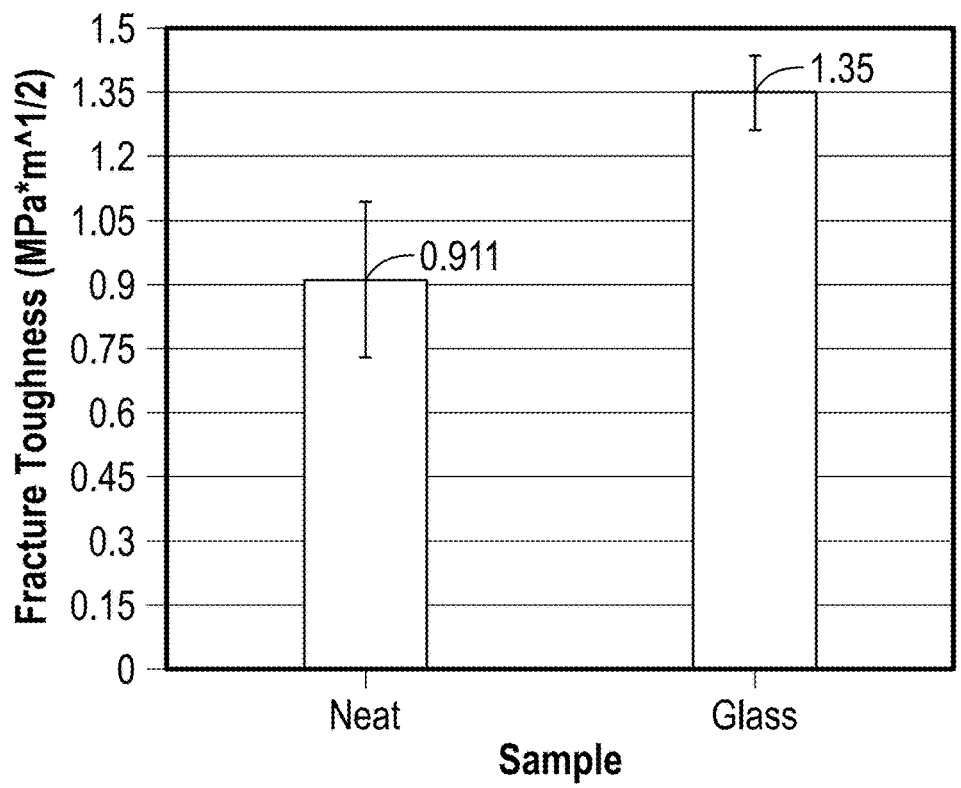
FIG. 41 charts average fracture toughness of both neat and glass reinforced samples.
Figure 42:
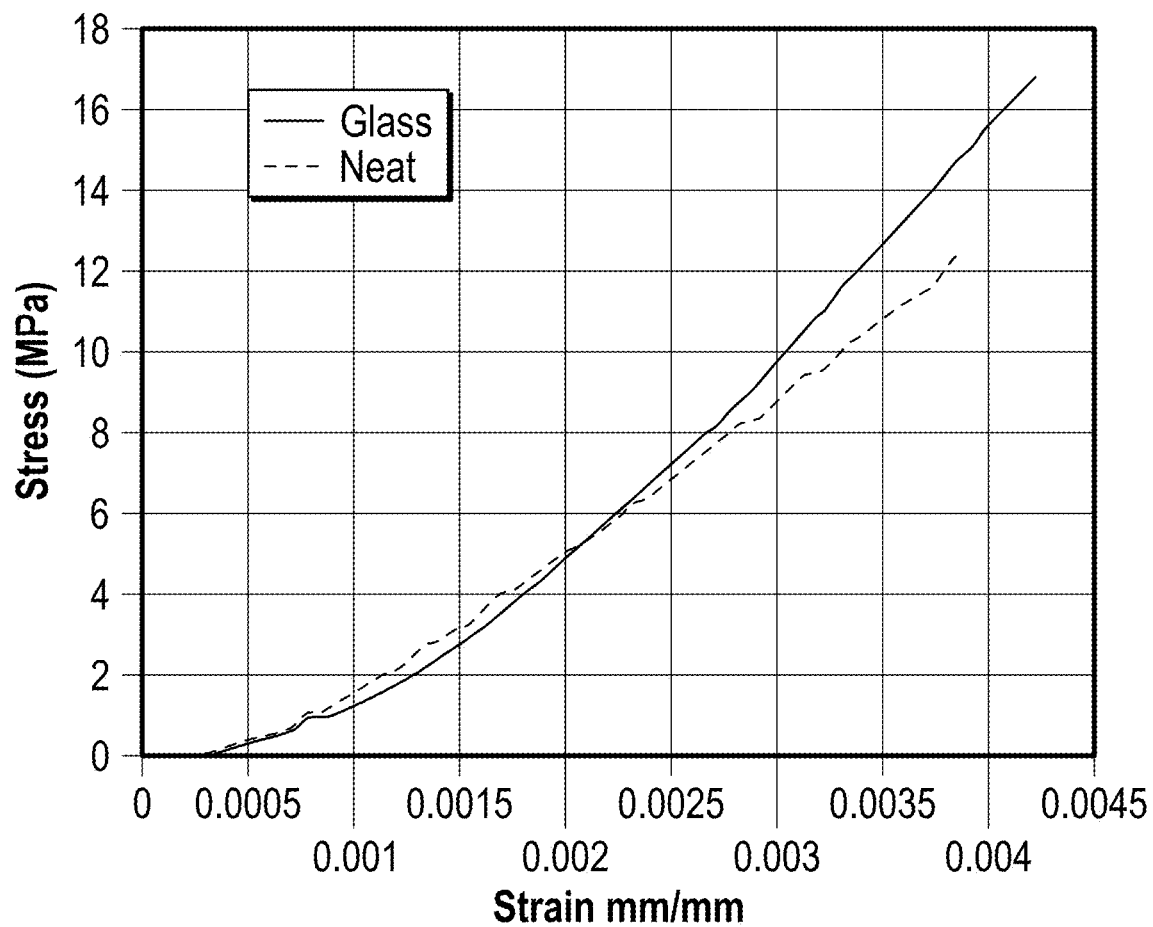
FIG. 42 graphs a stress vs. strain curve comparing neat and glass reinforced samples.

In this equation $K_{IC}$ is the fracture toughness, $P_Q$ is the max flexure load. B is the thickness at the crack, and W is the width at the crack. A 32.5% increase in fracture toughness can be observed when adding 15% glass fiber to the sample. Stress vs. strain curves of the neat and glass reinforced samples can be seen in Appendix A.39 and A.40. These results can be seen below in FIG. 41 and a comparison of the stress vs. strain curves can be seen in FIG. 42.

Figure 43A:
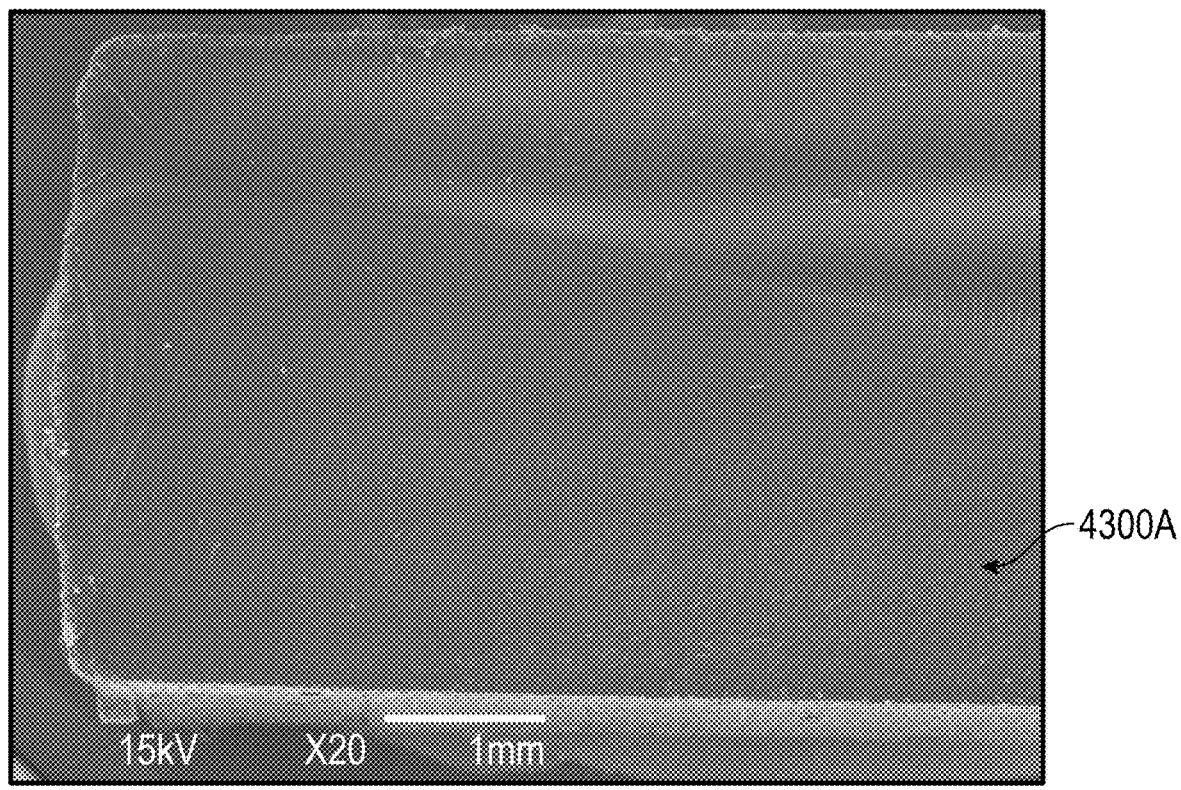
FIG. 43A shows a baseline of a neat resin.
Figure 43B:
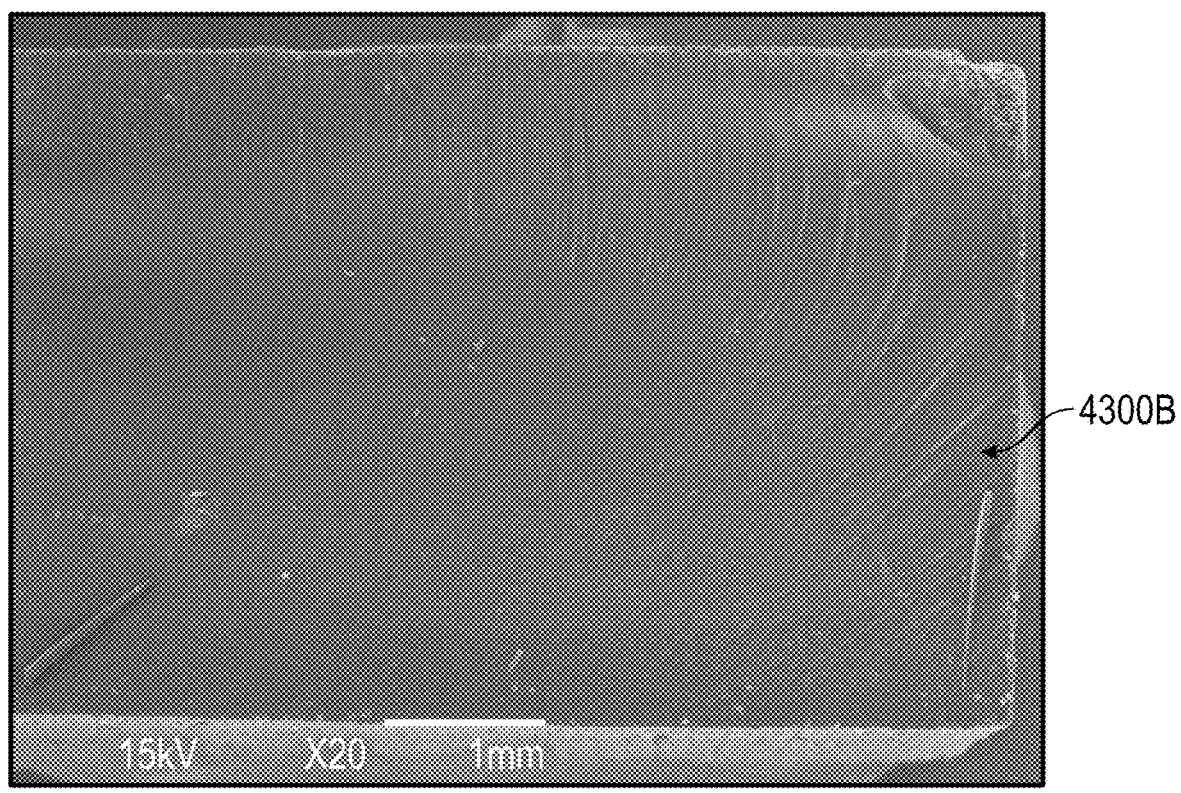
FIG. 43B shows a photographic view of a total fracture surface of a neat flexure sample.

A baseline 4300A of the neat resin had to be scanned first to compare the glass fiber reinforced composite, as shown in FIG. 43A. The neat resin was scanned to examine the quality of the prints and determine if the neat resin had voids. FIG. 43B shows an image 4300B of the fracture surface from fracture testing.

Figure 44:
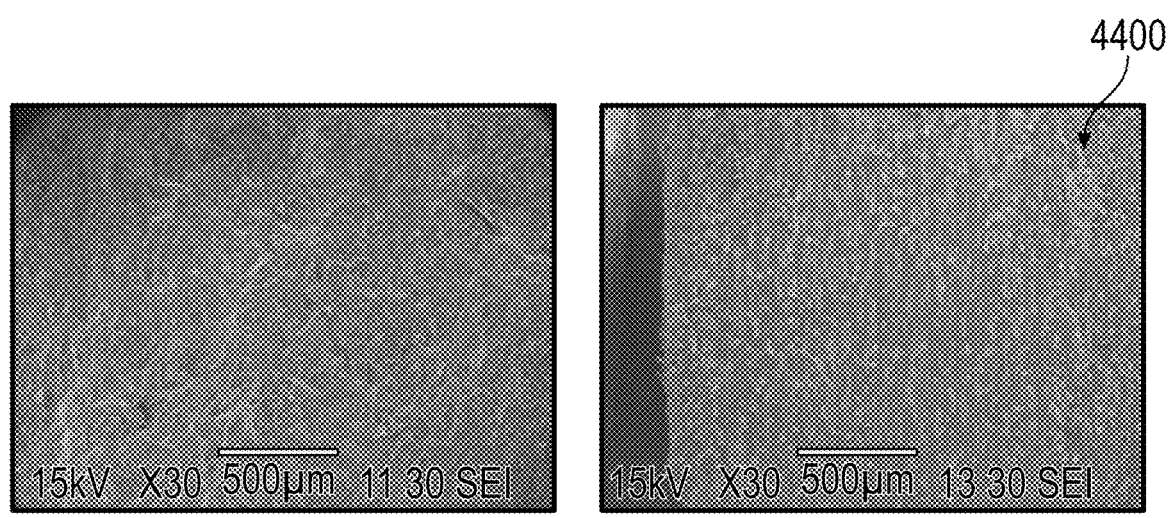
FIG. 44 shows a photographic view of a longitudinal surface of tensile sample and fracture surface of a glass reinforced tensile sample.

When examining the neat resin, there were no void spots and no porosity along the entire fracture surface 4400 in comparison to earlier studies showing there would be voids spots and porosity with the addition of carbon fiber. The glass fiber tensile samples were then taken and examined with the SEM. The picture in FIG. 44 on the left shows the longitudinal axis of the samples to view for fiber orientation and fiber pullout. The picture on the right is a view of the fracture surface 4400.

Figure 45:
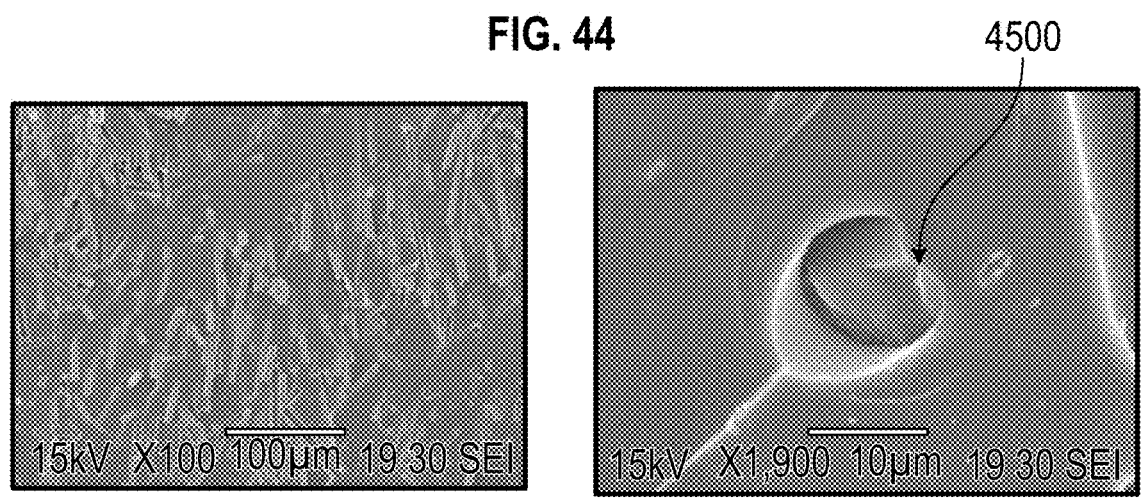
FIG. 45 shows a photographic view of a fracture surface of glass reinforced tensile samples and expanded view of fiber breakage.

After tensile testing was complete a gauge section of the sample was split in half using a blade and hammer. In FIG. 45 the image on left shows the fibers are randomly orientated. The image also shows both fiber pull out and fiber breakage. These finding can explain why there was a decrease in the tensile strength. The pullout from the resin of the fibers show a poor interface between the UV resin and the glass fibers. The SEM images also show some areas of fiber aligned in the transverse direction of the force. When this happens the glass fibers can act as a void, also lowing the tensile strength in the samples. The second images show the fracture surface 4400 of the gauge section 4500. Fiber breakage was observed but the major of the fibers pulled out showing a poor interface between the two materials. When comparing the neat and glass fiber reinforced samples both show a near zero in porosity or voids.

FIGS. 46-54 highlight the effectiveness of using a dual curing system, consisting of a photo and thermal initiator, for the additive manufacturing of carbon fiber short-fiber composites via vat photopolymerization.

The effects of layer height and print orientation of the short-fiber composites were evaluated for their effect on material properties, including: flexural modulus, tensile modulus, flexural strength, tensile strength; and also fiber/matrix interfacial properties, including: fiber length distribution, and fiber volume consistency. It is thus to be appreciated there exist embodiments wherein use of a photo and thermal initiator, if configured so, can be used to increase, decrease, and/or keep the same values associated with any one or more of the aforementioned properties.

Processing parameters were developed that resulted in successful printing and curing of composites at a 5% fiber volume. In the specific examples provided below, it was found there was no significant change in the flexural modulus. A decrease the tensile and flexural strength of the short-fiber composites was produced, due at least in part to weak fiber/matrix interfacial properties, a wide fiber length distribution, and issues with fiber volume consistency. An increase in the tensile modulus was seen and could be manipulated with adjustments to layer height and part orientation.

Figure 46:
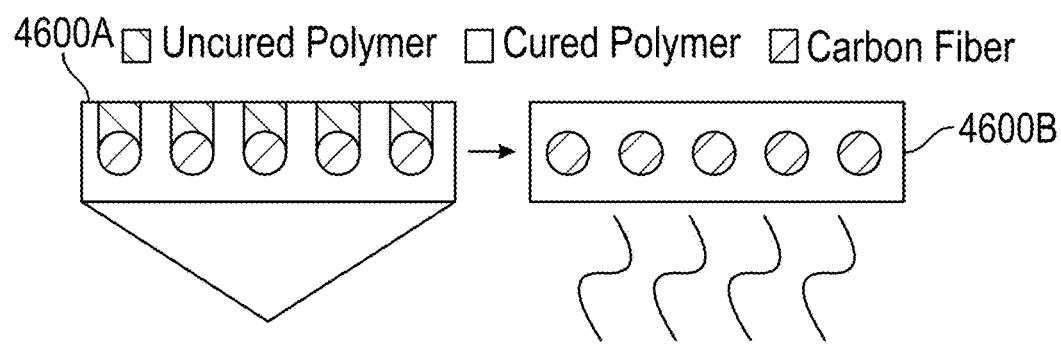
FIG. 46 shows a diagrammatic view of an exemplary dual curing system.

Use of continuous carbon fiber can overcome issues associated with fully curing the part of a dual curing system, such as the one shown in FIG. 46. The dual curing system employs a photo initiator for initially curing the fiber and matrix in the desired geometry, and a thermal initiator to cure the remaining resin. The following subject matter, much related to FIGS. 47-54, uniquely reports information on the material properties of the composite produced and is successful in incorporating the thermal initiator into the liquid resin. The thermal initiator cures the areas that the UV light cannot, due to the opacity of the carbon fiber. In some embodiments, the thermal initiator can thus prove to be a critical component when incorporating carbon fiber into vat photopolymerization produced.

According to one non-limiting example, a laser vat photopolymerization printer manufactured was assembled and calibrated. The printer used is a bottom-up printer that uses a 405 nm 70-micron spot size laser and is based on an open sourced design. An acrylic-based photopolymer designed to work with the printed was also used.

Figure 47:
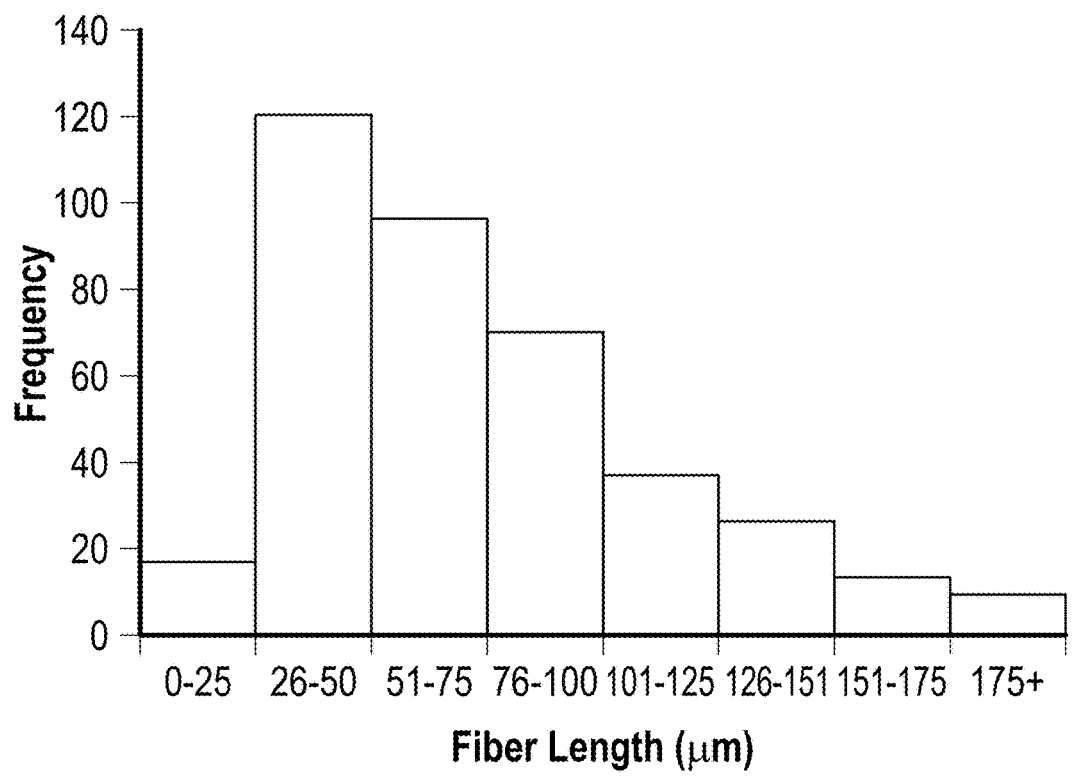
FIG. 47 graphs an exemplary milled Toray T-700 fiber length distribution.

The primary carbon fiber used was a Toray fiber. The Toray fiber is chopped 3 mm fiber and comes sized for epoxies. The Toray fiber was then milled using a 120 µm screen. The milled fiber was then sieved using a stack of screens, with a stacking sequence of 2 mm, 250 µm, 106 µm, and 76 µm. The sieved fibers were collected in-between the 106 µm and 76 µm screens. A sample of fibers were observed using an inverted microscope and images captured with a camera to determine the average length along with the length distribution. The processed fibers were then placed in an oven at 80° C. and dried for a minimum of 8 hours before use. The distribution of the length of 300 fibers of the milled Toray fibers had an average length 74.1±40.2 µm, and the distribution of the measured lengths are shown in FIG. 47.

Alternatively, a different resin for the matrix material and/or a different style of printer can be used. For example, by switching to a top-down style printer the "peel" step can be removed. The use of a top-down style printer could also allow for the easy incorporation of a pump/mixing unit to help maintain fiber volume consistency.

A variety of thermal initiators were used in order to identify the optimum thermal initiator to be used in a dual cure system. The thermal initiators were evaluated based off of the thermal initiators solubility with the resin system, the stability of the resin system at room temperature, and the temperatures needed for post-curing of the samples. The thermal initiators Dilauroyl Peroxide (Luperox LP), Cumene Hydroperoxide, Dicumyl Peroxide, Tert-Butyl Peroxybenzoate (Luperox P), Benzoyl Peroxide (Luperox A98) were used. Other suitable thermal initiators could have and/or can also been used. For example, a class of thermal initiators that are commonly used for free radical polymerization, known as aliphatic azo compounds (azo), can be used. The azo initiators are not as effected by fillers, and do not undergo radical induced decomposition. This proves useful for the long-term stability of the resins used for manufacturing short-fiber composites via vat photopolymerization.

To prepare the resin system, the resin and fiber was first mixed with a high speed mixer and then sonicated for 5 minutes. After sonication the thermal initiator was added and the mixed again with a high speed mixer. The resin system was then degassed in a vacuum chamber then immediately used to manufacture samples.

The longitudinal axis of the parts where varied in the x-axis of the printer to examine the effects of part orientation relative to the build surface. The finished parts were washed in ethanol after being removed from the build platform. This allows for the removal of any uncured resin, and in the case of the fiber reinforced samples any lose fibers from the surface. The supports that were generated during the printing process are left in place at this time to support the sample while it was being post-cured.

For the neat (non-fiber reinforced) samples were post-cured in an in-house built cure oven, consist of three 25 Watt LED UV (405 nm) light banks, a heating element, and a rotating platform. The temperature and the time for the post-cure can be adjusted by the use of proportional-integral-derivative (PID) controller. For the neat samples a temperature of 80° C. was used while being exposed to the UV light for 1 hour. All fiber reinforced samples were post-cured using a convection oven, with the temperate and times determined from the differential scanning calorimetry (DSC) results. After post-curing the supports were removed from the sample, and the area where the supports were attached was sanded with increasingly finer grits of sand paper, ranging from 60 to 600, with care taken to preserve the sample geometry which varies depending on the desired testing. This was done to diminish the effects of surface defects, due to support material, on the tested samples.

The selected thermal initiators were evaluated experimentally via DSC in accordance with American Society for Testing and Materials (ASTM) international standard ASTM E2160. The testing was carried out from 25° C. to 180° C. at a ramp rate of 10° C./min, using a Q20 DSC. For each sample two runs were carried out. The first was of an uncured sample, and the second was a sample that had been UV cured by placing the DSC pan in the UV cure oven 25.4 mm away from the light source for one minute at room temperature. This was done to determine the thermal initiators onset temperature, and to experimentally determine if any reactions are occurring after UV curing. The samples were tested at a fiber volume ($V_f$) of 5%, and a thermal initiator content of 1 wt. % of thermal initiator. The resin was also included to determine if there is any activation of the photo initiator at due to elevated temperatures. Graphs produced from the DSC data were made using universal analysis provided by Thermal Advantage (TA).

Tensile testing was carried out using a load frame with a 25.4 mm extensometer and a 2 kN load cell. The load frame was controlled and data collected with the use of software. While there are no ASTMs directly concerning 3D printed materials, tensile testing can be carried out referencing ASTM D638 and ASTM 3039. The specimen geometry can be of the type IV according to ASTM D638. The type IV specimen in particular was chosen due to the limiting size of the build plate (130 mm×130 mm) of the printer being used. Samples were tested at a constant cross-head rate of 1 mm/min, so failure of the specimen occurred within 1 to 10 minutes of testing, per ASTM D3039.

The flexural testing was carried out using a load fame with a 2 kN load cell. The load frame was controlled and data collected using software. The flexural testing, referencing ASTM D790, can be carried out as a three-point bending utilizing center loading, with specimens having a span-to-thickness ratio of 16:1, and a crosshead rate of 1 mm/min. For each sample 5 specimens were tested. The maximum tensile strength and Young's modulus was found as specified in ASTM D638 section 11.2 and 11.4 respectively, and the maximum flexural strength and flexural modulus was found as specified in ASTM D790 section 12.2 and 12.5 respectively.

Scanning electron microscopy (SEM) were utilized to examine the fracture surface of tested samples. This allowed for examination of the fracture surface in determining failure types, and to evaluate the dispersion and the orientation of the fibers with in the sample. Samples were attached to cylindrical aluminum mounts with colloidal silver paste. The specimens were sputter coated with a conductive layer of gold. Images were obtained with a scanning electron microscope; energy-dispersive X-ray information was collected at an accelerating voltage of 15 kV using a silicon drift detector with a light element window and an imaging system.

Figure 48:
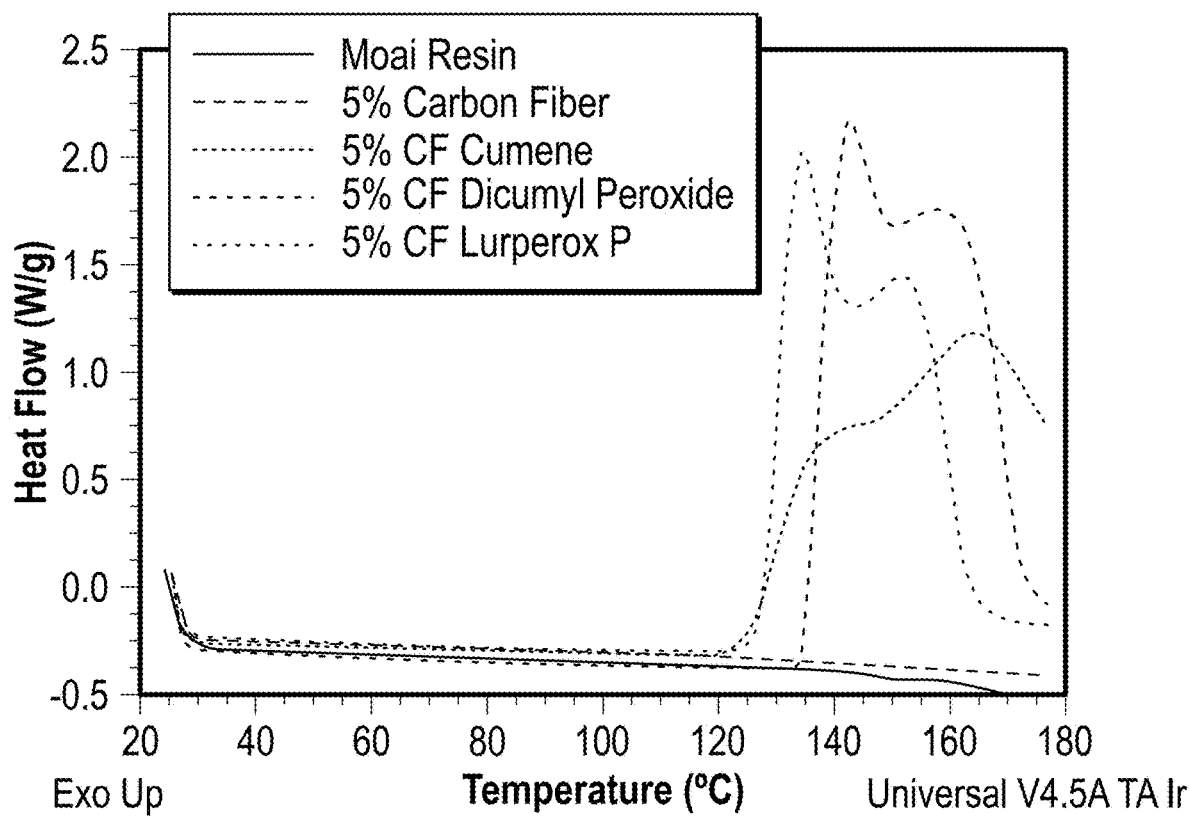
FIG. 48 graphs some differential scanning calorimetry (DSC) results for samples without UV curing.
Figure 49:
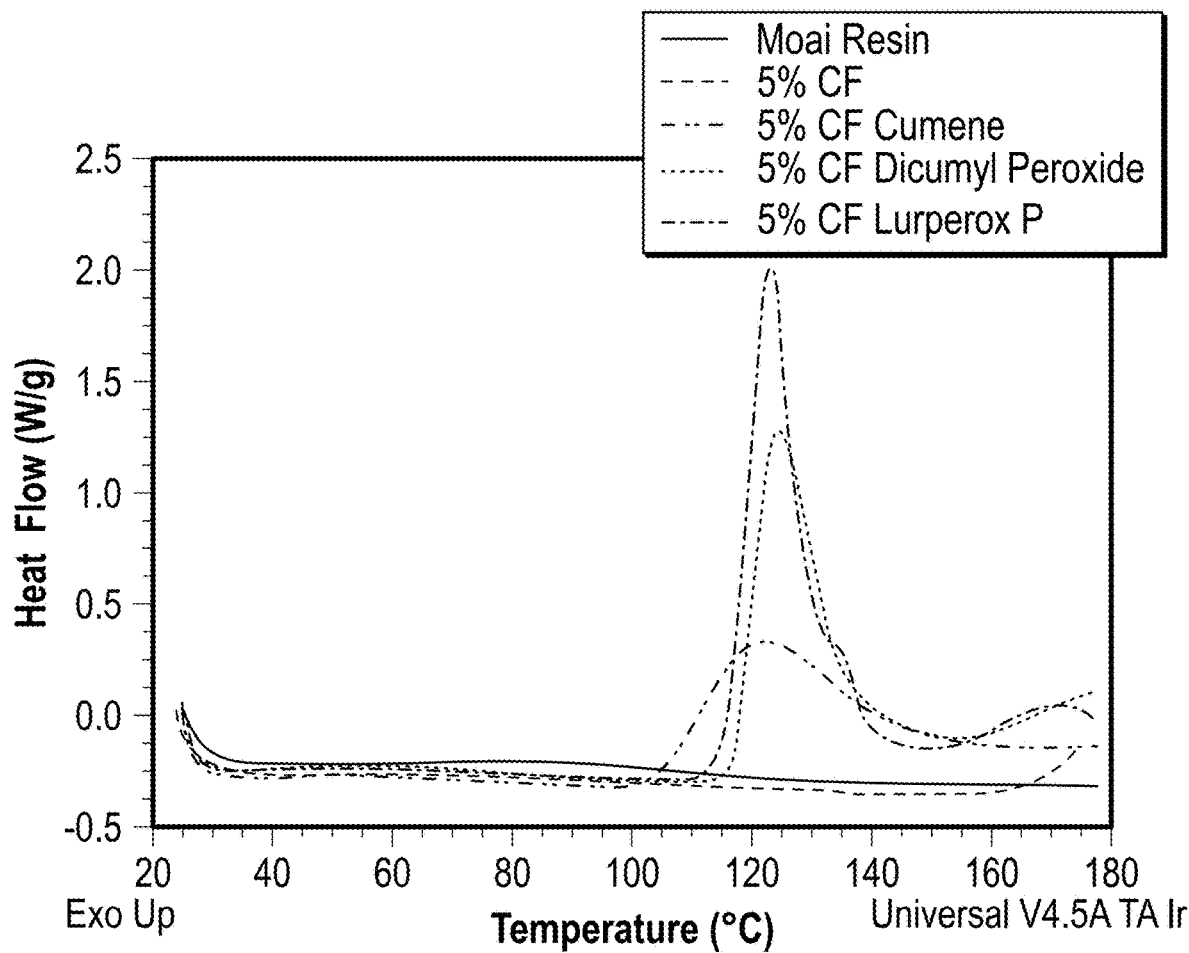
FIG. 49 graphs some DSC results for samples after UV curing.

To fully cure all of the resin within the sample, a dual cure system that uses both a photo initiator and a thermal initiator was used. The results of the DSC testing are shown in FIG. 48 (non-UV cured samples) and FIG. 49 (UV cured samples) and are summarized in Table 3.

TABLE 3

Thermal initiator onset temperature from DSC curves.

| Thermal Initiator | Onset Temperature (° C.) | 10 Hour Half-life (° C.) |
|---|---|---|
| Luperox P | 115.99 | 104 |
| Dicumyl Peroxide | 116.83 | 114 |
| Cumene Hydroperoxide | 104.01 | 135 |

Based off of the results from the thermal initiator testing Luperox P was chosen as the thermal initiator to be evaluated for the dual cure resin system, and was determined to be effective at a 0.5 wt. %.

The fiber volume consistency results are summarized in Table 4.

TABLE 4

Summarized fiber volume consistency results for flexural samples.

| Layer Height (μm) | Print Time (hours) | Top (% $V_f$) | Middle (% $V_f$) | Bottom (% $V_f$) |
|---|---|---|---|---|
| 100 | 3.0 | 5.23 ± 0.02 | 4.84 ± 0.10 | 3.57 ± 0.27 |
| 50 | 5.25 | 5.45 ± 0.15 | 4.50 ± 0.13 | 3.88 ± 0.01 |

The top section of the samples have a higher fiber volume then what the resin mixture was designed to have (5% Vf). This is due to the lowering of the bed plate into the vat trapping more fibers in-between the sample and bottom of the vat then desired. The reason believed for the samples to have lower and similar fiber volume gradients despite the different print times, is that the area around the sample being printed becomes depleted of fibers as the sample is printed. This slowly lowers the fiber volume of the sample as it is going through the printing process.

Because the flexural specimens have a larger cross-section area throughout the entire specimen the fiber gradient appears more pronounced. Similar burn off testing was carried out with the tensile specimens with the exception that only the two ends of the specimen was tested. The average difference in the fiber volume of the top and bottom portions of the tensile specimens change by on average of 0.8% for the specimens printed in the 90° orientation. This lower difference could be to the varying specimen geometry, or that due to their large size a lesser number of specimens were printed at the same time to keep the print time short. This allowed for more spacing between the specimens, and could have prevented the fiber from becoming depleted from around the specimens being printed.

To aid in sample identification the follow naming scheme will be implemented for the remainder of this paper. It will consist of the main material parameter being looked at along with the layer height and print orientation. The lettering is in reference to the material parameter: M is Moai resin as supplied, LP is Moai resin mixed with thermal initiator (Luperox P), and C consist of carbon fiber, thermal initiator (Luperox P), and Moai resin. The number following the lettering is the layer height (100 μm or 50 μm). The number following the hyphen is the angle (0° or 90°) between the longitudinal axis of the sample and the build platform during the manufacturing process. The summarized results of the tensile and flexural testing are shown in Table 5.

TABLE 5

Summarized tensile and flexural testing results.

| Sample | Tensile Strength (MPa) | Young's Modulus (GPa) | Flexural Strength (MPa) | Flexural Modulus (GPa) |
|---|---|---|---|---|
| M100-0 [a] | 58.9 ± 5.0 [e,c,f] | 2.72 ± 0.06 [e,i,k,l,j] | 86.0 ± 9.5 [g] | 2.52 ± 0.07 [e,g,k,f,j] |
| M100-90 [b] | 66.1 ± 0.4 [e,f,l,j] | 2.87 ± 0.05 | 96.2 ± 1.7 | 2.42 ± 0.01 [f,j,h,e] |
| M50-0 [c] | 43.4 ± 7.7 [a,f,j,d,h,l,g,k] | 2.81 ± 0.15 [e,i,j,k] | 82.2 ± 11.2 [g] | 2.42 ± 0.05 [e,g,k,d,h,l] |
| M50-90 [d] | 64.6 ± 1.6 [f,j,l,c,g,k] | 2.89 ± 0.12 [k] | 100.8 ± 3.4 [j,g] | 2.62 ± 0.06 [f,j,h,l,c,g,k] |
| LP100-0 [e] | 36.9 ± 7.9 [a,i,g,k] | 3.17 ± 0.15 [a,c] | 27.9 ± 5.4 [i,k] | 2.34 ± 0.15 [a,i,c,k,b,f,j] |
| LP100-90 [f] | 27.6 ± 22.5 [b,d,h,a,i] | 3.17 ± 0.26 | 14.6 ± 3.0 | 2.47 ± 0.21 [b,j,d,a,e,i] |
| LP50-0 [g] | 50.3 ± 7.7 [e,j,d,h,l,c] | 3.04 ± 0.11 [k] | 23.9 ± 3.7 [a,i,c,k,j,d,l] | 2.55 ± 0.23 [a,i,c,k,d] |
| LP50-90 [h] | 68.8 ± 5.9 [f,l,c,g,k] | 2.83 ± 0.01 | 13.2 ± 0.6 | 2.50 ± 0.20 [b,j,d,c,k] |
| CF100-0 [i] | 52.4 ± 3.7 [e,d,f] | 3.29 ± 0.29 [a,c] | 84.9 ± 4.3 [e,g,j] | 2.59 ± 0.06 [e,g,k,f,j] |
| CF100-90 [j] | 41.4 ± 2.6 [b,g,l] | 3.39 ± 0.52 [a,c] | 66.1 ± 10.5 [d,l,g] | 2.31 ± 0.11 [e,b,f,d,h,l,a,i] |
| CF50-0 [k] | 50.6 ± 6.6 [e,d,h,l,c] | 3.46 ± 0.17 [a,g,c,d,l] | 43.4 ± 5.5 [e,g] | 2.64 ± 0.12 [a,i,c,g,d,h,l] |
| CF50-90 [l] | 11.69 ± 2.28 [b,j,d,h,c,g,k] | 2.92 ± 0.01 [k] | 19.4 ± 2.5 [j,g] | 2.58 ± 0.16 [j,d,c,k] |

The samples are identified with a superscript in the first column and identified with the superscripts of other groups in which significant statistical difference between the results was found via an ANOVA analysis and post-hoc Tukey HSD test at a 95% confidence interval. The samples are compared across 4 different groups: 0° orientation, 90° orientation, one hundred micrometer (100 μm) layer height, and fifty micrometer (50 μm) layer height.

When comparing the Young's modulus of the samples there was an increase of 21% between the M100-0 and CF100-0 samples, and an increase of 27% for the M50-0 and the CF50-0. With an increase in Young's modulus for the CF50-0 samples when compared to the CF100-0 of 5%. While showing only 4% increase between the LP100-0 and CF100-0 samples, and 13% increase for the LP50-0 and CF50-0.

Figure 50:
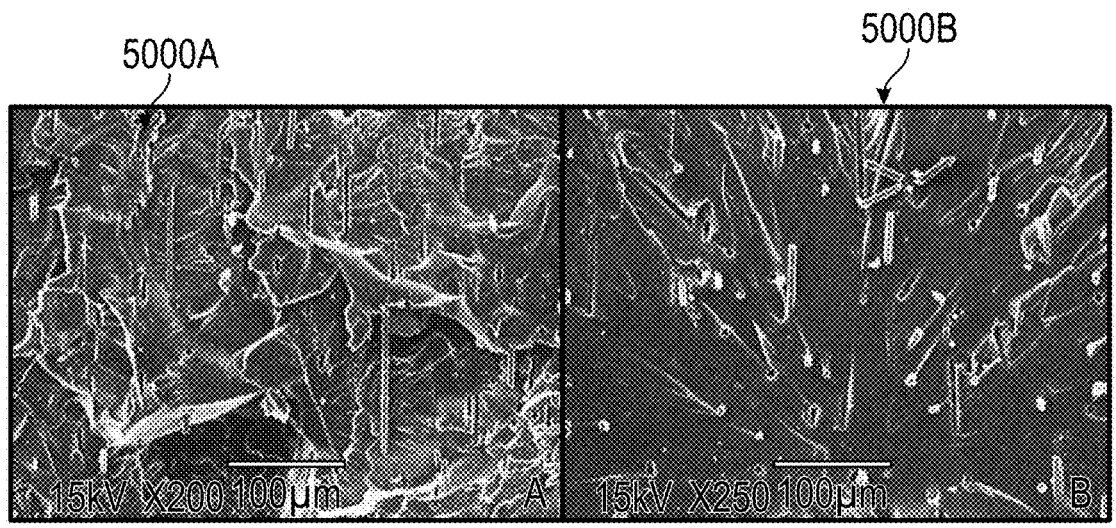
FIG. 50 captures a photographic view of a fracture surface of CF50-0 (A) ×200 and (B) ×250 magnification.
Figure 51:
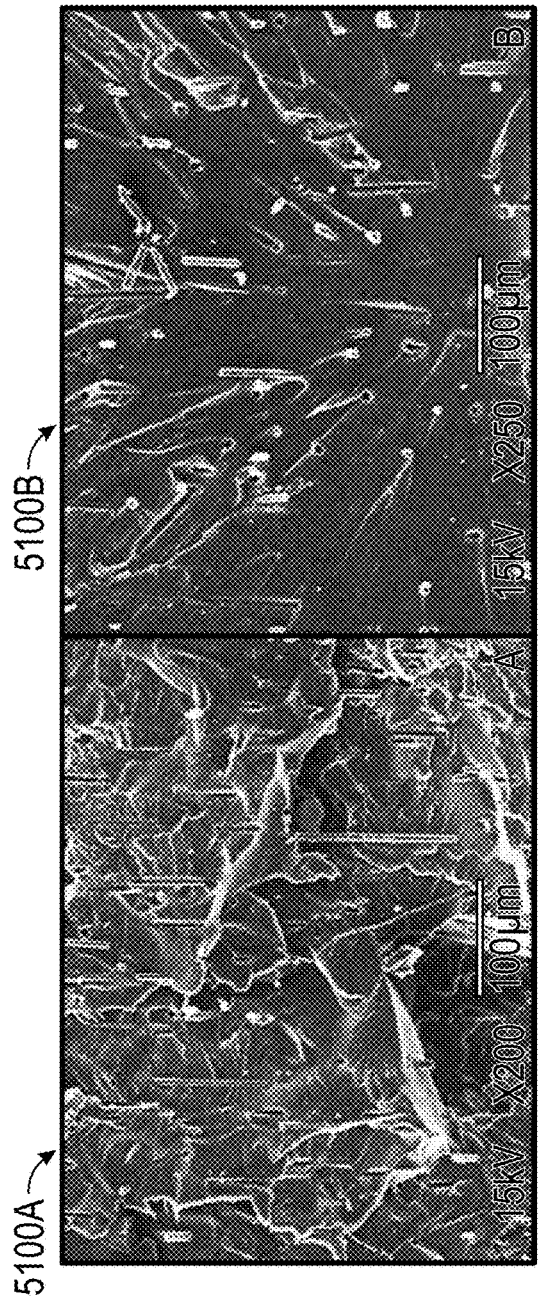
FIG. 51 captures a photographic view of a fracture surface of (A) CF100-90 and (B) CF50-90 specimens.

Evidence of the interfacial properties of the short-fiber composite samples can be seen in FIG. 50. In FIG. 50, the smooth channels left behind from the carbon fiber in 5000A, the clean (lack of bonded matrix material) fibers present in 5000B, and the smooth holes in 5000B are all signs of weaker interfacial properties due to poorer bonding between the matrix and fiber. This limits the ability for the matrix to transfer stress to the fibers and therefore reducing its overall properties. If the composite had better interfacial properties there would have been evidence of fiber breakage, which was not present in any of the SEM images taken.

When comparing the modulus of the carbon fiber samples printed at different layer heights (100 μm and 50 μm) the increase in modulus of 5% can be attributed to the partial alignment of the fibers in the loading direction. The CF100-90 has a higher modulus than the CF50-90 samples. The alignment of the fibers via layer height is demonstrated in FIG. 51, highlighting the various fiber orientations.

When comparing the strength of the Moai resin samples, the samples printed in the 90° print orientation for the Moai resin have a higher strength when compared to the same samples printed in the 0° print orientation. This is due to the effects of the support material being removed and leaving behind notches in the specimen. These notches then act as small stress concentrators resulting in lower strength of the sample. Due to these effects the Moai resin samples tested at a print orientation of 90 are a better representation of the actual ultimate tensile strength of the neat resin material. The samples tested with just the thermal initiator (Luperox P) added also showed flaws the contributed to a lower tensile strength result. These are from cracks there were present on the surface of the samples that originated during the thermal curing process.

Figure 52:
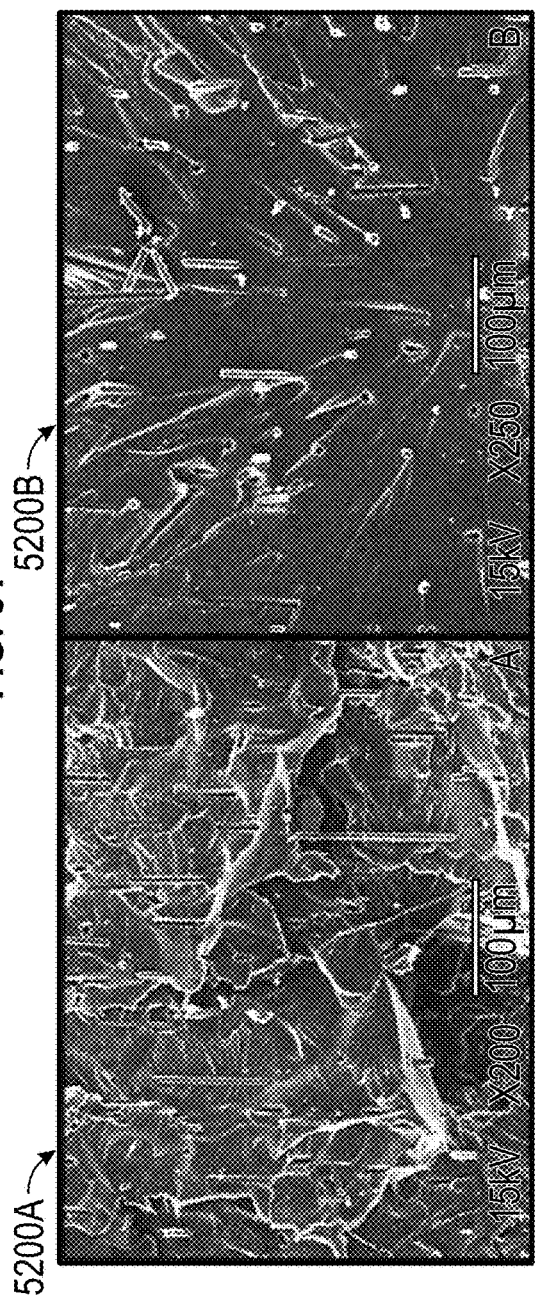
FIG. 52 captures a photographic view of a M100-90 fracture surface at (A) ×500 and (B) ×1000 magnification.
Figure 53:
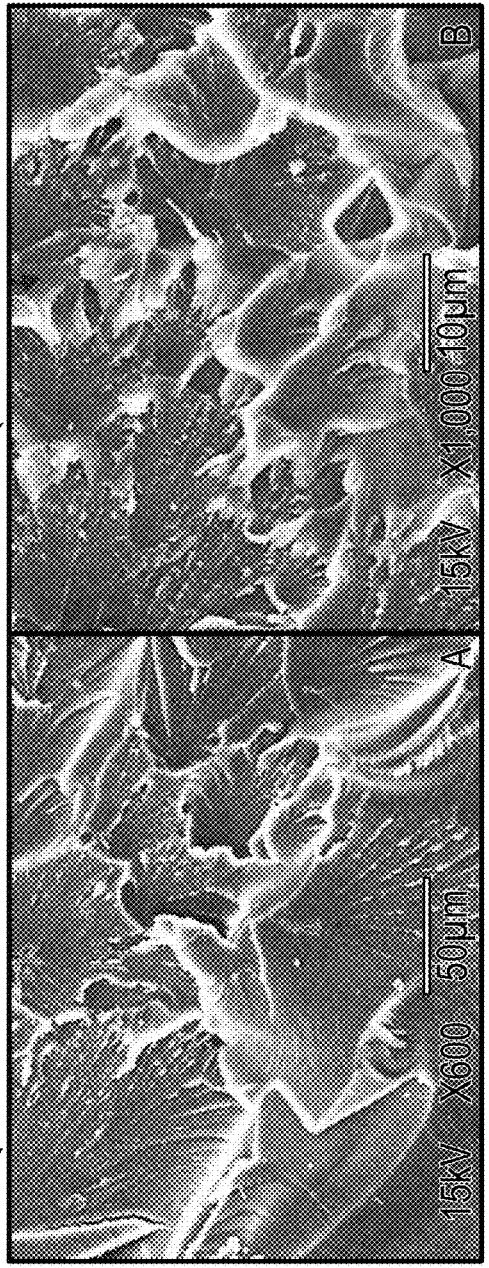
FIG. 53 captures a photographic view of a M50-90 fracture surface at (A) ×500 and (B) ×1000 magnification.

The cracks originate from the volumetric shrinkage that occurs during the post-curing process as the degree of conversation within the system increases. A slower curing schedule might be able to produce samples without cracks, but it was keep the same as the carbon fiber samples for comparison purposes. The LP-100 tension samples also showed the largest number of cracks when compared to the LP50-0 and LP50-90 samples. This is due to the dual-cure system working against itself. When the samples are first cured rapidly using the photo initiator the polymer quickly becomes fixed in place at a low degree of conversation. During the post-curing process the thermal initiator then reacts with remaining function groups increasing the shrinkage and therefore stress within the sample causing cracks to develop. This is more pronounced in the samples at a one hundred micrometer (100 μm) layer height due to there being more unreacted material for the thermal initiator to react with, due to the lower degree of conversion from less energy being delivered to the photo initiator. This can also be seen in SEM images taken from the fracture surfaces of the tensile specimens. FIG. 52 shows the fracture surface of a M100-90 specimen.

From FIG. 52 the fracture appears as brittle until increasing the magnification and then areas of plastic deformation can be seen, and indicating more of a ductile failure on a smaller level. Looking at a M50-90 specimen, in FIG. 53, the fracture pattern is completely brittle with the ribbon features seen in FIG. 52 not present.

Figure 54:
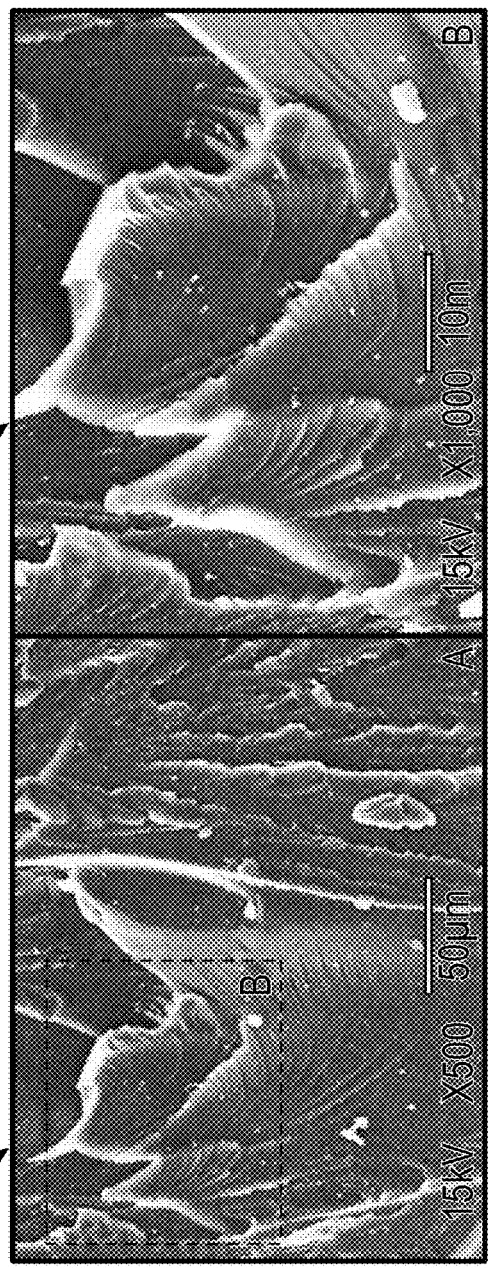
FIG. 54 captures a photographic view of a LP100-0 fracture surface at (A) ×500 and (B) ×1000 magnification.

The thinner layer when printing allows for a higher degree of cure in the fifty micrometer (50 μm) layer height samples when compared to the one hundred micrometer (100 μm) layer height sample, due to the higher amount of energy being delivered to the photo initiator during the printing process. The SEM images for a LP100-0 specimen, FIG. 54, show only the brittle failure features that are as seen in the M50 samples.

The cracks seen on the surface of the LP100 and LP50 samples were not seen in the carbon fiber samples, but the CF50-90 sample did have cracks present before post-curing from the printing processes itself. This was caused due to the smaller layer height not having as much matrix material available for holding one layer to the next. During the peel step of the printing process, when the part would be separated from the silicon layer on the bottom of the vat, it would generate enough stress to separate previous layers. The cracks being present in the specimens caused a large decrease in the strength of the CF50-90 samples due to the cracks decreasing in the actual cross-sectional area and acting as stress concentrators. While also decreasing the Young's modulus by increasing the compliance of the specimens.

The lower strength of the carbon fiber samples is due in part by the end effects of the fiber reinforcement acting as stress concentrators within the composite. This is caused by the large number of very short fibers (much less than the critical length) in the distribution of the lengths being present in the sample. The strength of short-fiber composites are also affected by the length of the carbon fiber being used. To get the maximum amount of reinforcement from the carbon fiber the fiber needs to be over a critical length to maximize the load transfer between the fiber and matrix. The shorter length of the fibers (76 μm) being used is below the critical length need for the system (433 μm using a shear lag model). This results in the load not being fully transferred to the fiber, and limiting the composites performance.

The effect of the fiber volume gradient that was present in the samples would also have a more pronounced effect of the results when compared with the tensile testing. For the tensile specimens, the gage section had similar fiber volume amount within the measured section. The flexural specimens, the whole specimen (with in the span length) is tested allowing for failure to occur in the regions of lower fiber volume.

For the flexural testing, the samples were subjected to compressive, tensile, and shear stresses that lead to the multiple failure mechanisms effecting the flexural properties of material. Generally, tensile stresses can lead to fiber breakage and debonding, while compressive stresses can lead to fiber shear and/or buckling and kinking. If the fibers exhibit characteristics indicating poor interfacial strength between the fiber and matrix, this can, along with low fiber content and weak shear properties of carbon fiber, can lead to the failure of the flexural testing to coincide more with that of the compressive type failures, which are governed more by the matrix properties.

The samples made with just Luperox P added showed the same type of surface cracking after post-curing as was seen in the tensile samples. This lead to them have the weakened flexural strength as was seen in the tensile samples made of the same constituents. The carbon fiber samples exhibited poorer flexural strength than the neat Moai resin samples due to the effects of the fiber ends acting as stress concentration, weak interfacial properties, low fiber content, and the presents of voids. The CF50-90 samples also had the same cracking between layers as was seen in the same sample group from the tensile testing from the printing process, but was not as sever in terms of the depth of the cracks.

Thus, from the DSC results it was determined that with the incorporation of a thermal initiator, the resin would cure both with and without prior UV curing. A dual cure resin system in particular can be selected for use during the additive manufacturing of carbon fiber composites.

Moreover, while Luperox P was chosen as the thermal initiator that yielded the best results from the ones evaluated, both from a processing and material properties perspective, it is to be appreciated other suitable thermal initiators will still work and may be preferably selected if the circumstances permit, such as to save cost.

To improve the fiber volume consistency, a method of mixing the resin during the printing processes can be used. To improve the tensile properties of composites, fiber samples and resin samples with higher tensile strength should be selected.

From the foregoing, it can be seen that the present invention accomplishes at least all of the stated objectives.

LIST OF REFERENCE CHARACTERS

The following table of reference characters and descriptors are not exhaustive, nor limiting, and include reasonable equivalents. If possible, elements identified by a reference character below and/or those elements which are near ubiquitous within the art can replace or supplement any element identified by another reference character.

TABLE 6

| | List of Reference Characters |
|---|---|
| 100 | FDM printing assembly |
| 102 | filament (e.g., thermoplastic) |
| 104 | nozzle |
| 106 | heated bed |
| 108 | printed material |
| 200 | SLA printer |
| 202 | laser |
| 204 | print bed |
| 206 | tank |
| 208 | liquid resin |
| 210 | re-coating bar |
| 212 | printed part |
| 216 | actuator |
| 300 | inverted SLA printer |
| 302 | laser |
| 304 | printer bed |
| 306 | build plate |
| 308 | liquid resin |
| 310 | z-movement |
| 312 | solid resin object |
| 314 | x-y galvanometer |
| 600 | short fibers |
| 700 | long fibers |
| 800 | specimen |
| 802 | gradient line |
| 900 | resin tank |
| 902 | neat part |
| 1000 | partially finished part |
| 1100 | stirrer |
| 1200 | external pump housing |
| 1202 | vacuum oven chamber |
| 1300 | printer |
| 1400 | peristaltic pump |
| 1500 | flow field |
| 1502 | resin tank |
| 1504 | twisting mechanism (e.g. can include rollers) |
| 1506 | hoses |
| 1508 | inlet, outlet (depending on direction of flow) |
| 1510 | inlet, outlet (depending on direction of flow) |
| 1512 | compressible housing |
| 1514 | T-connection |
| 1700A | first orientation (0°) |
| 1700B | second orientation (90°) |
| 1700C | third orientation (45°) |
| 1800 | first modification |
| 1900 | second modification |
| 2000 | mesh setup |
| 2002 | ports |
| 2004 | air layer |
| 2006 | print bed |
| 2100 | computational fluid dynamics flow simulation |
| 2200 | third modification |
| 2300 | ultraviolet (UV) oven |
| 2400 | example specimen |
| 2500 | example specimen |
| 2600 | example specimen |
| 2700 | photograph produced with a scanning electron microscope, exemplifying gradient |
| 2800 | photograph produced with a scanning electron microscope, exemplifying substantially no gradient |
| 2900 | bar graph |
| 3000A | computational fluid dynamics flow simulation |
| 3000B | computational fluid dynamics flow simulation |

TABLE 6-continued

List of Reference Characters

| | |
|---|---|
| 3100A | computational fluid dynamics flow simulation |
| 3100B | computational fluid dynamics flow simulation |
| 4600A | UV source |
| 4600B | heat source |
| 5000A | a fracture surface at CF50-0 (A) X200 magnification |
| 5000B | a fraction surface at CF50-0 (B) X250 magnification |
| 5100A | a fracture surface of (A) CF100-90 specimen |
| 5100B | a fracture surface of (B) CF50-90 specimen |
| 5200A | a M100-90 fracture surface at (A) X500 magnification |
| 5200B | a M100-90 fracture surface at (B) X1000 magnification |
| 5300A | a M50-90 fracture surface at (A) X500 magnification |
| 5300B | a M50-90 fracture surface at (B) X1000 magnification |
| 5400A | a LP100-0 fracture surface at (A) X500 magnification |
| 5400B | a LP100-0 fracture surface at (B) X1000 magnification |

Glossary

Unless defined otherwise, all technical and scientific terms used above have the same meaning as commonly understood by one of ordinary skill in the art to which embodiments of the present invention pertain.

The terms "a," "an," and "the" include both singular and plural referents.

The term "or" is synonymous with "and/or" and means any one member or combination of members of a particular list.

The terms "invention" or "present invention" are not intended to refer to any single embodiment of the particular invention but encompass all possible embodiments as described in the specification and the claims.

The term "about," as used herein, refers to variation in the numerical quantity that can occur, for example, through typical measuring techniques and equipment, with respect to any quantifiable variable, including, but not limited to, mass, volume, time, distance, temperature, tensile strength, Young's modulus, flexural strength, flexural modulus, and fiber orientation. Further, given solid and liquid handling procedures used in the real world, there is certain inadvertent error and variation that is likely through differences in the manufacture, source, or purity of the ingredients used to make the compositions or carry out the methods and the like. The term "about" also encompasses these variations. Whether or not modified by the term "about," the claims include equivalents to the quantities.

The term "substantially" refers to a great or significant extent. "Substantially" can thus refer to a plurality, majority, and/or a supermajority of said quantifiable variable, given proper context.

The term "generally" encompasses both "about" and "substantially."

The term "configured" describes structure capable of performing a task or adopting a particular configuration. The term "configured" can be used interchangeably with other similar phrases, such as constructed, arranged, adapted, manufactured, and the like.

Numeric ranges recited within the specification are inclusive of the numbers defining the range and include each integer within the defined range. Throughout this disclosure, various aspects of this invention are presented in a range format. It should be understood that the description in range format is merely for convenience and brevity and should not be construed as an inflexible limitation on the scope of the invention. Accordingly, the description of a range should be considered to have specifically disclosed all the possible sub-ranges, fractions, and individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6, and decimals and fractions, for example, 1.2, 3.8, 1½, and 4¾. This applies regardless of the breadth of the range.

The term "weight percent," "wt-%," "percent by weight," "% by weight," and variations thereof, as used herein, refer to the concentration of a substance as the weight of that substance divided by the total weight of the composition and multiplied by 100.

The term "vol. %" and "percent by volume" refers to the concentration of a substance as the volume of that substance divided by the total volume of the composition and multiplied by 100.

Terms characterizing sequential order, a position, and/or an orientation are not limiting and are only referenced according to the views presented.

"Creep" is the sliding of polymer chains, which can break a composite. Creep occurs when a composite is under a load for an extended length of time.

The "scope" of the present invention is defined by the appended claims, along with the full scope of equivalents to which such claims are entitled. The scope of the invention is further qualified as including any possible combination of any of the aspects of any of the embodiments disclosed to result in additional embodiments, combinations, subcombinations, or the like that would be obvious to those skilled in the art.

What is claimed is:

1. A method for manufacturing composites comprising:
   suspending fibers within a resin tank holding UV resin;
   creating a laminar, constant flow field of a mixture comprising the suspended fibers and the UV resin from an inlet of the resin tank to an outlet of the resin tank, wherein the laminar, constant flow field includes a constant streamlined velocity caused by increasing the flow rate at the outlet as compared to the inlet;
   aligning the suspended fibers in a direction parallel to a direction of flow within the laminar, constant flow field;
   striking the mixture with a computer-controlled UV laser so as to 3D print a composite; and
   wherein the fibers are of a type selected from the group consisting of glass, carbon, aramid, basalt, copper, boron, aluminum, chromium, microspheres, platelets, bast, flax, hemp, other natural fibers, and combinations thereof.

2. The method of claim 1, wherein the suspended fibers or fillers and the UV resin are continuously circulated with a pump.

3. The method of claim 2, wherein said circulation occurs laminarly within a horizontal plane so as to reduce the effects of gravity.

4. The method of claim 1, wherein the computer-controlled laser is included in an inverted SLA printer.

5. The method of claim 1, wherein the computer-controlled laser is included in a traditional SLA printer.

6. The method of claim 1, wherein the fibers comprise between about 1 vol. % and about 30 vol. % of the mixture and the UV resin comprises between about 70 vol. % and about 99 vol. % of the mixture.

7. The method of claim 1, further comprising automatically using a rule of mixture equations to determine an optimal ratio of fibers to UV resin, said rule of mixture equations optionally programmed into a computer software application.

8. The method of claim 7, wherein said optimal ratio is determined based upon a density of the fibers or fillers, a density of the UV resin, and/or a difference between the density of the fibers or fillers and the density of the UV resin.

9. The method of claim 1, wherein the resin tank includes one, two, three, or four inlets and outlets located opposite one another.

10. The method of claim 1, wherein a geometry of the inlet and the outlet is round, a coat hanger die, rectangular, or variable.

11. The method of claim 1, further comprising, during printing, changing the direction of fiber flow between layers so that the fibers or fillers of adjacent layers are perpendicular to one another.

12. The method of claim 1, wherein a gate, valve, and/or stop can be selectively employed so as to start and/or stop flow through the inlet and/or the outlet.

13. The method of claim 1, wherein the flow rate at the outlet is approximately double of the flow rate at the inlet.

* * * * *

UNITED STATES PATENT AND TRADEMARK OFFICE
CERTIFICATE OF CORRECTION

| | |
|---|---|
| PATENT NO. | : 12,179,415 B2 |
| APPLICATION NO. | : 17/305224 |
| DATED | : December 31, 2024 |
| INVENTOR(S) | : Patrick Simpson, Michael Holthaus and Chad Ulven |

Page 1 of 1

It is certified that error appears in the above-identified patent and that said Letters Patent is hereby corrected as shown below:

In the Claims

<u>In Column 34, Claim 2, Lines 52-53:</u>
DELETE: "or fillers"

<u>In Column 35, Claim 8, Line 5:</u>
DELETE: "or fillers"

<u>In Column 35, Claim 8, Line 7:</u>
DELETE: "or fillers"

<u>In Column 35, Claim 11, Line 16:</u>
DELETE: "or fillers"

Signed and Sealed this
Eleventh Day of March, 2025

Coke Morgan Stewart
*Acting Director of the United States Patent and Trademark Office*